US011122497B2

(12) United States Patent
Chen et al.

(10) Patent No.: US 11,122,497 B2
(45) Date of Patent: Sep. 14, 2021

(54) METHOD AND APPARATUS FOR SS BLOCK INDEX AND TIMING INDICATION IN WIRELESS SYSTEMS

(71) Applicant: Samsung Electronics Co., Ltd., Suwon-si (KR)

(72) Inventors: Hao Chen, Allen, TX (US); Young-Han Nam, Plano, TX (US); Chao He, Allen, TX (US); Vikram Chandrasekhar, Mountain View, CA (US); Hongbo Si, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 15/970,115

(22) Filed: May 3, 2018

(65) Prior Publication Data

US 2018/0324678 A1   Nov. 8, 2018

Related U.S. Application Data

(60) Provisional application No. 62/501,470, filed on May 4, 2017, provisional application No. 62/508,713, filed
(Continued)

(51) Int. Cl.
*H04W 48/10* (2009.01)
*H04W 8/08* (2009.01)
(Continued)

(52) U.S. Cl.
CPC ............ *H04W 48/10* (2013.01); *H04W 8/08* (2013.01); *H04W 24/10* (2013.01); *H04W 48/16* (2013.01); *H04W 56/001* (2013.01)

(58) Field of Classification Search
CPC ... H04W 48/10; H04W 48/16; H04W 56/001; H04W 24/10; H04W 8/08
See application file for complete search history.

(56) References Cited

U.S. PATENT DOCUMENTS 10,159,090 B2 * 12/2018 You ................. H04B 7/2656
2009/0046672 A1    2/2009 Malladi et al.
(Continued)

FOREIGN PATENT DOCUMENTS

CN    105580297 A    5/2016
CN    106233646 A    12/2016
(Continued)

OTHER PUBLICATIONS

"LTE; Evolved Universal Terrestrial Radio Access (E-UTRA); Physical channels and modulation (3GPP TS 36.211 version 13.0.0 Release 13)", Technical Specification, ETSI TS 136 211 V13.0.0, Jan. 2016, 143 pages.
(Continued)

*Primary Examiner* — Habte Mered

(57) ABSTRACT

Apparatuses and methods for synchronization signal (SS) block index and timing indication in wireless communication systems. A method of operating a user equipment (UE) includes receiving, from a base station (BS), sets of higher-layer configuration information. When configured for mobility measurement on SS and physical broadcast channel (PBCH) (SS/PBCH) blocks, the UE identifies, based on one of the sets of higher-layer configuration information, a first set of SS/PBCH blocks configured for the mobility measurement; and measures and reports mobility measurement quantities for the first set of SS/PBCH blocks. When configured for receiving a physical downlink shared channel (PDSCH), the UE identifies, based on another of the sets of higher-layer configuration information, a second set of SS/PBCH blocks configured for the UE; and receives the
(Continued)

PDSCH with rate matching around a SS/PBCH block included in the second set of SS/PBCH blocks.

20 Claims, 37 Drawing Sheets

Related U.S. Application Data on May 19, 2017, provisional application No. 62/509,486, filed on May 22, 2017, provisional application No. 62/520,963, filed on Jun. 16, 2017, provisional application No. 62/525,966, filed on Jun. 28, 2017, provisional application No. 62/535,607, filed on Jul. 21, 2017, provisional application No. 62/541,440, filed on Aug. 4, 2017, provisional application No. 62/543,161, filed on Aug. 9, 2017, provisional application No. 62/554,739, filed on Sep. 6, 2017, provisional application No. 62/556,775, filed on Sep. 11, 2017, provisional application No. 62/566,764, filed on Oct. 2, 2017, provisional application No. 62/587,225, filed on Nov. 16, 2017, provisional application No. 62/616,075, filed on Jan. 11, 2018.

(51) Int. Cl.
*H04W 24/10* (2009.01)
*H04W 56/00* (2009.01)
*H04W 48/16* (2009.01)

(56) References Cited

U.S. PATENT DOCUMENTS

| | | | | |
|---|---|---|---|---|
| 2014/0064135 | A1* | 3/2014 | Chen | H04W 76/27 370/253 |
| 2014/0241150 | A1* | 8/2014 | Ng | H04W 52/02 370/229 |
| 2015/0085717 | A1* | 3/2015 | Papasakellariou | H04L 5/14 370/280 |
| 2015/0092768 | A1 | 4/2015 | Ng et al. | |
| 2015/0312784 | A1 | 10/2015 | You et al. | |
| 2016/0094374 | A1* | 3/2016 | Koorapaty | H04W 72/042 370/329 |
| 2017/0339629 | A1* | 11/2017 | Lindoff | H04W 76/27 |
| 2018/0054821 | A1* | 2/2018 | Sun | H04W 72/042 |
| 2018/0091196 | A1* | 3/2018 | Frenne | H04L 5/005 |
| 2018/0160405 | A1* | 6/2018 | Akkarakaran | H04W 72/1289 |
| 2018/0176942 | A1 | 6/2018 | Kim et al. | |
| 2018/0199363 | A1* | 7/2018 | Lee | H04L 5/0044 |
| 2018/0205512 | A1 | 7/2018 | You et al. | |
| 2018/0213569 | A1* | 7/2018 | Guan | H04W 74/08 |
| 2018/0227922 | A1* | 8/2018 | Lee | H04W 72/0466 |
| 2018/0235012 | A1* | 8/2018 | Chen | H04L 5/0044 |
| 2018/0249400 | A1* | 8/2018 | Harada | H04J 11/0079 |
| 2018/0262920 | A1* | 9/2018 | Axmon | H04W 56/001 |
| 2018/0262975 | A1* | 9/2018 | Martinez Tarradell | H04W 16/10 |
| 2018/0270771 | A1* | 9/2018 | Chendamarai Kannan | H04J 11/0073 |
| 2018/0324022 | A1* | 11/2018 | Sheng | H04W 36/0061 |
| 2019/0007163 | A1* | 1/2019 | Sun | H04L 1/0013 |
| 2019/0053174 | A1* | 2/2019 | Nangia | H04W 72/005 |
| 2019/0081721 | A1* | 3/2019 | Ly | H04J 11/0069 |
| 2019/0089436 | A1* | 3/2019 | Wei | H04L 5/0082 |
| 2019/0200250 | A1* | 6/2019 | Engstrom | H04W 24/10 |
| 2019/0312621 | A1* | 10/2019 | Nam | H04W 76/27 |
| 2019/0356524 | A1* | 11/2019 | Yi et al. | H04L 5/0094 |
| 2019/0357198 | A1* | 11/2019 | Xiong | H04L 5/0053 |
| 2020/0154327 | A1* | 5/2020 | Koskela | H04W 36/00837 |

FOREIGN PATENT DOCUMENTS

| | | | |
|---|---|---|---|
| WO | 2016/195278 A1 | 12/2016 | |
| WO | 2017/010798 A1 | 1/2017 | |
| WO | 2017/058288 A1 | 4/2017 | |
| WO | WO-2018236256 A1 * | 12/2018 | ........ H04W 36/0088 |

OTHER PUBLICATIONS

"LTE; Evolved Universal Terrestrial Radio Access (E-UTRA); Multiplexing and channel coding (3GPP TS 36.212 version 13.0.0 Release 13)", Technical Specification, ETSI TS 136 212 V13.0.0, Jan. 2016, 123 pages.
"LTE; Evolved Universal Terrestrial Radio Access (E-UTRA); Physical layer procedures (3GPP TS 36.213 version 13.0.0 Release 13)", Technical Specification, ETSI TS 136 213 V13.0.0, May 2016, 328 pages.
"LTE; Evolved Universal Terrestrial Radio Access (E-UTRA); Medium Access Control (MAC) protocol specification (3GPP TS 36.321 version 13.0.0 Release 13)", Technical Specification, ETSI TS 136 321 V13.0.0, Feb. 2016, 84 pages.
"LTE; Evolved Universal Terrestrial Radio Access (E-UTRA); Radio Resource Control (RRC); Protocol specification (3GPP TS 36.331 version 13.0.0 Release 13)", Technical Specification, ETSI TS 136 331 V13.0.0, Jan. 2016, 670 pages.
Samsung, "Remaining details on sync signals", 3GPP TSG RAN WG1#91, R1-1720272, Nov. 27-Dec. 1, 2017, 6 pages.
"3rd Generation Partnership Project; Technical Specification Group Radio Access Network; Evolved Universal Terrestrial Radio Access (E-UTRA); Physical layer; Measurements (Release 14)", 3GPP TS 36.214 V14.1.0, Dec. 2016, 20 pages.
"3rd Generation Partnership Project; Technical Specification Group Radio Access Network; Study on New Radio (NR) Access Technology; Physical Layer Aspects (Release 14)", 3GPP TR 38.802 V1.1.0, Jan. 2017, 71 pages.
International Search Report dated Sep. 6, 2018 in connection with International Patent Application No. PCT/KR2018/005196.
Written Opinion of the International Searching Authority dated Sep. 6, 2018 in connection with International Patent Application No. PCT/KR2018/005196.
Cohere Technologies, "SS Block Composition, SS Burst Set Composition and SS Time Index", 3GPP TSG-RAN Meeting #88bis, Apr. 3-7, 2017, 3 pages, R1-1705459.
Nokia et al., "SS Block Composition, SS Burst Set Composition and SS Time Index Indication", 3GPP TSG-RAN WG1 Meeting #88bis, Apr. 3-7, 2017, 12 pages, R1-1705837.
NTT Docomo, Inc., "Discussion on SS block composition, SS burst set composition and SS block index indication for NR", 3GPP TSG RAN WG1 Meeting #88bis, Apr. 3-7, 2017, 8 pages, R1-1705705.
Supplementary European Search Report dated Mar. 17, 2020 in connection with European Patent Application No. 18 79 4154, 8 pages.
Chinese National Intellectual Property Adminisliation, First Office Action dated Jul. 2, 2021 regarding Application No. CN201880029025.0, 17 pages.
Vivo, "Discussion on Connected mode Measurement", 3GPP TSG RAN WG1 Meeting #88, R1- 1703382, Feb. 2017, 5 pages.

\* cited by examiner

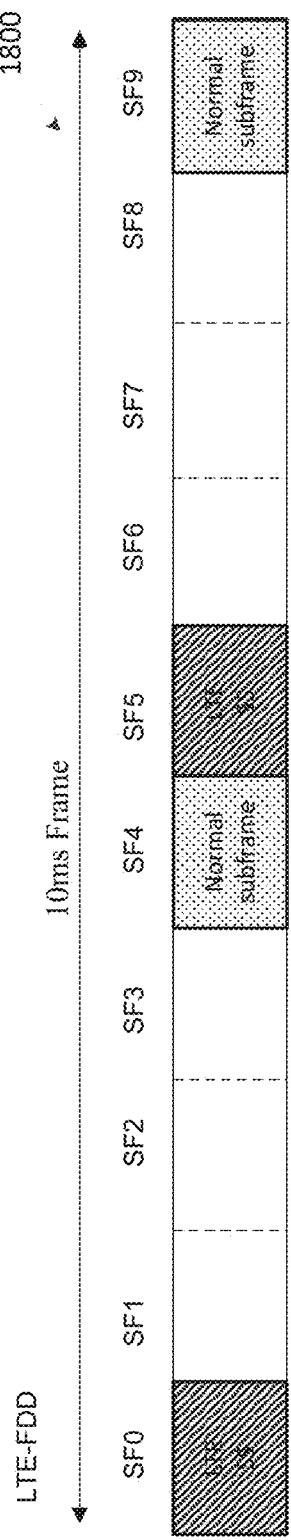
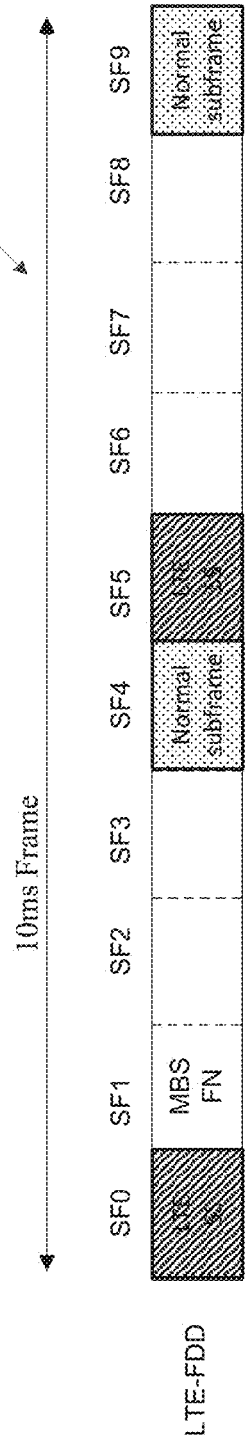
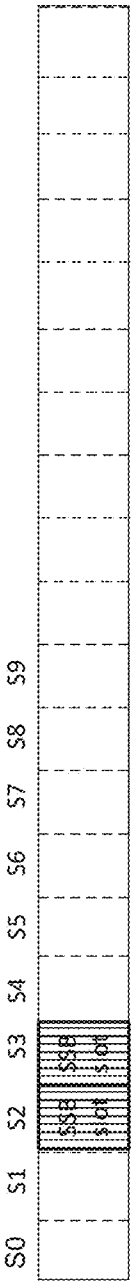
FIG. 18A
FIG. 18B

METHOD AND APPARATUS FOR SS BLOCK INDEX AND TIMING INDICATION IN WIRELESS SYSTEMS

CROSS-REFERENCE TO RELATED APPLICATIONS AND CLAIM OF PRIORITY

The present application claims the benefit of:
U.S. Provisional Patent Application Ser. No. 62/501,470, filed on May 4, 2017;
U.S. Provisional Patent Application Ser. No. 62/508,713, filed on May 19, 2017;
U.S. Provisional Patent Application Ser. No. 62/509,486, filed on May 22, 2017;
U.S. Provisional Patent Application Ser. No. 62/520,963, filed on Jun. 16, 2017;
U.S. Provisional Patent Application Ser. No. 62/525,966, filed on Jun. 28, 2017;
U.S. Provisional Patent Application Ser. No. 62/535,607, filed on Jul. 21, 2017;
U.S. Provisional Patent Application Ser. No. 62/541,440, filed on Aug. 4, 2017;
U.S. Provisional Patent Application Ser. No. 62/543,161, filed on Aug. 9, 2017;
U.S. Provisional Patent Application Ser. No. 62/554,739, filed on Sep. 6, 2017;
U.S. Provisional Patent Application Ser. No. 62/556,775, filed on Sep. 11, 2017;
U.S. Provisional Patent Application Ser. No. 62/566,764, filed on Oct. 2, 2017;
U.S. Provisional Patent Application Ser. No. 62/587,225, filed on Nov. 16, 2017; and
U.S. Provisional Patent Application Ser. No. 62/616,075, filed on Jan. 11, 2018.
The contents of the above-identified patent documents are incorporated herein by reference.

TECHNICAL FIELD

The present application relates generally to wireless communication systems. More specifically, this disclosure relates to synchronization signal (SS) block index and timing indication in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3x, support for up to 500 kilometer per hour (km/h) mobility, 1 millisecond (ms) latency, a connection density of 106 devices/km2, a network energy efficiency improvement of 100x and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide SS block index and timing indication in wireless communication systems.

In one embodiment, a user equipment (UE) is provided. The UE includes a transceiver configured to receive, from a base station (BS), sets of higher-layer configuration information and a processor operably connected to the transceiver. The processor configured to, when configured for mobility measurement on SS and physical broadcast channel (PBCH) (SS/PBCH) blocks, identify, based on one of the sets of higher-layer configuration information, a first set of SS/PBCH blocks configured for the mobility measurement; and measure and report, via the transceiver, mobility measurement quantities for the first set of SS/PBCH blocks. The processor configured to, when configured for receiving a physical downlink shared channel (PDSCH), identify, based on another of the sets of higher-layer configuration information, a second set of SS/PBCH blocks configured for the UE; and receive, via the transceiver, the PDSCH with rate matching around a SS/PBCH block included in the second set of SS/PBCH blocks.

In another embodiment, a BS is provided. The BS includes a processor configured to generate sets of higher-layer configuration information for a UE; and a transceiver operably connected to the processor. The transceiver configured to transmit, to the UE, the sets of higher-layer configuration information and receive, from the UE, reports based on the sets of higher-layer configuration information. When configuring the UE for mobility measurement on SS/PBCH blocks, the processor is configured to generate one of the sets of higher-layer configuration information to indicate a first set of SS/PBCH blocks configured for the mobility measurement for reporting of mobility measurement quantities for the first set of SS/PBCH blocks. When configuring the UE for receiving a PDSCH, the processor is configured to generate another of the sets of higher-layer configuration information to indicate a second set of SS/PBCH blocks configured for the UE; and transmit, via the transceiver, the PDSCH with rate matching around a SS/PBCH block included in the second set of SS/PBCH blocks.

In yet another embodiment, a method of operating a UE is provided. The method includes receiving, from a BS, sets of higher-layer configuration information. When configured for mobility measurement on SS/PBCH blocks, the UE identifies, based on one of the sets of higher-layer configuration information, a first set of SS/PBCH blocks configured for the mobility measurement; and measures and reports mobility measurement quantities for the first set of SS/PBCH blocks. When configured for receiving a PDSCH, the UE identifies, based on another of the sets of higher-layer configuration information, a second set of SS/PBCH blocks configured for the UE; and receives the PDSCH with rate matching around a SS/PBCH block included in the second set of SS/PBCH blocks.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18A illustrates an example SS burst set composition according to embodiments of the present disclosure;

FIG. 18B illustrates another example SS burst set composition according to embodiments of the present disclosure;

DETAILED DESCRIPTION

FIG. 1 through FIG. 35, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.214 v14.1.0, "Physical Layer Measurement;" 3GPP TS 36.321 v13.0.0, "E-UTRA, Medium Access Control (MAC) protocol specification;" 3GPP TS 36.331 v13.0.0, "E-UTRA, Radio Resource Control (RRC) Protocol Specification," and 3GPP TR 38.802 v1.1.0, "Study on New Radio Access Technology Physical Layer Aspect."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
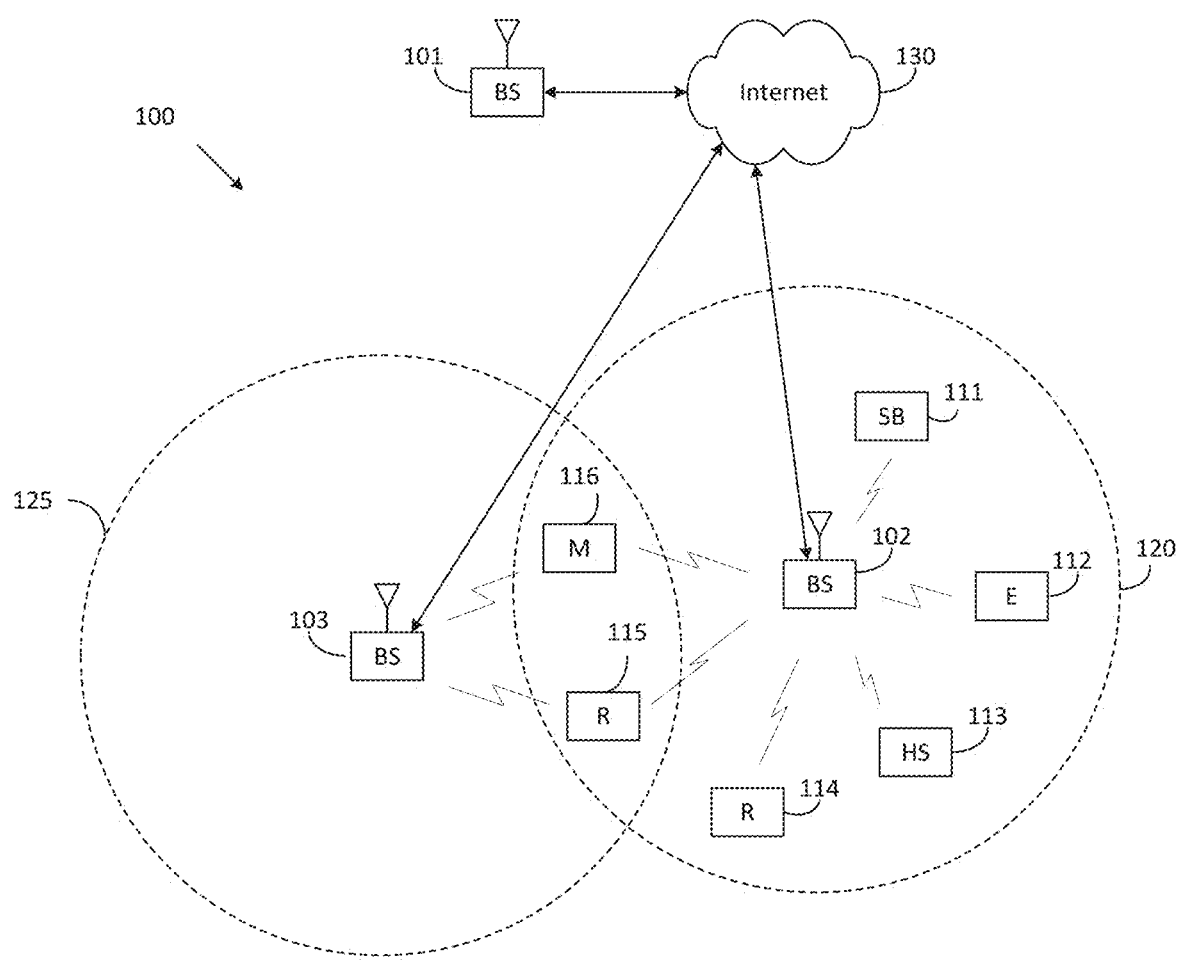
FIG. 1 illustrates an example wireless network according to embodiments of the present disclosure.
Figure 2:
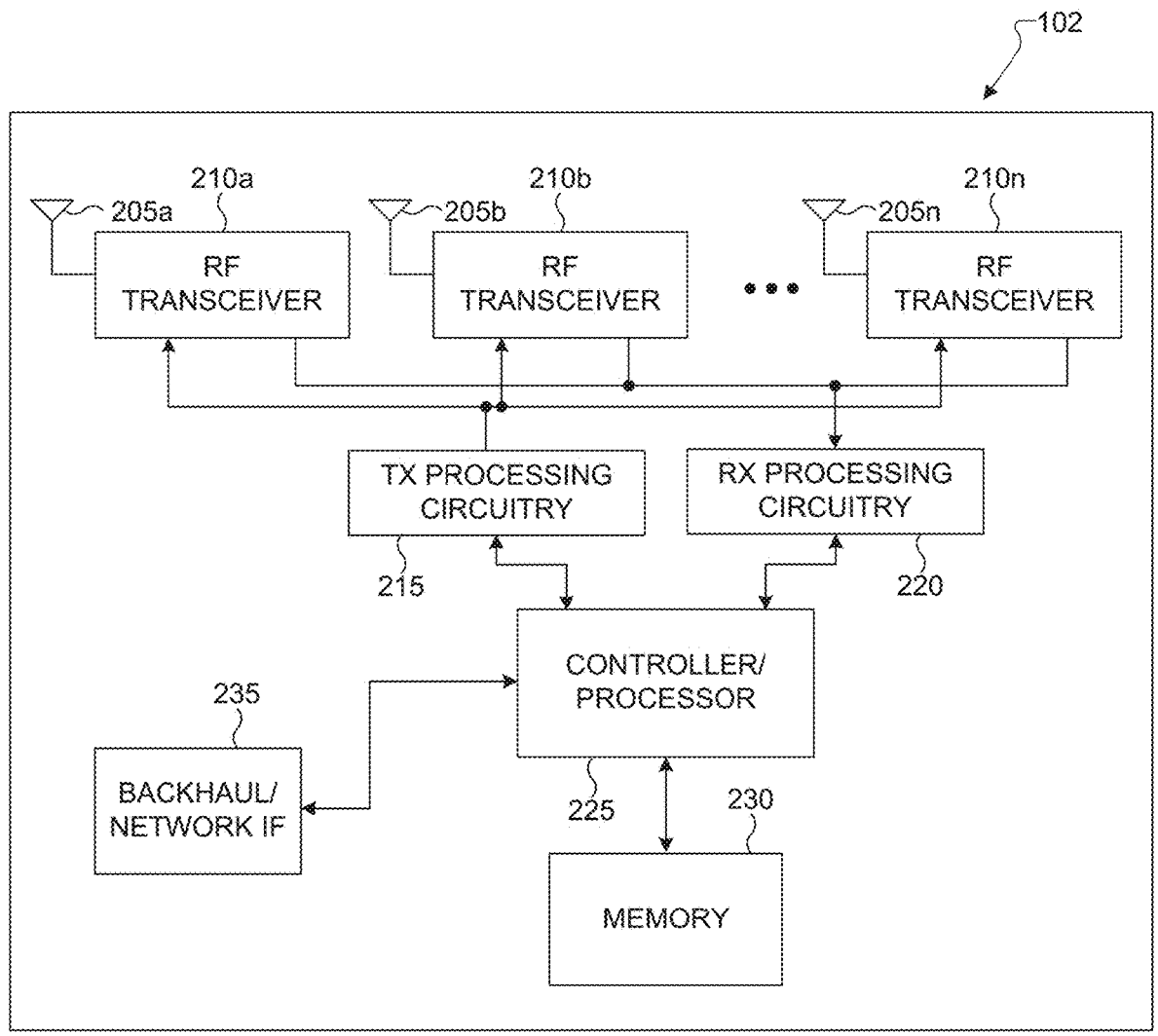
FIG. 2 illustrates an example eNB according to embodiments of the present disclosure.
Figure 3:
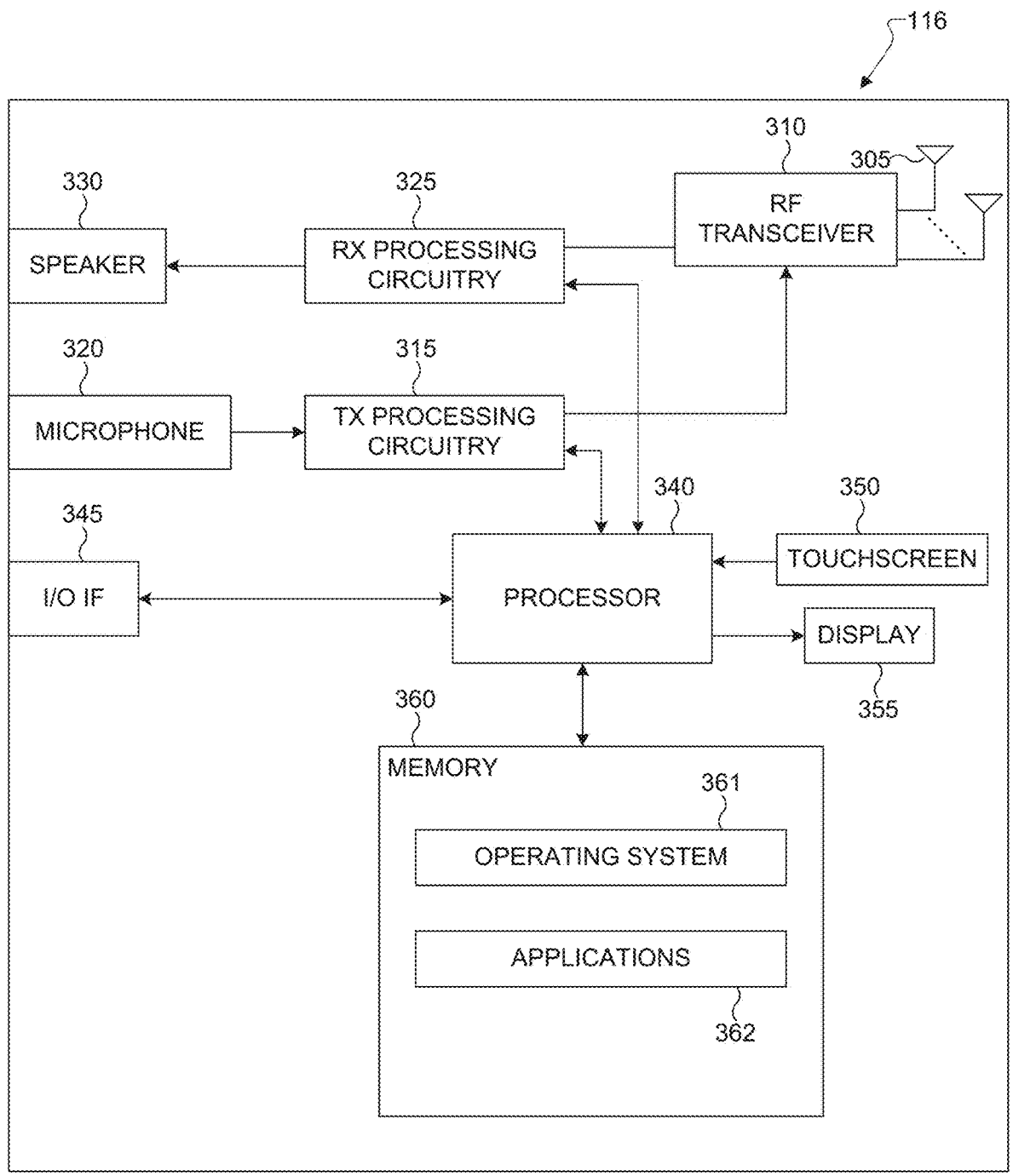
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient SS block index and timing indication in an advanced wireless communication system. In certain embodiments, and one or more of the eNBs 101-103 includes circuitry, programing, or a combination thereof, for efficient SS block index and timing indication in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
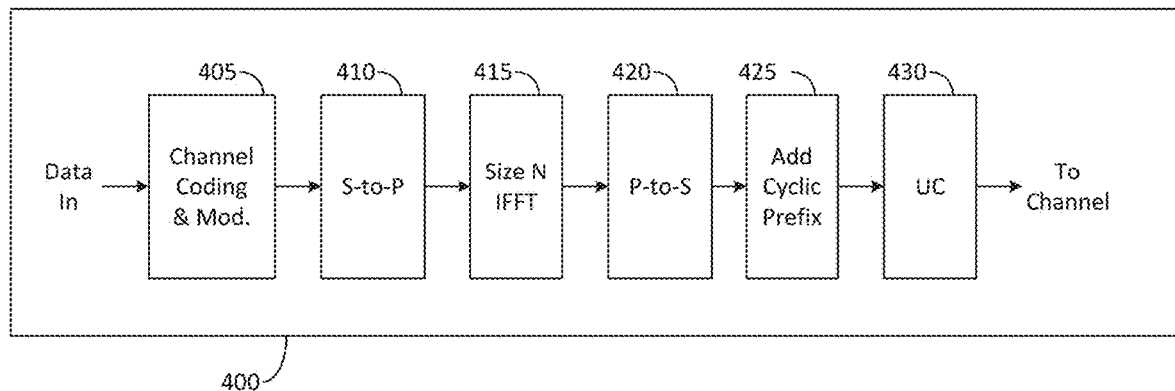
FIG. 4A illustrates an example high-level diagram of an orthogonal frequency division multiple access transmit path according to embodiments of the present disclosure.
Figure 4B:
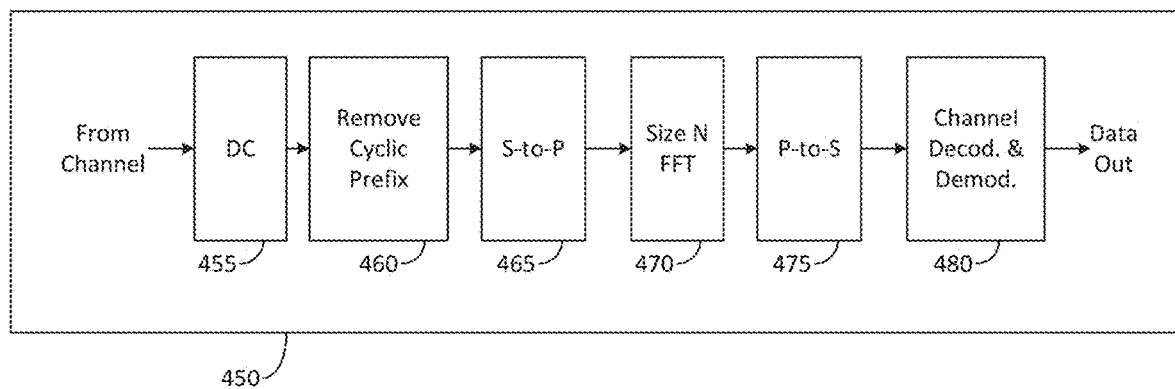
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

Figure 5:
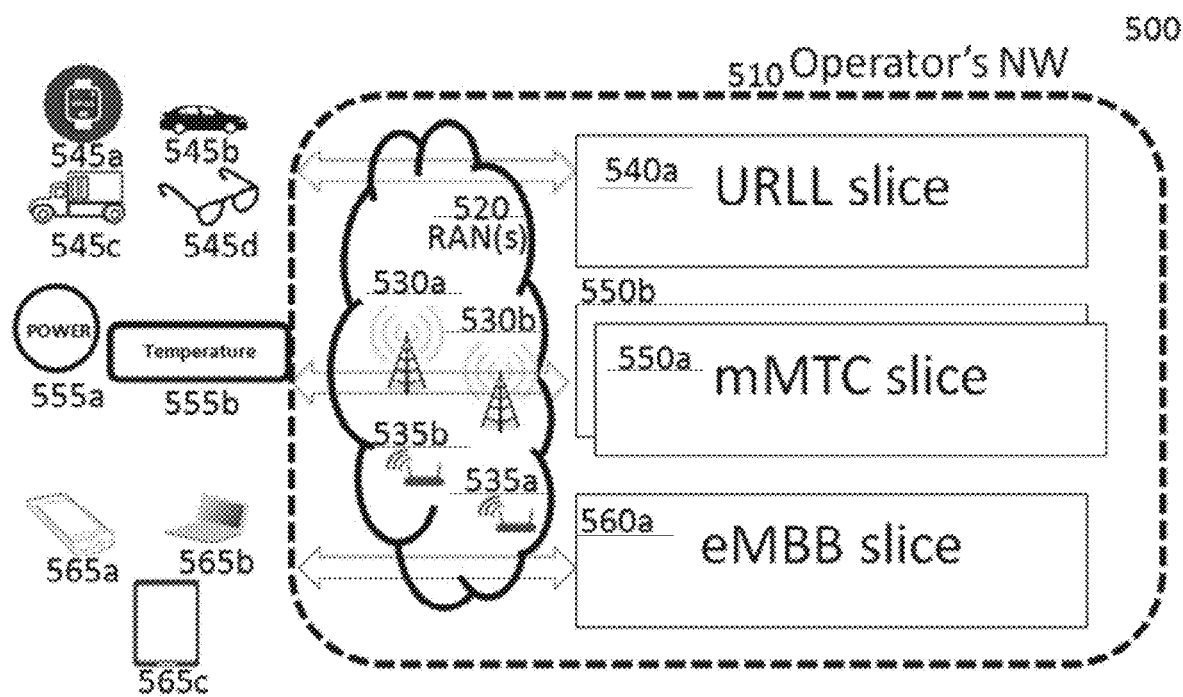
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized sliceagnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
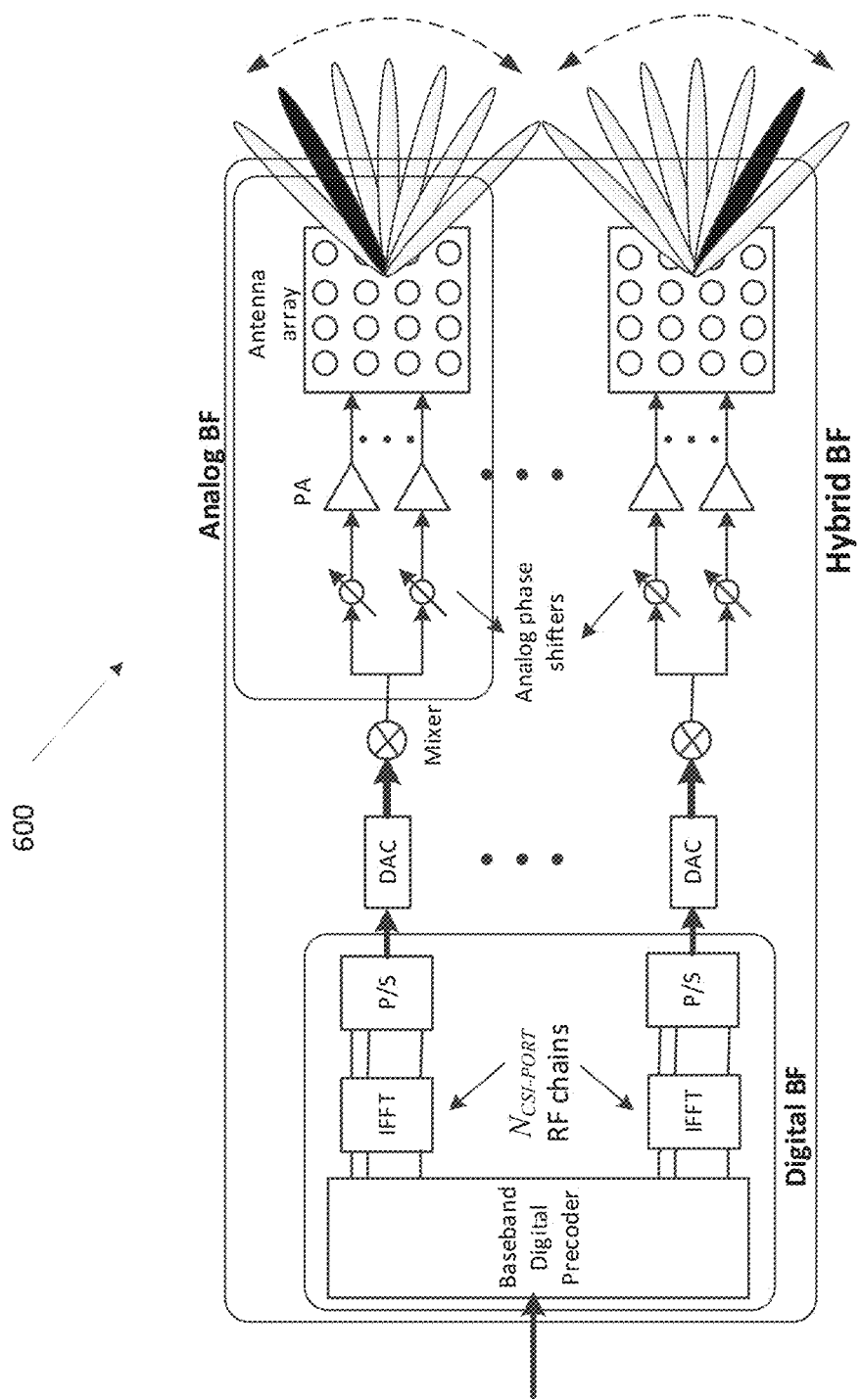
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for a gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
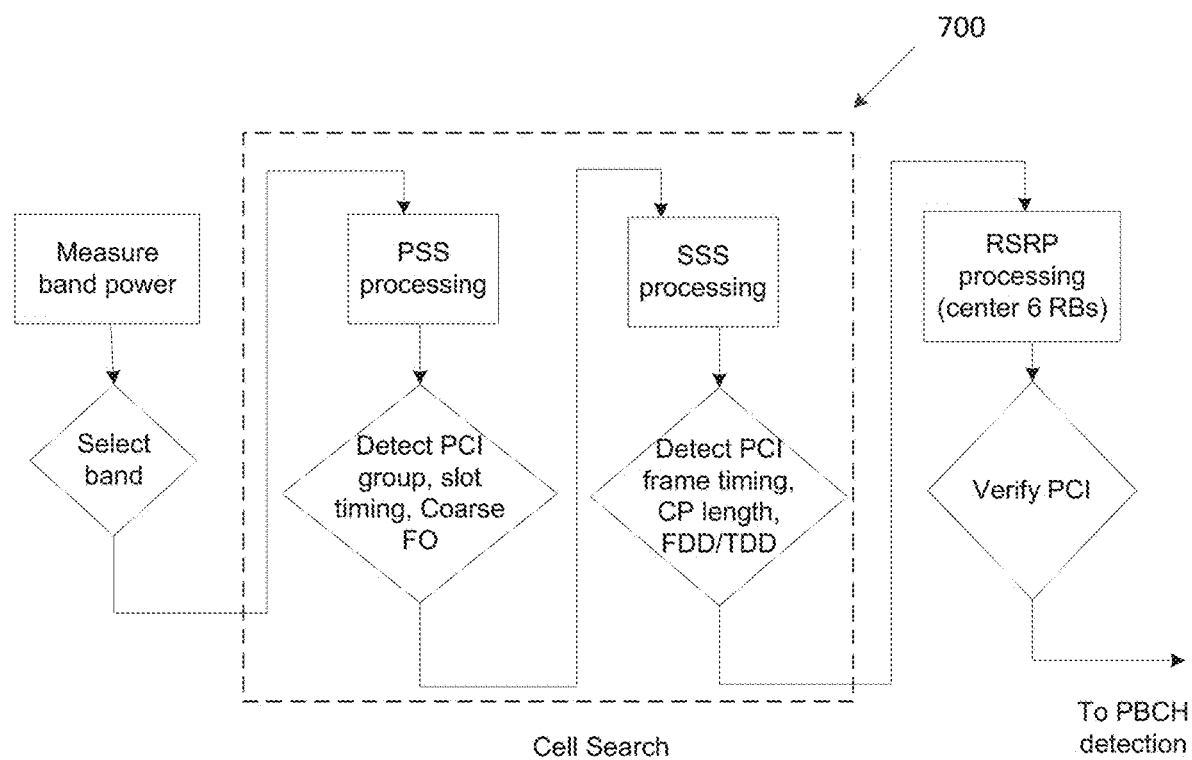
FIG. 7 illustrates an example LTE cell search operation according to embodiments of the present disclosure.

FIG. 7 illustrates an example LTE cell search operation 700 according to embodiments of the present disclosure. An embodiment of the LTE cell search operation 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Before a UE can receive or transmit data to an eNB, the UE first needs to perform a cell search procedure in order to acquire time and frequency synchronization with the eNB. The 4 main synchronization requirements are: symbol, subframe, and frame timing; carrier frequency offset (CFO) correction; sampling clock synchronization; and physical cell ID (PCI) detection and potentially some other cell-specific parameters.

The following steps are taken during synchronization. In one example of step 1, after power on, a UE tunes the UE's RF and attempts to measure the wideband received signal strength indicator (RSSI) at specific frequencies (channels, as commanded by higher layer) over a set of supported frequency bands one after another, and rank associated cells based on respective RSSI values.

In one example of step 2, the UE uses downlink synchronization channels, that is locally stored primary synchronization signal (PSS) and secondary synchronization signal (SSS) to correlate with a received signal. The UE first finds the PSS, that is located, for example for a FDD system, in a last symbol of a first time slot of a first and a sixth subframes in a frame. This enables the UE to synchronize with the eNB at the subframe level. The PSS detection helps the UE with the slot timing detection and the physical layer cell identity (PCI) detection (0, 1, 2) based on 3 sequences. The 3 sequences are used for PSS to mitigate so-called single frequency network (SFN) effect where a correlation output can exceed a cyclic prefix (CP) length.

In one example of step 3, the SSS symbols are also located in the same subframe as PSS but in the symbol before PSS for a FDD system. From the SSS, the UE is able to obtain the PCI group number (0 to 167). The SSS enables determination of additional parameters such as radio subframe timing determination, CP length determination and whether the eNB uses FDD or TDD. The process is depicted in the LTE cell search procedure shown in FIG. 7.

In one example of step 4, once a UE knows the PCI for a given cell, the UE also knows the location of cell-specific reference signals (CRS) that are used for channel estimation, cell selection/reselection and handover procedures. After channel estimation using CRS, equalization is performed to remove channel impairments from received symbols.

In one example of step 5, in case of initial synchronization, a UE can decode a primary broadcast channel (PBCH) to obtain a master information block (MIB) that carries critical system information such as the DL bandwidth, CRS transmit power, number of eNB transmitter antennas, system frame number (SFN), and a configuration for a physical hybrid-ARQ channel (PHICH).

TABLE 1 shows SSS locations relative to PSS locations for both the TDD-based and FDD-based systems. In case of FDD, PSS is transmitted in the last symbol of a slot to enable the UE to acquire slot timing independent of the CP length. Since a UE does not know a CP length in advance, the UE needs to examine a total of 4 possible SSS locations when the UE is searching for either FDD or TDD cells. Two SSS codes are used which alternate between the $1^{st}$ and $2^{nd}$ SSS transmissions in the sub-frame which enables the UE to determine the radio timing from a single observation of the SSS, which can be beneficial for UEs handing over to LTE from another RAT.

TABLE 1

| | SSS location | | | | | | | | | |
|---|---|---|---|---|---|---|---|---|---|---|
| Subframe | 0 | 1 | 2 | 3 | 4 | 5 | 6 | 7 | 8 | 9 |
| FDD | PSS (#6) SSS (#5) | | | | | PSS (#6) SSS (#5) | | | | |
| TDD | SSS (#13) | PSS (#2) | | | | SSS (#13) | PSS (#2) | | | |

Figure 8:
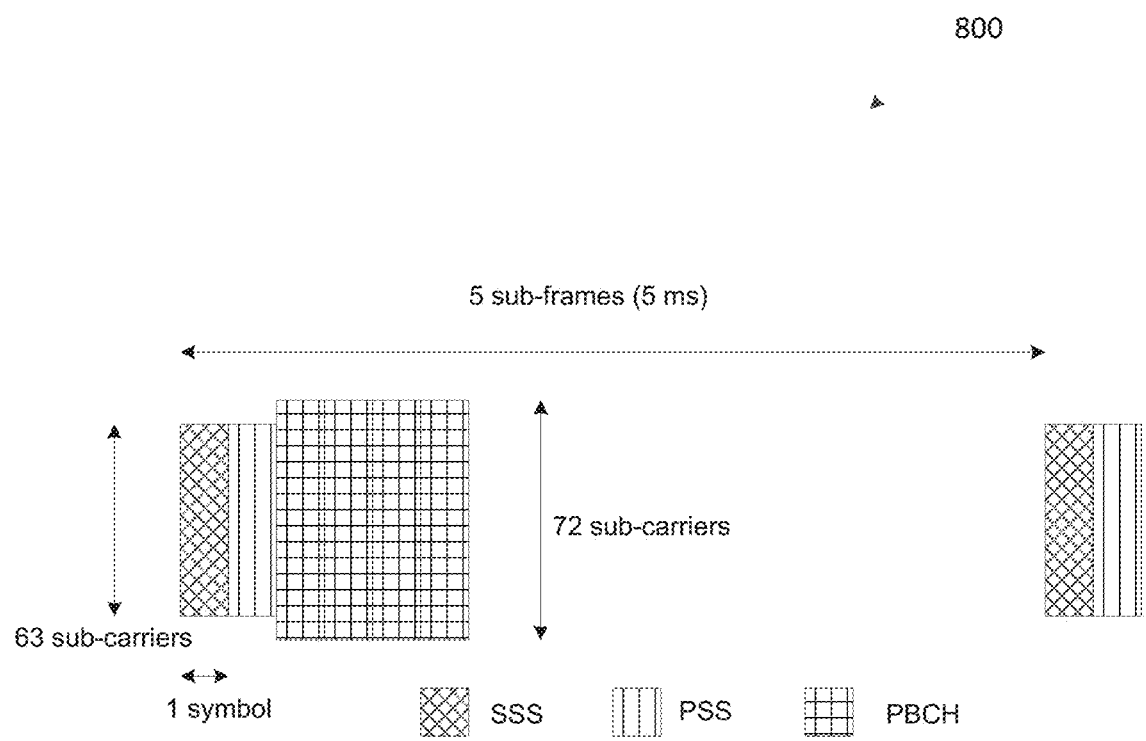
FIG. 8 illustrates an example frame structure of the PSS/SSS/PBCH transmission in the FDD configuration according to embodiments of the present disclosure.

FIG. 8 illustrates an example frame structure of the PSS/SSS/PBCH transmission 800 in the FDD configuration according to embodiments of the present disclosure. An embodiment of the frame structure of the PSS/SSS/PBCH transmission 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As shown in FIG. 8, the PSS and SSS are transmitted in the central 6 RBs so that even a minimum bandwidth UE can detect the signals. In case of multiple transmit antennas, PSS and SSS are transmitted from the same antenna port in a given sub-frame while the PSS and SSS can be switched in between sub-frames for antenna diversity. The PBCH carriers the MIB with just 14 bits that carries some of the most frequently transmitted parameters used for initial access to the cell, such as the DL system bandwidth, PHICH size, and the SFN number. It is repeated every 40 msec.

The PSS and SSS are transmitted in the central 6 resource blocks (RBs) of a DL system bandwidth so that the PSS and SSS can be detected by a UE before the UE determines the DL system bandwidth, assuming that a minimum DL system bandwidth is 6 RBs. The PSS is generated by a Zadoff-Chu (ZC) sequence of length 63 in the frequency domain with the middle element punctured to avoid transmitting on the DC subcarrier. ZC sequences satisfy a constant amplitude zero autocorrelation (CAZAC) property that enables the PSS to have characteristics of time/frequency flatness (resulting in low PAPR/CM and no dynamic range in frequency domain), good auto/cross-correlation profiles, low complexity detection at UE (by exploiting complex conjugate property, e.g. u1=29 and u2=63−29=34, and by exploiting central symmetry property in both time and frequency domain), and so on.

However, due to the duality of the CAZAC property in the time and frequency domains, a shift of a ZC sequence in the frequency domain is also translated in time domain, and the reverse. Therefore, in the context of timing synchronization using ZC sequences, a frequency/time offset displays the time/frequency offset, respectively, and the offset in these two dimensions cannot be distinguished. The central root indices in the available root ZC sequence index vector have less frequency offset sensitivity and, for this reason, the root indices u=25, 29 and 34 were selected in LTE to provide three cell IDs within a cell ID group.

The selection of the root indices also considered partial correlation to overcome large frequency offset in initial cell search. Due to the phase rotation in time domain as a result of a large frequency offset, partial correlations need to be considered not only for ZC sequences but also for other sequences under large frequency offset operation especially in initial cell search although a window size for each partial correlation can be different depending on the exact design.

A PSS sequence x(n) is composed of a length $N_{ZC}$ root $u_i$ ZC sequence and is given by:

$$x(n) = e^{-\frac{j\pi u_i n(n+1)}{N_{ZC}}}, n = 0, 1, \ldots, N_{ZC} - 1. \qquad \text{equation 1}$$

The LTE ZC sequence is mapped to achieve the central symmetry property (i.e. index 5 corresponds to the DC sub-carried for a RB that includes 12 sub-carriers indexed from 0 to 11). The SSS sequences are based on M-sequences. 168 sequences are generated by frequency domain interleaving of two length-31 BPSK-modulated M-sequences, where the two length-31M-sequences are derived from two different cyclic shifts of a single length-31 M-sequence. The two part structure of the SSS leads to side-lobes during cross-correlation and scrambling is used to mitigate the side lobes. For SSS, coherent detection is possible when channel estimates can be obtained via PSS detection.

In order to achieve a better performance of coherent detection for SSS by estimating the channel from PSS, multiple PSS sequences are used with a trade-off in PSS detection complexity. The different PSS sequences can enable improved channel estimation accuracy by relaxing the SFN effect that exists due to having a single PSS sequence from all cells. Thus, the aforementioned PSS/SSS design can support both coherent and non-coherent SSS detection. A UE needs to operate three parallel correlators for three different PSS sequences.

However, the root indices 29 and 34 are a complex conjugate to each other and this enables a "one-shot" correlator—two correlation outputs for u=29 and 34 can be obtained from correlation with either u=34 or u=29. The conjugate property holds in both time and frequency domains, for any sampling rate, with the central symmetry mapping in frequency domain. Therefore, only two parallel correlators are needed (one for u=25 and the other for u=29 (or u=34)).

There is a need to enhance the existing synchronization and cell search procedure for new communication systems such as 5G at least for the following reasons.

In one example of beamforming support, in order to meet link budget requirements for operation in high carrier frequency bands, such as ones above 6 GHz, beamforming is required for transmissions by an eNB (and possibly also by a UE). Therefore, the aforementioned synchronization and cell search procedure needs to be updated for beamforming support.

In one example of large bandwidth support, for operation with large system bandwidths, such as 100 MHz or above, a different sub-carrier spacing than the one for operation in the smaller system bandwidths can apply and such design needs to be considered for the synchronization and cell search procedure design.

In one example of improved coverage, for some applications, such as ones associated with a requirement for increased coverage that can occur due to placements of UEs in locations experiencing a large path loss, the synchronization and cell search procedure needs to support enhanced coverage and increased repetitions of synchronization signals.

In one example of improved performance, the synchronization performance of the aforementioned procedure is limited due to false alarms caused by the partitioning a cell ID into 1 PSS and 2 SSS, thereby leading to invalid combinations of PSS/SSS that cannot completely resolved by scrambling. A new synchronization procedure can be designed with improved false alarm performance.

In one example of support for variable TTI, in current LTE specification, the TTI duration is fixed. However, for 5G systems, the TTI is expected to be variable due to support for different sub-carrier spacing, low latency considerations etc. In this scenario with variable TTI, the mapping of the synchronization sequences and cell search within the frame needs to be specified.

In the present disclosure, an SS burst set is periodically recurring with period P, where P is an integer, e.g., 5, 10, 20, 40, 80, 100 etc. in terms of millisecond.

In the present disclosure, an SS burst means a set of consecutive $N_2$ SS blocks, where $N_2$ is an integer, e.g., 1, 2, 3, 4.

In the present disclosure, an SS block comprises a combination of synchronization signals, broadcast signals, and reference signals, which are multiplexed in TDM, FDM, CDM or hybrid manner.

In the present disclosure, a cell coverage is provided by a beam sweeping manner over SS blocks comprising an SS burst set. Different Tx beams may be used for different SS blocks within an SS burst set.

In LTE design, there is no concept of SS burst/block/set. However, the current LTE structure can be treated as a special case in the framework of SS burst/block/set, where one SS burst set compromises of four SS burst; each SS burst consists of only one SS block and one SS block consists of PSS, SSS and PBCH symbols.

Figure 9A:
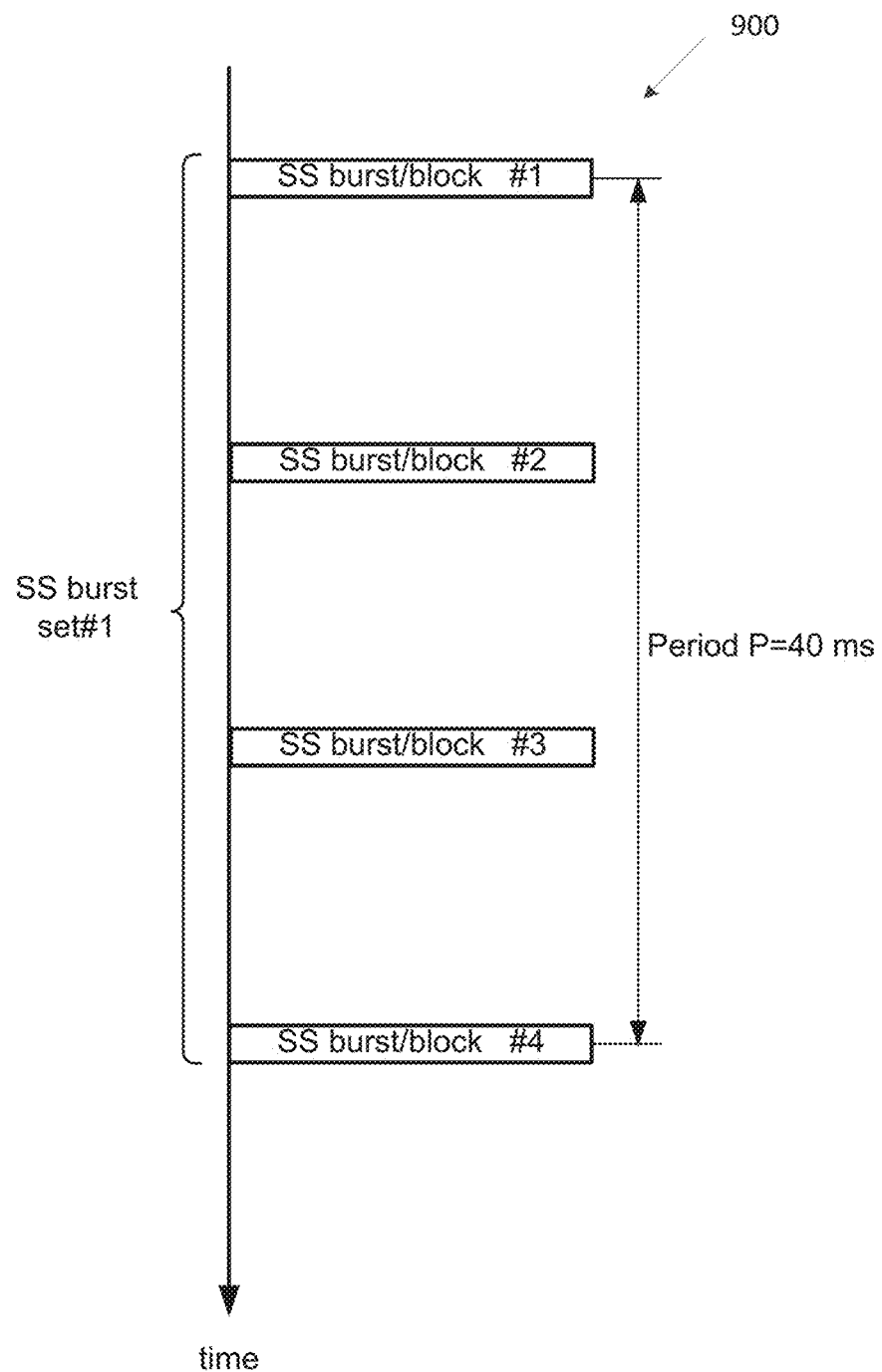
FIG. 9A illustrates an example SS burst in LTE system according to embodiments of the present disclosure.

FIG. 9A illustrates an example SS burst 900 in LTE system according to embodiments of the present disclosure. An embodiment of the SS burst 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions. Other embodiments are used without departing from the scope of the present disclosure.

Figure 9B:
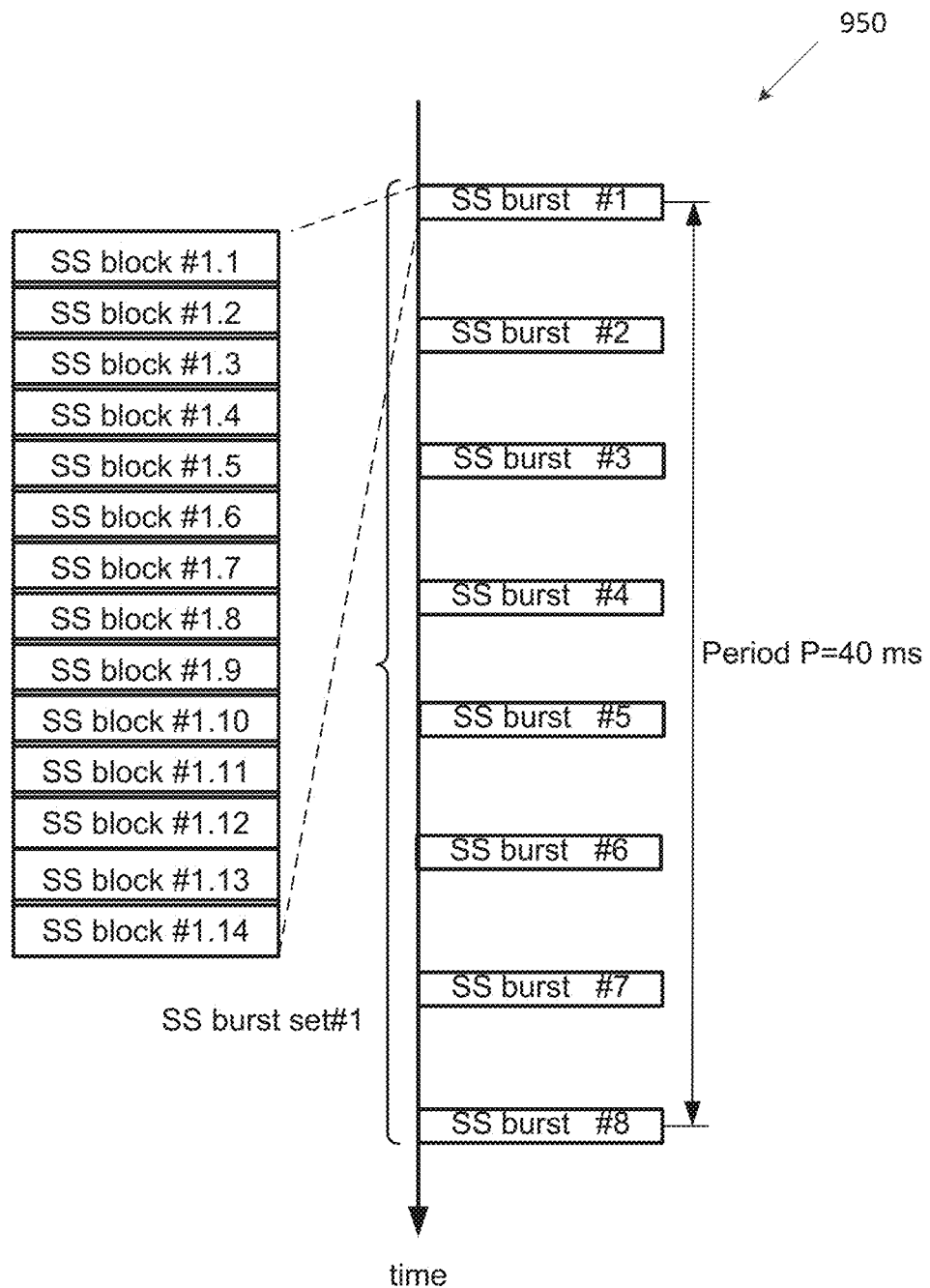
FIG. 9B illustrates an example SS block/burst/set according to embodiments of the present disclosure.

FIG. 9B illustrates an example SS block/burst/set 950 according to embodiments of the present disclosure. An embodiment of the SS block/burst/set 950 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions. Other embodiments are used without departing from the scope of the present disclosure.

In some embodiments of the present disclosure, "a subframe" or "a time slot" is another name to refer to "a time interval X," or vice versa.

In some embodiments 1, timing information is carried by DMRS and explicit NR-PBCH content.

In one embodiment, hybrid PBCH DMRS and PBCH content to carry the SS block index and half radio frame timing indication are considered. Denote the SS block index as X. X is 0~63 for above 6 GHz NR, 0~7 for 1~6 GHz NR and 0~3 for below 1 GHz NR. Denote M as the total DMRS hypotheses. Denote Y as the DMRS sequence number, and denote Z as the half frame timing index, Z=0 represent the first 5 ms frame and Z=1 represent the second 5 ms frame. Denote "W" as number in NR-PBCH which represent extra information for SS block index in above 6 GHz NR. In one alternative, the half radio frame timing is conveyed by DMRS hypotheses. The relationship between X, Y, Z, W, M can be decided by Y=X modular (M/2)+(M/2)*Z, and W=floor(X/M*2).

In one example, for both below 6 GHz and above 6 GHz, the design of PBCH DMRS is the same. To indicate more SS block index for above 6 GHz NR, additional 3 bits information are put in PBCH. For below 6 GHz NR, SS block index and half radio frame timing is carried by PBCH DMRS. As indicated in LTE standardization, there are at most 8 SS blocks to indicate. The NR-PBCH DMRS may have at least additional 16 hypotheses before the scrambling of cell ID. The 16 hypotheses can be used to indicate the half radio frame timing and 8 SS block index. Therefore, for below 6 GHz NR, there may be no additional hypotheses in NR-PBCH.

The complexity of initial access may be no more than the complexity of initial access in LTE. For above 6 GHz NR, as the maximum SS block index is 64, additional 3 bits in NR-PBCH are needed to indicate this extra information in NR-PBCH. Denote the SS block index as X. X is 0~63 for above 6 GHz NR, 0~7 for 1~6 GHz NR and 0~3 for below 1 GHz NR. Denote Y as the DMRS sequence number (0~15), and denote Z as the half frame timing index, Z=0 represent the first 5 ms frame and Z=1 represent the second 5 ms frame. Denote "W" as the 3-bits number in NR-PBCH which represent extra information for SS block index in above 6 GHz NR.

The indication of SS block index and half radio frame can be achieved by transmitting DMRS hypothesis number Y and NR-PBCH information W. Note that here the DMRS hypothesis is different from the DMRS sequence. The same DMRS hypothesis may be mapped to different DMRS sequence because different cell ID may be scrambled on top of the PBCH DMRS. The mapping of SS block index and half radio frame timing to DMRS hypothesis and NR-PBCH information can be decided by the following equation: Y=X modular 8+8*Z and W=floor(X/8).

Using this mapping scheme, a UE can still get some coarse beam index indication information without decoding PBCH. Alternatively, the mapping of SS block index and half radio frame timing to DMRS hypothesis and NR-PBCH information bits are captured in TABLE 2.

TABLE 2

Mapping of SS block index and half radio frame timing

| Item | SS block index X | Half radio frame timing Z | DMRS hypothesis # Y | NR-PBCH bits W and number |
|---|---|---|---|---|
| 1 | 0 | 0 | 0 | 0(000) |
| 2 | 1 | 0 | 1 | 0(000) |
| 3 | 2 | 0 | 2 | 0(000) |
| 4 | 3 | 0 | 3 | 0(000) |
| 5 | 4 | 0 | 4 | 0(000) |
| 6 | 5 | 0 | 5 | 0(000) |
| 7 | 6 | 0 | 6 | 0(000) |
| 8 | 7 | 0 | 7 | 0(000) |
| 9 | 8 | 0 | 0 | 1(001) |
| 10 | 9 | 0 | 1 | 1(001) |
| 11 | 10 | 0 | 2 | 1(001) |
| 12 | 11 | 0 | 3 | 1(001) |
| 13 | 12 | 0 | 4 | 1(001) |
| 14 | 13 | 0 | 5 | 1(001) |
| 15 | 14 | 0 | 6 | 1(001) |
| 16 | 15 | 0 | 7 | 1(001) |
| 17 | 16 | 0 | 0 | 2(010) |
| 18 | 17 | 0 | 1 | 2(010) |
| 19 | 18 | 0 | 2 | 2(010) |
| 20 | 19 | 0 | 3 | 2(010) |
| 21 | 20 | 0 | 4 | 2(010) |
| 22 | 21 | 0 | 5 | 2(010) |
| 23 | 22 | 0 | 6 | 2(010) |
| 24 | 23 | 0 | 7 | 2(010) |
| 25 | 24 | 0 | 0 | 3(011) |
| 26 | 25 | 0 | 1 | 3(011) |
| 27 | 26 | 0 | 2 | 3(011) |
| 28 | 27 | 0 | 3 | 3(011) |
| 29 | 28 | 0 | 4 | 3(011) |
| 30 | 29 | 0 | 5 | 3(011) |
| 31 | 30 | 0 | 6 | 3(011) |
| 32 | 31 | 0 | 7 | 3(011) |
| 33 | 32 | 1 | 8 | 4(100) |
| 34 | 33 | 1 | 9 | 4(100) |
| 35 | 34 | 1 | 10 | 4(100) |
| 36 | 35 | 1 | 11 | 4(100) |
| 37 | 36 | 1 | 12 | 4(100) |
| 38 | 37 | 1 | 13 | 4(100) |
| 39 | 38 | 1 | 14 | 4(100) |
| 40 | 39 | 1 | 15 | 4(100) |
| 41 | 40 | 1 | 8 | 5(101) |
| 42 | 41 | 1 | 9 | 5(101) |
| 43 | 42 | 1 | 10 | 5(101) |
| 44 | 43 | 1 | 11 | 5(101) |
| 45 | 44 | 1 | 12 | 5(101) |
| 46 | 45 | 1 | 13 | 5(101) |
| 47 | 46 | 1 | 14 | 5(101) |
| 48 | 47 | 1 | 15 | 5(101) |
| 49 | 48 | 1 | 8 | 6(110) |
| 50 | 49 | 1 | 9 | 6(110) |
| 51 | 50 | 1 | 10 | 6(110) |
| 52 | 51 | 1 | 11 | 6(110) |
| 53 | 52 | 1 | 12 | 6(110) |
| 54 | 53 | 1 | 13 | 6(110) |
| 55 | 54 | 1 | 14 | 6(110) |
| 56 | 55 | 1 | 15 | 6(110) |
| 57 | 56 | 1 | 8 | 7(111) |
| 58 | 57 | 1 | 9 | 7(111) |
| 59 | 58 | 1 | 10 | 7(111) |
| 60 | 59 | 1 | 11 | 7(111) |
| 61 | 60 | 1 | 12 | 7(111) |
| 62 | 61 | 1 | 13 | 7(111) |
| 63 | 62 | 1 | 14 | 7(111) |
| 64 | 63 | 1 | 15 | 7(111) |

In one embodiment, the half radio frame timing is indicated by PBCH information payload together with information of additional SS block index. The relationship between X, Y, Z, W, and M can be decided by Y=X modular (M) and W=floor(X/Y)+M*Z.

In some embodiments 2, RRM reporting based on indication from network is considered.

For above 6 GHz NR, the SS block index may be greater than the number of hypotheses in PBCH DMRS. For beam measurement, if a UE does not decode PBCH, the UE may not be able to indicate/report the exact beam index and RSRP to the network. However, in some scenario, a UE does not need to report a fine beam measurement RSRP to network. Unless otherwise indicated, the UE is configured to report DMRS sequence index along with the corresponding RSRP.

When the UE finds multiple SS block with the same DMRS sequence index in an SS burst set, the UE averages the RSRP along the multiple SS blocks. A UE can be explicitly indicated to report SS burst index by the network for a given carrier frequency (RRC or SIB). When indicated like this, the UE is configured to measure RSRP per "beam" identified by "SS burst index" and "DMRS sequence index." The SS burst index can be conveyed by NR-PBCH payload information.

In one example, the SS burst is defined by every eight SS blocks starts from the beginning of the first SS block. The mapping of SS block index and half radio frame to DMRS sequence index/hypotheses is defined by the aforementioned embodiments (e.g., embodiment 1).

For every SS blocks in the same SS burst set, SS blocks may share the same DMRS sequence index/hypotheses. An eNB may use consecutive beams to transmit these SS blocks. After receiving SS blocks with the same PBCH DMRS sequence, a UE may average the RSRP and report the averaged RSRP to the network.

In some embodiments of mobility beam index reporting, $X_1$-bit part of X bit beam index is carried on PBCH DMRS and the other $X_2$-bit part of the beam index is carried as at least one of PBCH payload and PBCH scrambling, wherein $X=X_1+X_2$. In one example, $X_1=3$. In another example, $X_1=4$. The channel measurement is conducted on a corresponding SS block, i.e., SSS and optionally on the PBCH DMRS.

In such embodiments, a (full) beam index may refer to an SS block index, and the total number of such indices is $2^X$. A partial beam index refers to a part of beam index carried by PBCH DMRS, and the total number of such indices is $2^{X_1}$. The partial beam index may correspond to either LSBs or MSBs of the full beam index.

Figure 10:
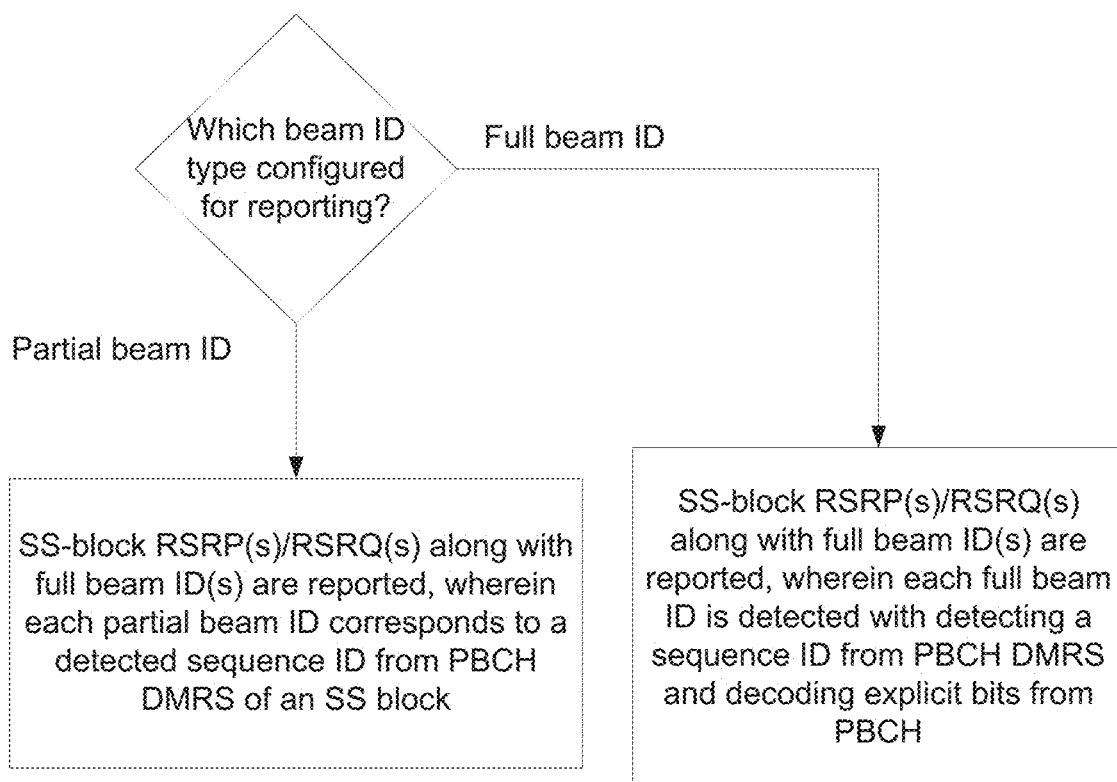
FIG. 10 illustrates a flow chart of a method for Beam ID reporting configuration according to embodiments of the present disclosure.

FIG. 10 illustrates a flow chart of a method 1000 for Beam ID reporting configuration according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

For mobility measurement reporting, it may be desirable that a UE may not need to decode PBCH. This implies that it would be desirable if the UE can generate a measurement report with detecting PBCH DMRS sequence only. This may be feasible if the total number of beams $2^X$ is less than $2^{X_1}$. However, if the total number of beams is greater than $2^X$, the UE has to decode the PBCH.

Hence, it is proposed that a UE is indicated whether to report SS block RSRP/RSRQ along with a full beam ID selected from 2^X beam IDs, or along with a partial beam ID selected from 2^$X_1$ beam IDs detected on the PBCH DMRS only. This scheme is illustrated in FIG. 10.

When a full beam ID reporting is configured, the UE derives and reports SS-block RSRP(s)/RSRQ(s) along with the full beam ID(s), wherein each full beam ID is detected with detecting a sequence ID from PBCH DMRS and decoding explicit bits from PBCH. When partial beam ID reporting is configured, the UE derives and reports SS-block RSRP(s)/RSRQ(s) along with partial beam ID(s), wherein each partial beam ID corresponds to a detected sequence ID from PBCH DMRS of an SS block.

The default UE behavior needs to be defined in case the UE does not receive this indication signaling. In a first alternative, the default UE behavior is to report the full beam ID; in a second alternative the default UE behavior is to report the partial beam ID. The first alternative behavior could be beneficial for the network (i.e., full beam IDs can be obtained), but the first alternative puts burden on the UE side (e.g., more power consumption for the measurement). The second alternative behavior is beneficial for the UE side (e.g., less power consumption for the measurement).

The indication can be conveyed in RRC signaling or SIB/RMSI signaling per cell or per frequency band. When the UE is configured to report full beam ID selected from 2^X beam IDs, the UE derives measurement quantity (e.g., RSRP/RSRQ) for each detected SS block, with applying L3 filtering across the measurement results from the SS blocks with the same full beam ID in the subsequent SS burst sets. For this measurement, the UE needs to derive the beam ID with not only detecting PBCH DMRS sequence, but also decoding PBCH explicit bits.

When the UE is configured to report partial beam ID selected from 2^$X_1$ beam IDs detected on the PBCH DMRS only, there are two cases the UE needs to handle. In one example, during the SS burst set duration (or measurement window/duration) of 5 msec, the UE has detected at most one SS block corresponding to each partial beam ID. In another example, during the same duration, the UE has detected more than one SS block corresponding to at least one partial beam ID.

In such examples, the UE can derive measurement quantity (e.g., RSRP/RSRQ) for each detected SS block, with applying L3 filtering across the measurement results from the SS blocks with the same partial beam ID in the subsequent SS burst sets. In such examples, SS blocks with a certain partial beam ID may occur multiple times in the detected SS blocks within the SS burst set duration of 5 msec.

In one instance, the UE is configured to take an average of the measurement quantities with the same partial beam ID within each SS burst set duration, and apply L3 filtering on the average quantities across the measurement results from the SS blocks with the same partial beam ID in the subsequent SS burst sets.

In another instance, the UE is configured to select a maximum of the measurement quantities with the same partial beam ID within each SS burst set duration, and apply L3 filtering on the maximum across the measurement results from the SS blocks with the same partial beam ID in the subsequent SS burst sets. Such examples and instances may be pre-configured, or indicated via the RRC or SIB signaling.

When the UE is configured to report full beam ID selected from 2^X beam IDs, the UE derives measurement quantity (e.g., RSRP/RSRQ) for each detected SS block, with applying L3 filtering across the measurement results from the SS blocks with the same full beam ID in the subsequent SS burst sets. For this measurement, a UE needs to derive the beam ID with not only detecting PBCH DMRS sequence, but also decoding PBCH explicit bits.

Figure 11:
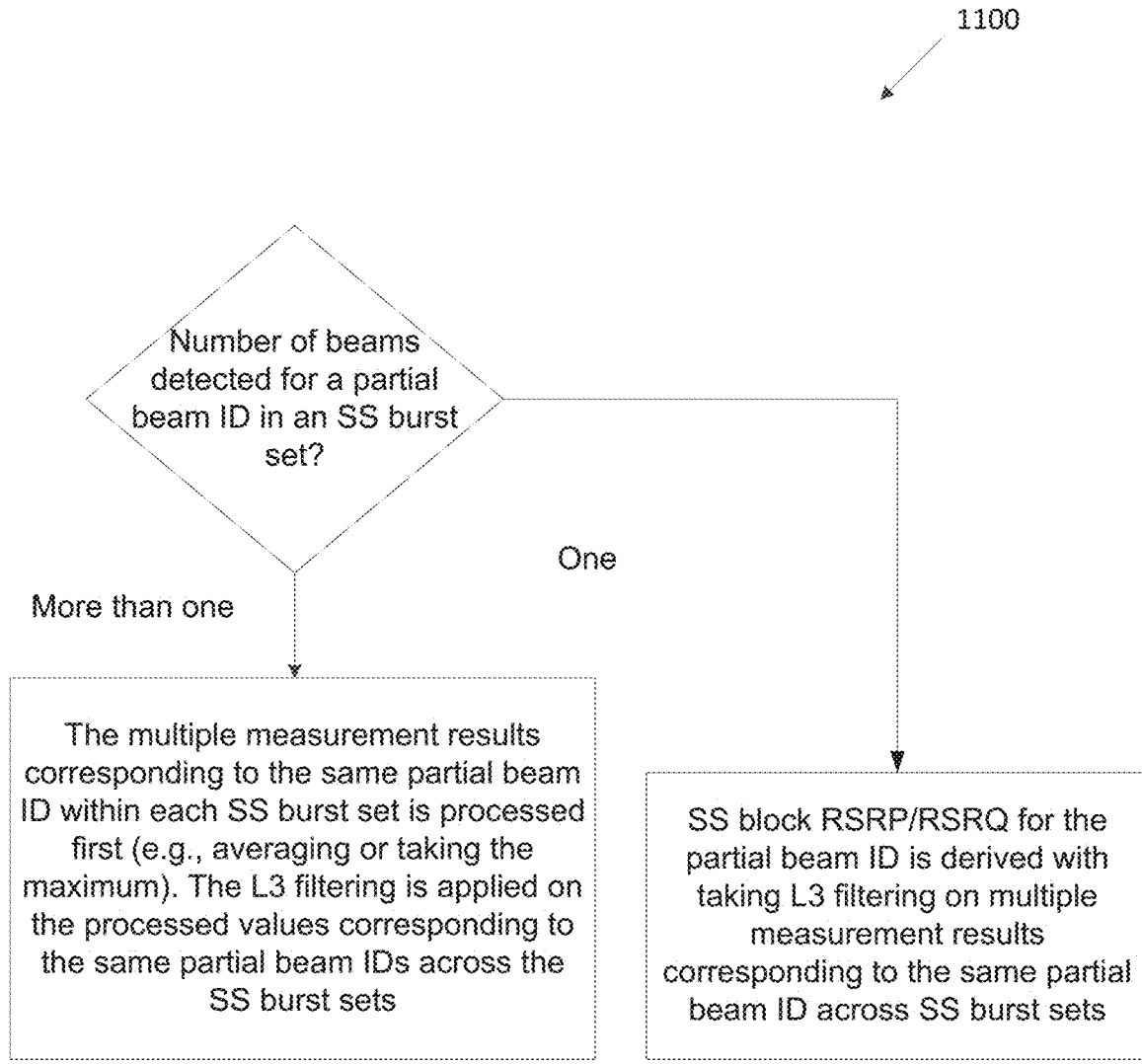
FIG. 11 illustrates a flow chart of a method for measurement quantity derivation according to embodiments of the present disclosure.

FIG. 11 illustrates a flow chart of a method 1100 for measurement quantity derivation according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one example, for both below 6 GHz and above 6 GHzm, the design of PBCH DMRS is the same. To indicate more SS block index for above 6 GHz NR, additional 3 bits information are put in PBCH. The indication of half radio frame is also carried in PBCH. For below 6 GHz NR, SS block index is carried by PBCH DMRS. As discussed in LTE standardization, there are at most 8 SS blocks to indicate. The NR-PBCH DMRS may have at least 8 hypotheses before the scrambling of cell ID.

The 8 hypotheses can be used to indicate the 8 SS block index. For above 6 GHz NR, as the maximum SS block index is 64, additional 3 bits in NR-PBCH are needed to indicate this extra timing information of SS blocks and one more bit is used to indicate the half radio frame timing.

Denote the SS block index as X. X is 0~63 for above 6 GHz NR, 0~7 for 3~6 GHz NR and 0~3 for below 3 Ghz NR. Denote Y as the DMRS sequence number (0~7), and denote Z as the half frame timing index, Z=0 represent the first 5 ms frame and Z=1 represent the second 5 ms frame.

Denote "W" as the 3-bits number in NR-PBCH which represent extra information for SS block index in above 6 GHz NR. The indication of SS block index and half radio frame can be achieved by transmitting DMRS hypothesis number Y and NR-PBCH information W and Z. Note that here the DMRS hypothesis is different from the DMRS sequence. The same DMRS hypothesis may be mapped to different DMRS sequence because different cell ID may be scrambled on top of the PBCH DMRS. Details of the W. Details on mapping SS block index into PBCH and DMRS sequence can be shown in the following TABLE 2.

In one example, the half radio frame is indicated by two different scrambling of PBCH DMRS. In another example, the half radio frame is indicated by two different scrambling of PBCH. In yet, another example, the half radio frame is indicated by explicit bit in PBCH.

In some embodiments, indication of actual number of SS blocks is considered.

In NR, for frequency from 6 GHz to 52 GHz, the maximum number of SS blocks can be 64 in a SS burst set; for frequency from 3 GHz to 6 GHz, the maximum number of SS blocks can be 8; for frequency up to 3 GHz, the maximum number of SS blocks can be 4. The actually transmitted number of SS blocks can be smaller than the maximum number of SS blocks. Therefore, the gNB need to inform the actual transmitted number of SS blocks. After obtaining the information/indication from a gNB, a UE may be able to know where the SS blocks may be located in the nominal SS block locations defined by the SS block mapping pattern. There are different alternatives to indicate the actual number of SS blocks.

In one alternative, the actual number of SS blocks is indicated directly to a UE by either PBCH or RMSI or DCI. For example, 2 bits information for below 3 GHz, 3 bits information for NR from 3 GHz to 6 GHz, 6 bits information for NR above 6 GHz are transmitted either in PBCH/RMSI/SIB/RRC/MAC CE/DCI to a UE to indicate the actual number of SS blocks.

In another alternative, the actual number of SS blocks is quantized to X bits information and indicated to a UE, where X can be 2/3/4/5 bits. For example, for above 6 GHz NR, 3 bits information can be transmitted to a UE to indicate one of the actual number of SS blocks from the following set {8, 16, 24, 32, 40, 48, 56, 64}. In another example, 4 bits information can be transmitted to a UE to indicate one of the actual number of SS blocks from the following set {4, 8, 12, 16, 20, 24, 28, 32, 36, 40, 44, 48, 52, 56, 60, 64}.

In another example, 5 bits information can be transmitted to a UE to indicate one of the actual number of SS blocks from the following set {2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64}. For frequency from 3 GHz to 6 GHz, 2 bits information can be transmitted to a UE to indicated one of the following actual SS blocks {2, 4, 6, 8}. For frequency below 3 GHz NR, 1 bit information can be transmitted to a UE to indicate one of the following actual SS blocks {2, 4}.

In some embodiments, indication of actual SS blocks locations using bitmap or quantized bitmap is considered. In such embodiment, a bitmap is used to indicate the actual locations of SS blocks. In one alternative, the number of bits used to indicate the locations of SS blocks is equal to the maximum number of SS blocks for each frequency band.

For example, for up to 3 GHz, the bitmap is 4 bits; for frequency from 3 GHz to 6 GHz, the bitmap is 8 bits; for frequency above 6 GHz, the bitmap is 64 bits. Each bit in the bitmap corresponding to whether the SS block defined in the SS block mapping pattern is transmitted or not. For example, "1" in the bitmap means the corresponding SS block is transmitted; while "'0" in the SS block means the corresponding SS block is not transmitted. For example, if the bitmap for below 3 GHz is 1000, it means that only the first SS block defined in the SS block mapping pattern is transmitted and other SS block is not transmitted. A UE may know the actual transmitted SS block by counting the total number of "1"s in the bitmap. The bitmap can be transmitted in RRC/DCI/SIB/RMSI.

In another alternative, the number of bits used to indicate the locations of SS blocks in smaller than or equal to the maximum number of SS blocks for each frequency band, i.e., the transmission of two or more consecutive SS blocks is represented by 1 bit. In this way, the overhead of bit-map can be compressed. For example, for above 6 GHz band, 32 bits of bitmap can be used and $i^{th}$ bit in the bitmap (i= 1, 2, . . . , 32) may represent whether (i−1)×2 and (i−1)×2+1 SS blocks are transmitted or not, here we assume the index of SS blocks are {0, 1, 2, . . . , 63}.

In another example, for above6 GHz, 16 bits of bitmap can be used and $i^{th}$ bit in the bitmap (i=1,2, . . . , 16) may represent whether (i−1)×4, (i−1)×4+1, (i−1)×4+2 and (i−1)×4+3 SS blocks are transmitted or not. In another example, for above 6 GHz, 8 bits of bitmap can be used and $i^{th}$ bit in the bitmap (i=1,2, . . . , 8) may represent whether (i−1)×8, (i−1)×8+1, (i−1)×8+2, (i−1)×8+3, (i−1)×8+4, (i−1)×8+5, (i−1)×8+6 and (i−1)×8+7 SS blocks are transmitted or not.

Furthermore, when 8 bit bitmap is used, the $i^{th}$ bit in the bitmap can indicate whether the SS blocks with the same 3-bit timing indication in PBCH payload is transmitted or not. In another example, for frequency from 3 GHz to 6 GHz, 4-bit bitmap is used and $i^{th}$ bit in the bitmap (i=1,2, . . . , 4) may represent whether (i−1)×2, (i−1)×2+1 SS blocks are transmitted or not.

For frequency above 6 GHz, 4-bit bitmap is used and $i^{th}$ bit in the bitmap (i=1, 2, . . . , 4) may represent whether (i−1)×16, (i−1)×16+1, (i−1)×16+2, (i−1)×16+3, (i−1)×16+4, (i−1)×16+5, (i−1)×16+6, (i−1)×16+7, (i−1)×16+8, (i−1)×16+9, (i−1)×16+10, (i−1)×16+11, (i−1)×16+12, (i−1)×16+13, (i−1)×16+14 and (i−1)×16+15 SS blocks are transmitted or not. The actual SS blocks may be mapped consecutively from the beginning of the nominal SS block locations defined by the SS block mapping pattern.

In some embodiments of indication of SS blocks using DCI is considered, DCI information is used to indicate whether SS blocks are transmitted in the coming slots for connected UE. When a UE reads the information from DCI, the UE can decide whether the SS blocks in the slot is transmitted or not. If the SS blocks in the slot are not transmitted, the UE may assume potential data or control can be transmitted in the corresponding PRBs. There are several configuration scenarios.

In one example, 2-bit configuration information/bitmap in DCI (referred to as "the indication bits") is provided to indicate whether SS blocks are transmitted or not, or which SS block is transmitted in the nominal SS block locations in the slot. The 2-bit configuration information and the corresponding 4 state of SS block transmission are dictated in the following TABLE 3.

TABLE 3

| Bit configuration information | |
|---|---|
| 2-bit configuration/bitmap in DCI | SS block transmission |
| 00 | No SS blocks are not transmitted in the scheduled PDSCH |
| 01 | Only the first SS block is transmitted (a UE may rate match around the REs corresponding to the first SS block that overlaps with the allocated PDSCH) |
| 10 | Only the second SS block is transmitted (a UE may rate match around the REs corresponding to the second SS block that overlaps with the allocated PDSCH) |
| 11 | Two SS blocks are transmitted (a UE may rate match around the REs corresponding to the two SS blocks that overlaps with the allocated PDSCH) |

Figure 12A:
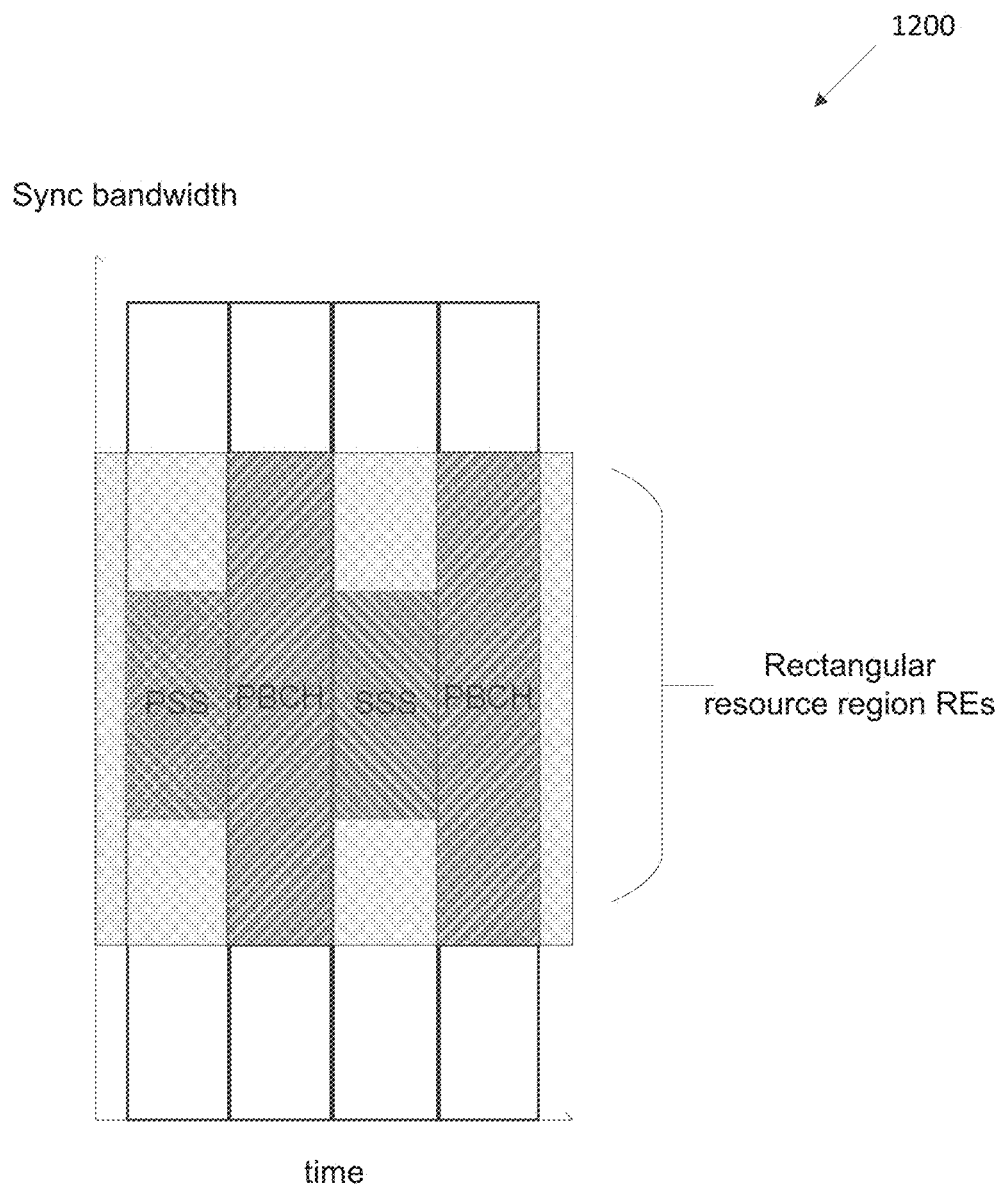
FIG. 12A illustrates an example PBCH BW according to embodiments of the present disclosure.

FIG. 12A illustrates an example PBCH BW 1200 according to embodiments of the present disclosure. An embodiment of the PBCH BW 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In one example, when the UE is indicated to rate match around REs corresponding to an SS block, the UE may assume that the SS block occupies a rectangular resource region comprising 4 consecutive OFDM symbols and 288 REs that correspond to the PBCH BW shown in FIG. 12A.

Figure 12B:
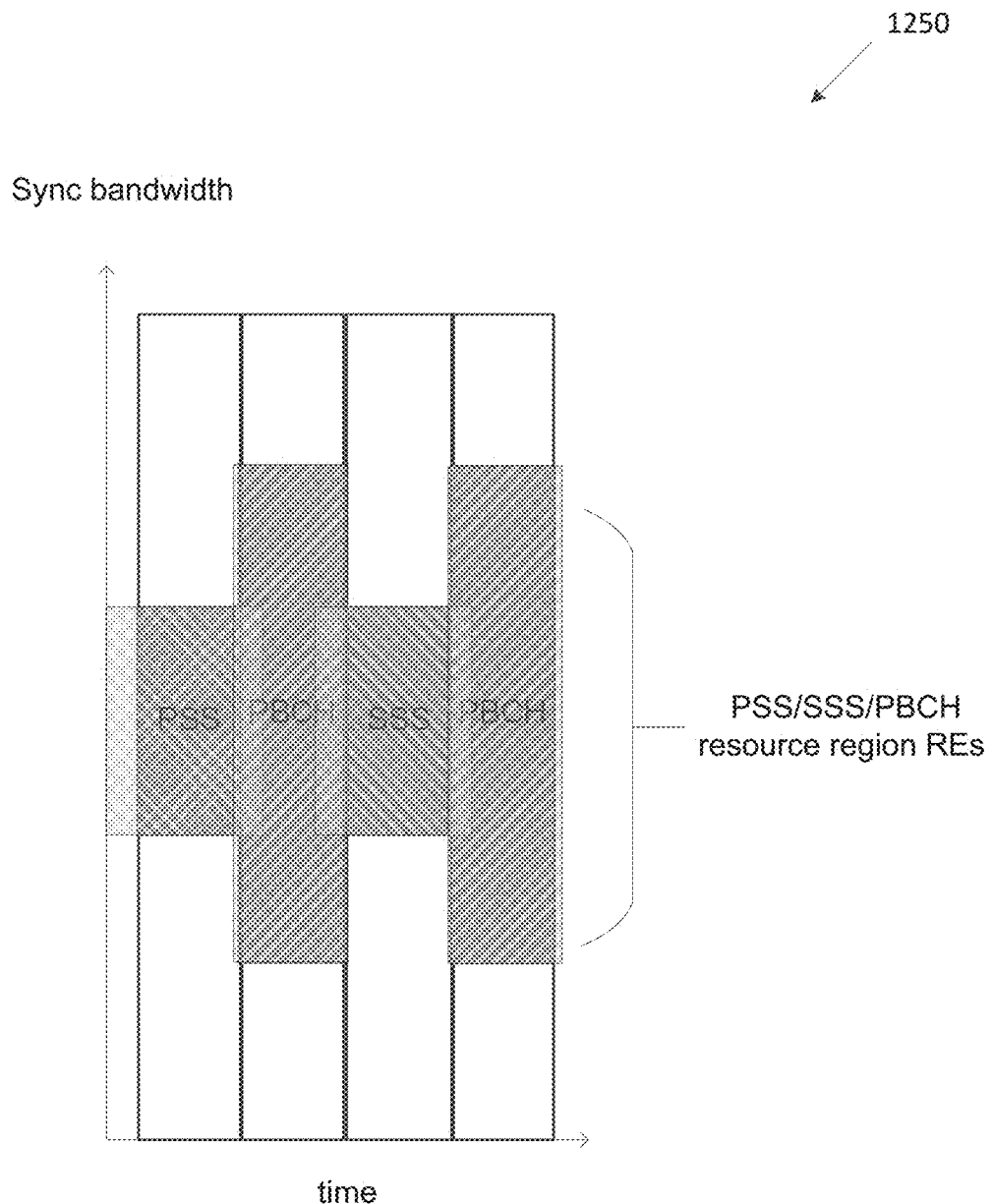
FIG. 12B illustrates example PSS/SSS OFDM symbols according to embodiments of the present disclosure.

FIG. 12B illustrates example PSS/SSS OFDM symbols 1250 according to embodiments of the present disclosure. An embodiment of the PSS/SSS OFDM symbols 1250 shown in FIG. 12B is for illustration only. One or more of the components illustrated in FIG. 12B can be implemented in specialized circuitry configured to perform the noted functions or one or more of the components can be implemented by one or more processors executing instructions to perform the noted functions. Other embodiments are used without departing from the scope of the present disclosure.

In another example, when the UE is indicated to rate match around REs corresponding to an SS block, the UE may assume that the SS block occupies the PSS/SSS/PBCH REs only (PSS/SSS/PBCH resource region). In this case, the UE can assume that the network transmits PDSCH data in the BW not mapped with PSS/SSS in PSS/SSS OFDM symbols shown in FIG. 12B.

In yet another example, "reserved resources" may be rate matched around similarly as "SS blocks" in this embodiment. A UE is configured with a number of reserved resources. For a PDSCH scheduled in a slot, one or more reserved resources among the configured reserved resources overlap with the scheduled PDSCH. The "configured reserved resources" in this method may also include potential SS block locations. Then, the network can indicate by DCI whether at least one of the one or more reserved resources may be rate matched around or not, e.g., by the above table. Here, the "reserved resources" may be used for forward compatibility reasons, and the use of the resources can be dynamically decided and indicated by the network to the UE.

In yet another example, when the UE is indicated to rate match around REs corresponding to an SS block, the UE may assume that the SS bock occupies the 12 RB s for PSS/SSS OFDM symbol while 24 RBs for two PBCH OFDM symbols. In this case, the UE can assume that the network transmits PDSCH data in the BW not mapped with PSS/SSS in PSS/SSS OFDM symbols.

In yet another example, 4-bit configuration information/bitmap in DCI is provided to indicate whether four SS blocks are transmitted in the nominal SS block locations in two consecutive special slots. A special slot here is defined as the slot where SS blocks can be mapped according to the SS block mapping pattern.

In yet another example, 2N-bit configuration information/bitmap in DCI is provided to indicate whether 2N SS blocks are transmitted in the nominal SS block locations if N special slots are aggregated. Each bit in the 2N-bit configuration information/bitmap may indicate whether the corresponding SS block is transmitted or not.

In yet another example, N-bit configuration information/bitmap in DCI is provided to indicate whether 2N SS blocks are transmitted in the nominal SS block locations if N special slots are aggregated. Each bit in the N-bit configuration information/bitmap may indicate whether the corresponding two SS blocks in the special slot are transmitted or not.

The indication bit may or may not present dependent on the slot type. For example, if a PDCCH in a CORESET is transmitted in a slot whose slot number corresponds to the one for which SS blocks can be transmitted, the indication bits are present in the PDCCH; otherwise the indication bits do not present in the PDCCH.

In some embodiments of network-wide and band-specific indication of actually transmitted SS blocks, a UE is indicated by the network a network-wide, band-specific information of the super set of SS block positions that are commonly applicable to all the cells belonging to the network in the same band. The super set may be alternatively referred to as "SS measurement set." The super set of SS block positions is a subset of the band-specific SS block positions defined in the standards specification.

Alternatively, a network-wide upper bound of actual number of SS blocks, M, can be configured band-specifically by the network, of which value is less than or equal to the maximum number of SS blocks defined in the spec. The configuration of super set or the upper bound value can be conveyed in an MIB, an SIB or an RRC message. The benefits include UE power saving and network overhead reduction and signaling overhead saving. Given the superset configured, a UE can be indicated of the actual SS block locations for the serving cell for the rate matching purpose, and/or for neighbor cells for mobility measurement purpose.

The configured actual SS block locations may be a subset of the super set. The actual SS block locations may be cell-specific, and hence the information can be provided per cell. The actual SS block locations can be provided by means of a bitmap; suppose that the super set has M SS blocks; then the bitmap size is M bits, and an $i^{th}$ bit indicates whether an $i^{th}$ SS block among the M SS blocks are turned on or turned off.

Figure 13:
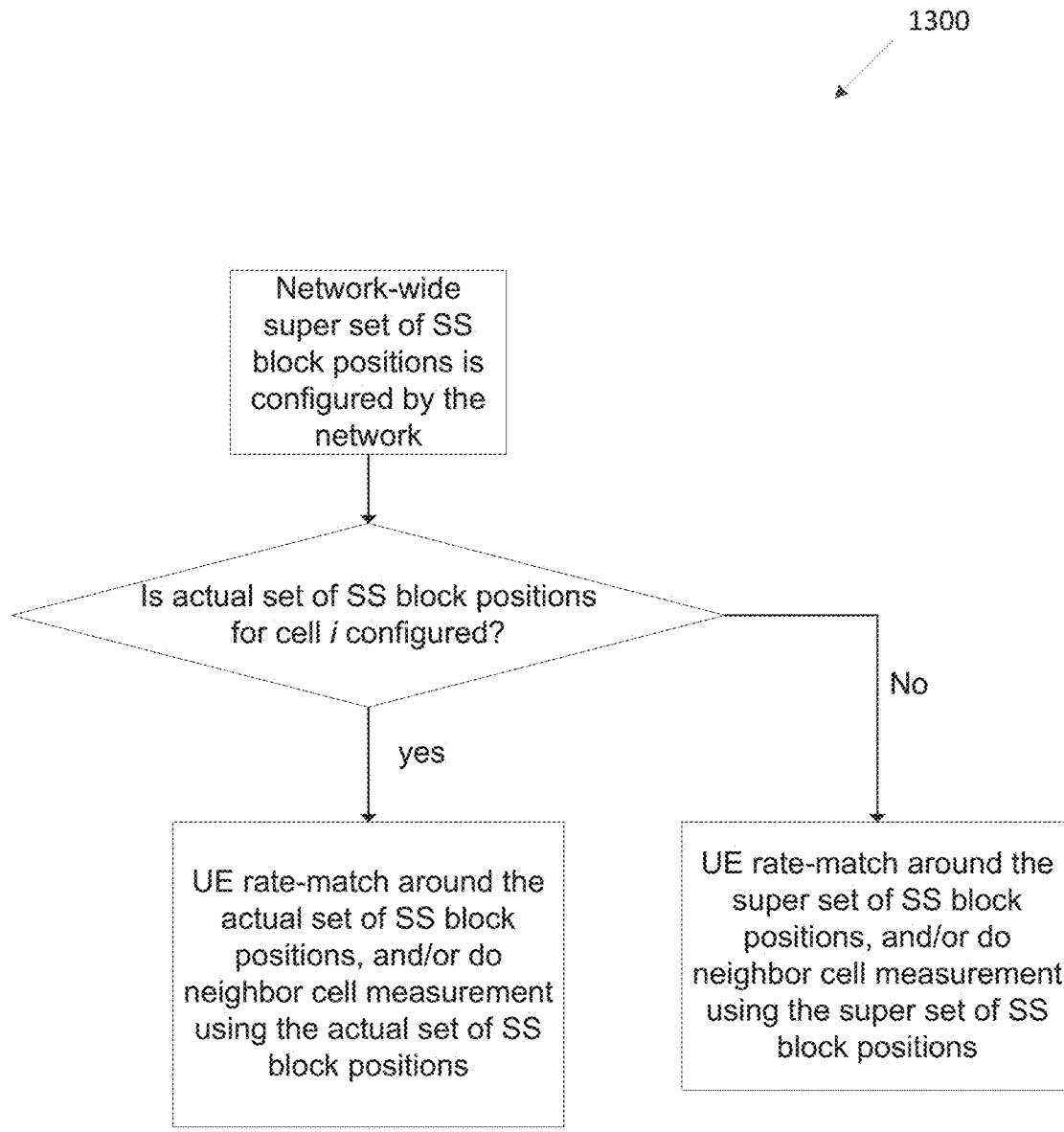
FIG. 13 illustrates a flow chart of a method for configuring band specific maximum number of SS blocks according to embodiments of the present disclosure.

FIG. 13 illustrates a flow chart of a method 1300 for configuring band specific maximum number of SS blocks according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

The actual SS block locations can be provided in MIB/SIB/RRC. If no further information is provided than the super set, the UE may assume that the actual SS block locations for rate matching and measurement is according to the super set of SS block locations. A similar design is applicable when the upper bound number is configured. Details of the UE' process based on the configuration of super set of SS block positions is shown in FIG. 13.

Figure 14:
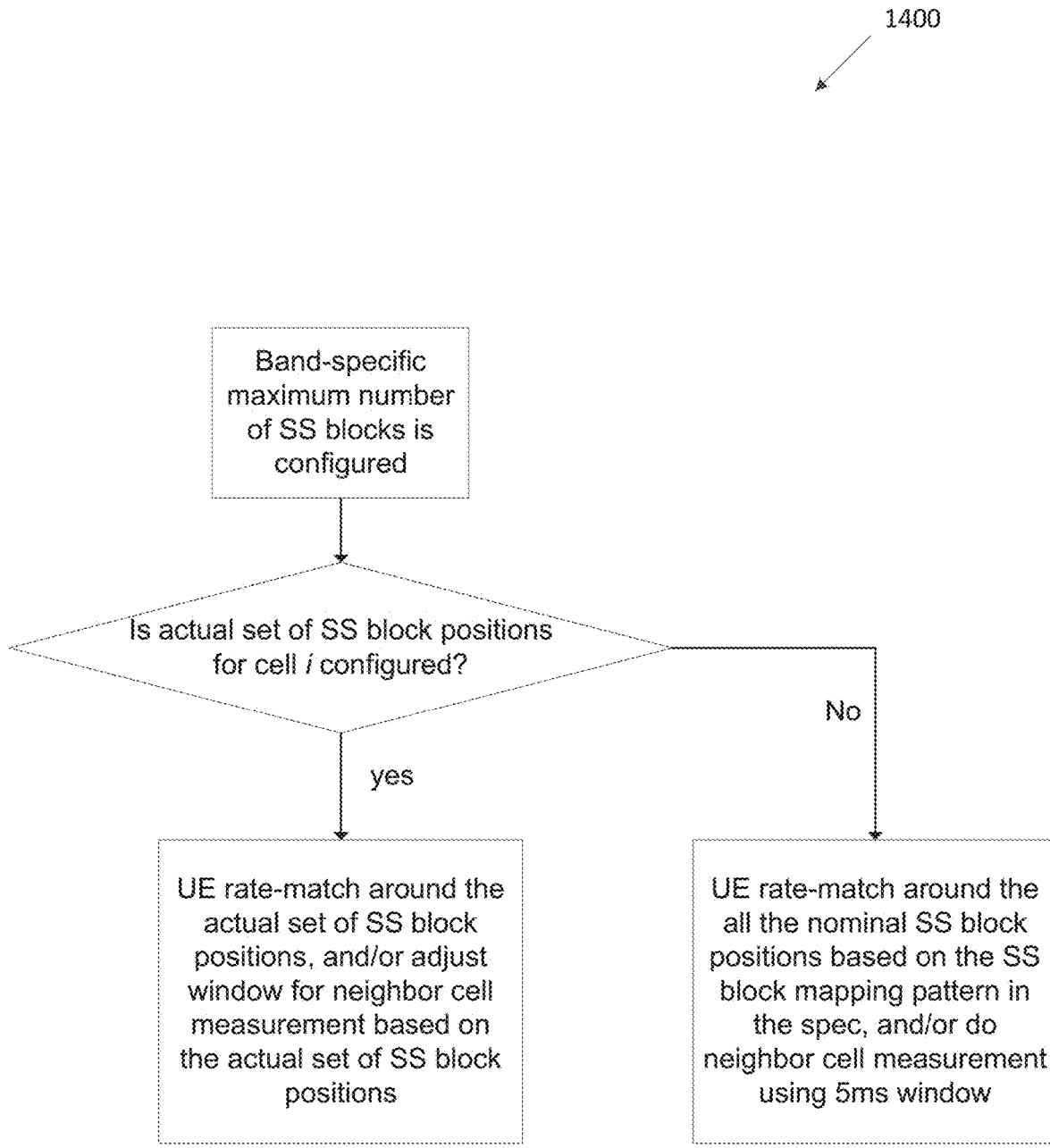
FIG. 14 illustrates a flow chart of a method for indicating the network-wide and band-specific information.

FIG. 14 illustrates a flow chart of a method 1400 for indicating the network-wide and band-specific information. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

Details of the UE' process based on the configuration of band specific maximum number of SS block blocks is shown in FIG. 14.

There may be several alternatives to indicate the network-wide and band-specific information of actual number of SS block locations.

The first alternative is to indicate the network-wide and band-specific SS block locations by an actual number of SS blocks, M. In this case, M SS blocks may be mapped to the first M nominal SS block locations according to the SS block mapping pattern. For example, maximum 48 SS blocks are proven to be sufficient for all cells for a band whose maximum number of SS blocks is 64 defined by the spec in the networks. Then the value of 48 may be indicated to a UE by a gNB.

A UE may know that both the serving cell and the neighbor cell may not use more than 48 SS blocks and the UE can reduce the UE's measurement window during RRM measurement or neighbor cell measurement to measure no more than 48 SS blocks. If further information of the actual number of SS blocks of a cell is provided, the UE can further reduce the UE's measurement efforts. The information can be provided for the serving cell and/or a selected set of neighbor cells. For example, the network-wide maximum number of SS block can be 48, while the actual number of a cell's SS blocks is 32. Then the UE can further reduce the UE's measurement window for the cell to be 32 to further reduce the power consumption and complexity. If no numbers are provided for a neighbor cell, the UE may assume the upper bound number of SS blocks for the mobility measurement.

The second alternative is to indicate the network-wide and band-specific SS block locations by bitmap or quantized bitmap. For above 6 GHz, 64 or 32 or 16 or 8 or 4 bits are transmitted from the network to a UE to indicate UE the network-wide maximum number of SS blocks. If 64-bit bitmap is used, the $i^{th}$ bit in the bitmap may indicate whether the SS block i in the SS block mapping pattern may be transmitted or not. If 32-bit bitmap is used, the $i^{th}$ bit in the bitmap may indicate whether the SS blocks (i−1)×2 and (i−1)×2+1 in the SS block mapping pattern may be transmitted or not. If 16-bit bitmap is used, the $i^{th}$ bit in the bitmap may indicate whether the SS blocks (i−1)×4, (i−1)×4+1, (i−1)×4+2 and (i−1)×4+3 in the SS block mapping pattern may be transmitted or not. If 8-bit bitmap is used, the $i^{th}$ bit in the bitmap may indicate whether the SS blocks (i−1)×8, (i−1)×8+1, (i−1)×8+2, (i−1)×8+3, (i−1)×8+4, (i−1)×8+5, (i−1)×8+6 and (i−1)×8+7 in the SS block mapping pattern may be transmitted or not.

In some embodiments of separate indication of actual SS block positions for mobility measurements and for rate matching, the actual SS block positions are indicated separately indicated for mobility measurement purpose and for rate matching purpose.

For the mobility measurement purpose, the subsequent configurations and a UE impacts are explained below. In one example, there is a band-specific full SS burst set, specified in LTE specification. In another example, a UE may be additionally indicated with a subset of the full SS burst set, which is referred to as "SS measurement set." The measurement set is valid for all the cells in the same carrier frequency, i.e., carrier specific. The motivation of introducing this is when the network decides to implement only small number of SS blocks in the carrier frequency, it would be good for a UE to know this information to reduce UE burden on the RSRP measurements. The UE burden reduction could be explained as in the following: if a UE is configured such that a certain SS block location may never have SS block, a UE does not need to measure RSRP in that SS block location.

In yet another example, a UE may also additionally be configured with an SMTC duration. In yet another example, when both "SS measurement set" and SMTC duration are configured, a UE may monitor RSRPs belonging to the "SS measurement set" in the SMTC duration only.

While the SMTC is used for mobility measurement purpose, the actually transmitted SS blocks in a serving cell may not the same as indicated by the SMTC. For example, the network may configure SMTC so that a UE does mobility measurement with 80 msec periodicity for IDLE and CONNECTED UEs. However, the network may still transmit the SS blocks with 20 msec periodicity to support initial access UEs. In this case, a CONNECTED UE receiving PDSCHs in the serving cell may be able to rate-match around the SS blocks transmitted with 20 msec periodicity, rather than 80 msec periodicity. This motivates a separate indication of SS block periodicity for rate matching purpose, from the indication of the SS block periodicity in the SMTC.

In some embodiments, for PDSCH rate matching purpose, an SS block periodicity can be indicated, which is separately configured from the SMTC configuration. In addition, the SS blocks to rate match around in each SS burst set may not coincide with the SS measurement set.

In one example, an SS measurement set is provided for all the TRPs in a cell, and but a UE may not be able to detect energy in the resources for SS blocks in the measurement set from a subset of the TRPs. In such a case, the network may still decide to transmit PDSCH on those SS block time-frequency resources for the UE, and the UE may be allowed not to rate match around those time-frequency location, although the time-frequency location still belongs to a measurement set.

The network may indicate to the UE a separate set of SS blocks, "an SS rate-matching set," which is subset of either the full SS burst set or the SS measurement set. The expected UE behavior upon receiving a DL assignment on a slot belonging to the SS measurement set would be as per the following: to rate match the UE's PDSCH around the SS block(s) if the SS block(s) belong to the rate-matching set; and/or to not rate match the UE's PDSCH around SS block(s) if the SS block(s) does not belong to the SS rate-matching set.

To facilitate this indication scheme, the UE may be indicated a separate set of SS blocks, "an SS rate-matching set," which is a subset of the full SS burst set, so that the UE rate matches PDSCH around the SS blocks indicated in the SS rate-matching set only. The indication can be conveyed in an SIB signaling, an RRC signaling, a MAC-CE signaling or a DCI signaling. In one alternative, a UE may/may assume that the SS rate-matching set corresponds to the activated SS blocks by MAC-CE.

In a result, a UE can be configured with parameters for an SS measurement set and parameters for an SS rate-matching set. The periodicity of the SS measurement set is the one provided by the SMTC configuration, while the periodicity for the SS rate-matching set is separately indicated from the one provided by the SMTC configuration.

The SS measurement set is a subset of an SS burst set, and the SS measurement set is indicated by SIB/RRC; and applicable to all the cells in the carrier frequency (i.e., it is configured band/carrier-frequency-specifically). The SS rate-matching set is configured for each serving cell by SIB/RRC/MAC-CE/DCI, and is a subset of the SS burst set. When configured with the SS rate-matching set, the UE may rate match around the SS block time-frequency locations belonging to the SS rate-matching set; and the UE may not rate match around the SS block time-frequency locations that do not belong to the SS rate-matching set.

In some embodiments of indication of actual SS block locations according to SS block mapping patterns, the indication of actual SS block locations is according to the SS block mapping patterns.

Figure 15:
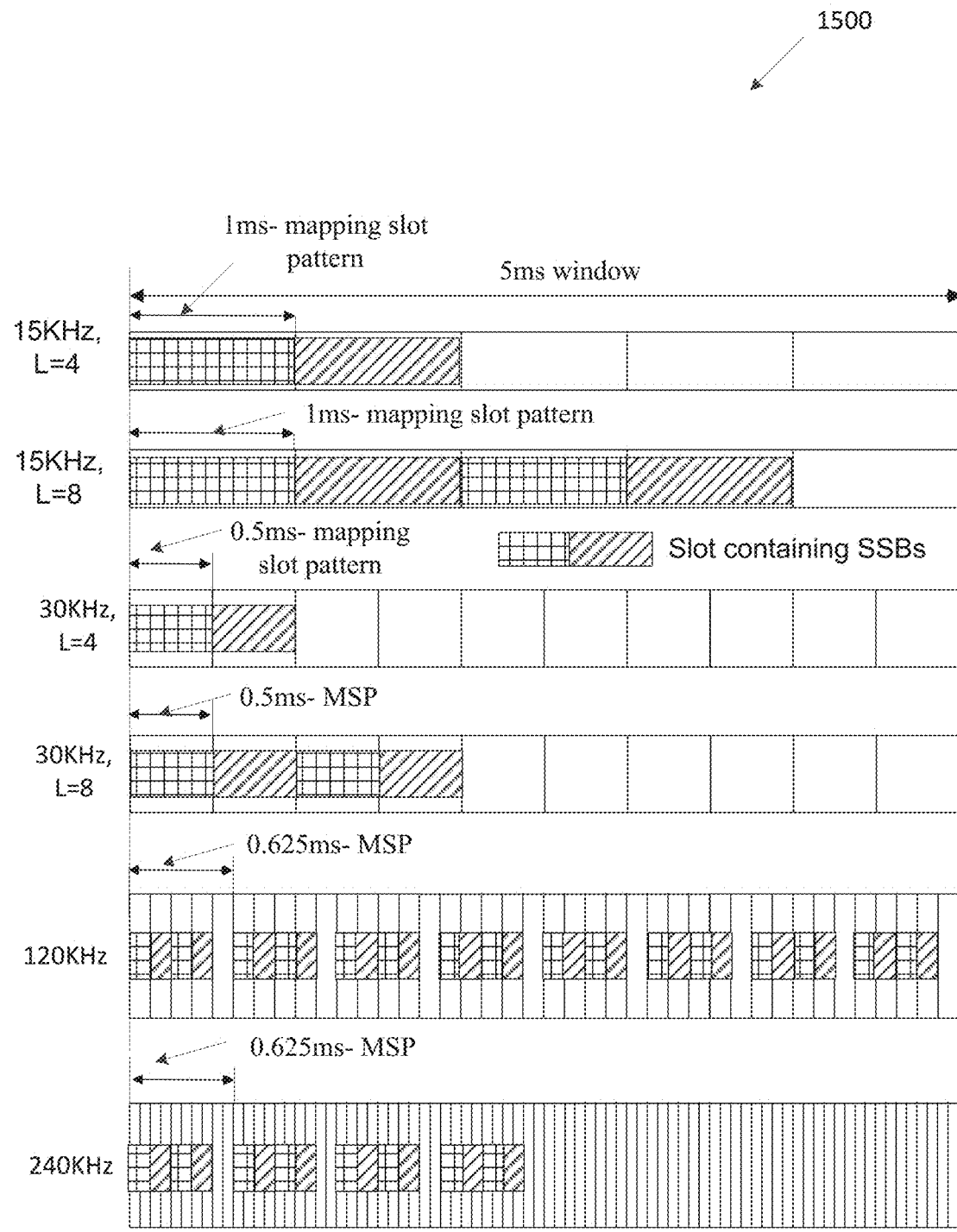
FIG. 15 illustrates an example mapping slot pattern according to embodiments of the present disclosure.

FIG. 15 illustrates an example mapping slot pattern 1500 according to embodiments of the present disclosure. An embodiment of the mapping slot pattern 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one alternative, a bitmap may be used to indicate whether the smallest repeated mapping slot patterns are transmitted. For example, when SCS=15 kHz and L=4, the smallest mapping slot pattern is 1 ms and there are total 21 ms-mapping slot patterns as shown in FIG. 15.

Therefore, 2-bit bitmap is used in PBCH/DCI/RMSI/SIB to indicate which mapping slot pattern is transmitted, where "00" in the bitmap means there is no 1 ms-mapping slot pattern transmitted; "01" in the bitmap means the second 1 ms-mapping slot pattern transmitted, "10" in the bitmap means the first 1 ms-mapping slot pattern transmitted; "11" in the bitmap means both 1 ms-mapping slot pattern transmitted.

In another example, when SCS=15 kHz and L=8, the smallest mapping slot pattern is 1 ms and there are total 41 ms-mapping slot patterns as shown in the FIG. 15. Therefore, 4-bit bitmap is used in PBCH/DCI/RMSI/SIB to indicate which 1 ms-mapping slot pattern is transmitted. The $i^{th}$ bit in the bitmap may indicate whether the corresponding $i^{th}$ 1 ms-mapping slot pattern is transmitted or not.

In another example, when SCS=30 kHz and L=4, the smallest mapping slot pattern is 0.5 ms and there are total 2 0.5 ms-mapping slot patterns as shown in the FIG. 15. Therefore, 2-bit bitmap is used in PBCH/DCI/RMSI/SIB to indicate which 0.5 ms-mapping slot pattern is transmitted. The $i^{th}$ bit in the bitmap may indicate whether the corresponding $i^{th}$ 0.5 ms-mapping slot pattern is transmitted or not.

In another example, when SCS=30 kHz and L=8, the smallest mapping slot pattern is 0.5 ms and there are total 4 0.5 ms-mapping slot patterns as shown in the FIG. 15. Therefore, 4-bit bitmap is used in PBCH/DCI/RMSI/SIB to indicate which 0.5 ms-mapping slot pattern is transmitted. The $i^{th}$ bit in the bitmap may indicate whether the corresponding $i^{th}$ 0.5 ms-mapping slot pattern is transmitted or not.

In another example, when SCS=120 kHz and L=64, the smallest mapping slot pattern is 0.625 ms and there are total 8 0.625 ms-mapping slot patterns as shown in the FIG. 15. Therefore, 8-bit bitmap is used in PBCH/DCI/RMSI/SIB to indicate which 0.625 ms-mapping slot pattern is transmitted. The $i^{th}$ bit in the bitmap may indicate whether the corresponding $i^{th}$ 0.625 ms-mapping slot pattern is transmitted or not.

In another example, when SCS=240 kHz and L=64, the smallest mapping slot pattern is 0.625 ms and there are total 4 0.625 ms-mapping slot patterns as shown in the FIG. 15. Therefore, 4-bit bitmap is used in PBCH/DCI/RMSI/SIB to indicate which 0.625 ms-mapping slot pattern is transmitted. The $i^{th}$ bit in the bitmap may indicate whether the corresponding $i^{th}$ 0.625 ms-mapping slot pattern is transmitted or not.

In some embodiments of UE operations after receiving actual SS block location information from the network, after receiving information on the actually transmitted SS blocks (e.g., by means of the actual number of SS blocks or bitmap or quantized bitmap or a combination of the actual number of SS blocks, SS block offset and SS block intervals), a UE may rate match around the SS blocks which are indicated to actually transmitted SS block positions or adjust the UE's measurement window for neighbor cell measurement.

Otherwise, the UE may assume the maximum number of SS blocks is used and may rate match around all nominal SS block locations or use the maximum 5 ms measurement window for neighbor cell measurement. For example, in the network where actual number of SS block is transmitted to a UE to indicate the actual positions of SS blocks, a UE may know that SS blocks may be mapped from the beginning of the nominal SS block positions defined in the spec.

To be specific, in this example, when the SCS is 120 kHz, when the UE receives that the actual transmitted SS blocks are 32. Then a UE may know that slots {0, 1, 2, 3, 5, 6, 7, 8, 10, 11, 12, 13, 15, 16, 17, 18} have SS blocks and that slots {20, 21, 22, 23, 25, 26, 27, 28, 30, 31, 32, 33, 35, 36, 37, 38} do not have SS blocks, and the corresponding time-frequency resources for the SS blocks can be used for data/control transmissions. Also, if this 32 actual SS blocks information is about a neighbor cell, the UE can use only 2.5 ms measurement window for this neighbor cell measurement.

In some embodiments of rate matching behavior within vs. outside the SMTC window/duration, a UE may be configured with SMTC windows for intra-frequency measurement. Within each SMTC window, the UE is configured to perform mobility or BM measurement based on SS blocks. During the mobility measurement, a UE may perform Rx beam sweeping to find the best Rx beam for each Tx beam. In this case, a UE may be allowed to use an Rx beam for receiving the OFDM symbol with SS blocks, which could be different from an Rx beam indicated by the network for receiving the PDSCH data.

As seen in the aforementioned embodiments of the present disclosure, a UE may be indicated with transmitted SS block positions, which may also be referred to "activated SS block positions." The UE may rate match around the transmitted SS block positions, which recurs with an indicated periodicity. However, the detailed UE behavior to rate match around the transmitted SS block positions may be differently specified to allow for Rx beam sweeping during the SMTC window for mobility measurement, and to allow for the best DL signal reception during the non-SMTC window/duration.

Given that the network and TRPs may have multiple TXRUs to support multiple digital beams in a same OFDM symbol, it may be allowed that the UE rate match around the actual transmission BW of the SS blocks as in the aforementioned embodiments. At the same time, it may also be allowed that the UE rate match around the activated BWP BW of the SS block OFDM symbols, to cope with the cases where the network/TRP has a single TXRU, in which case the analog beamforming constraints are still applicable.

Hence, it seems necessary to introduce a signaling to govern the rate matching behavior around activated SS blocks. The signaling can be one-bit RRC or MAC-CE signaling, which specifies the UE behavior to rate match around the activated SS blocks. The indication, SS-blockrate-matching-indication, is to inform the UE to rate match around either (1) the activated BWP BW of the SS block OFDM symbols, or (2) SS block BW. This behavior can be maintained as long as a UE does not do mobility/BM measurement.

In case a UE performs mobility/BM measurement, the UE may be allowed to perform Rx beam sweeping, in which case the behavior (2) is not applicable. Hence, it is also proposed that the rate matching behavior around the SS blocks is overridden (i.e., the behavior (1) is used) for the PDSCH received within the SMTC window for the intra-frequency measurement. Outside the SMTC window, of course, the rate matching behavior is based on the indication, i.e., either (1) or (2).

A UE is to regard the SMTC durations configured for the inter-frequency measurement as measurement gaps, while the UE is still allowed to receive PDSCH during the SMTC durations configured for the intra-frequency measurement, based on applicable restrictions, e.g., with assuming rate matching and RE-mapping of the PDSCH around the whole activated BWP BW of the activated SS block OFDM symbols.

The same mechanism (i.e., rate match around the whole BW) is also applicable to P/SP-CSI-RS configured for beam management (this may correspond to a specific CSI-RS pattern index of 1 port resource) to allow for Rx beam sweeping. Alternatively, a UE may be explicitly configured with two-state indication, whether to rate match around (1) the whole BW or (2) the configured CSI-RS RE locations.

For intra-frequency measurement, a UE has been allowed to receive PDSCH/PDCCH during the measurement duration in LTE, and the same principle is good to be maintained. However, in case a UE conducts Rx beam sweeping for the neighbor cell's SSB reception, the UE is not likely to be able to receive PDSCH/PDCCH in the SSB OFDM symbols with a good Rx beam for the serving cell.

This issue can be analyzed differently for the two cases: (1) when the network synchronization is indicated; and (2) when the network synchronization is not indicated. In case (1) in which the network synchronization is indicated, the UE may still be able to receive PDSCH/PDCCH in the rest of OFDM symbols not being used for the SSB mapping. For this purpose, the SSB set composition indicated for the mobility measurement purpose may be used (not the one configured for the rate matching purpose indicated in RRC/RMSI).

In case (2), in which the network synchronization is not indicated, a UE may need to try to receive neighbour cells' SSBs in those OFDM symbols not used for the serving cell's SSB transmissions. To allow UE's Rx beam sweeping, it does not seem to be possible to transmit any PDSCH data during the SMTC when synchronous network is not indicated. Hence, in case (2), it is proposed for a UE to treat the entire intra-frequency SMTC duration as measurement gap.

In some embodiments, in intra-frequency SMTC durations, if network synchronization is indicated, the scheduled PDSCH may be rate matched around the whole BWP BW corresponding to SSB OFDM symbols. This is denoted as behavior 1. In such embodiments, for this purpose, the SSB set composition indicated for the mobility measurement purpose may be used (not the one configured for the rate matching purpose indicated in RRC/RMSI). In such embodiments, a UE is allowed to perform Rx beam sweeping in SSB OFDM symbols during the SMTC durations for the intra-frequency measurement.

In some embodiments, in intra-frequency SMTC durations, if network synchronization is not indicated, a UE may treat the whole intra-frequency SMTC duration as measurement gap, i.e., the UE does not expect to receive PDSCH/PDCCH during the intra-frequency SMTC duration. This is denoted as behavior 2.

In some embodiments, outside the intra-frequency SMTC durations, the UE uses the serving-cell SSB set composition information for rate matching, which is indicated by RRC/RMSI. The rate matching BW (whole BWP BW vs. PBCH BW) can be determined according to the two-state indication.

Alternatively, the UE may be explicitly indicated by RRC or SIBx for the UE behavior during intra-frequency SMTC durations: whether to rate match around the indicated SS blocks (i.e., behavior 1) or assume the SMTC duration as measurement gap (i.e., behavior 2), per frequency carrier (or component carrier, or a serving cell).

Alternatively, the UE may be configured to use the union of two SSB sets (a first and a second SSB set) for the rate matching around PDSCHs in the intra-frequency SMTC durations, wherein the first SSB set is the one configured the purpose of serving cell rate matching (i.e., RRC configuration of SSB-transmitted or RMSI configuration of SSB-transmitted-SIB1), and the second SSB set is the one configured for the purpose of mobility measurement.

Figure 16A:
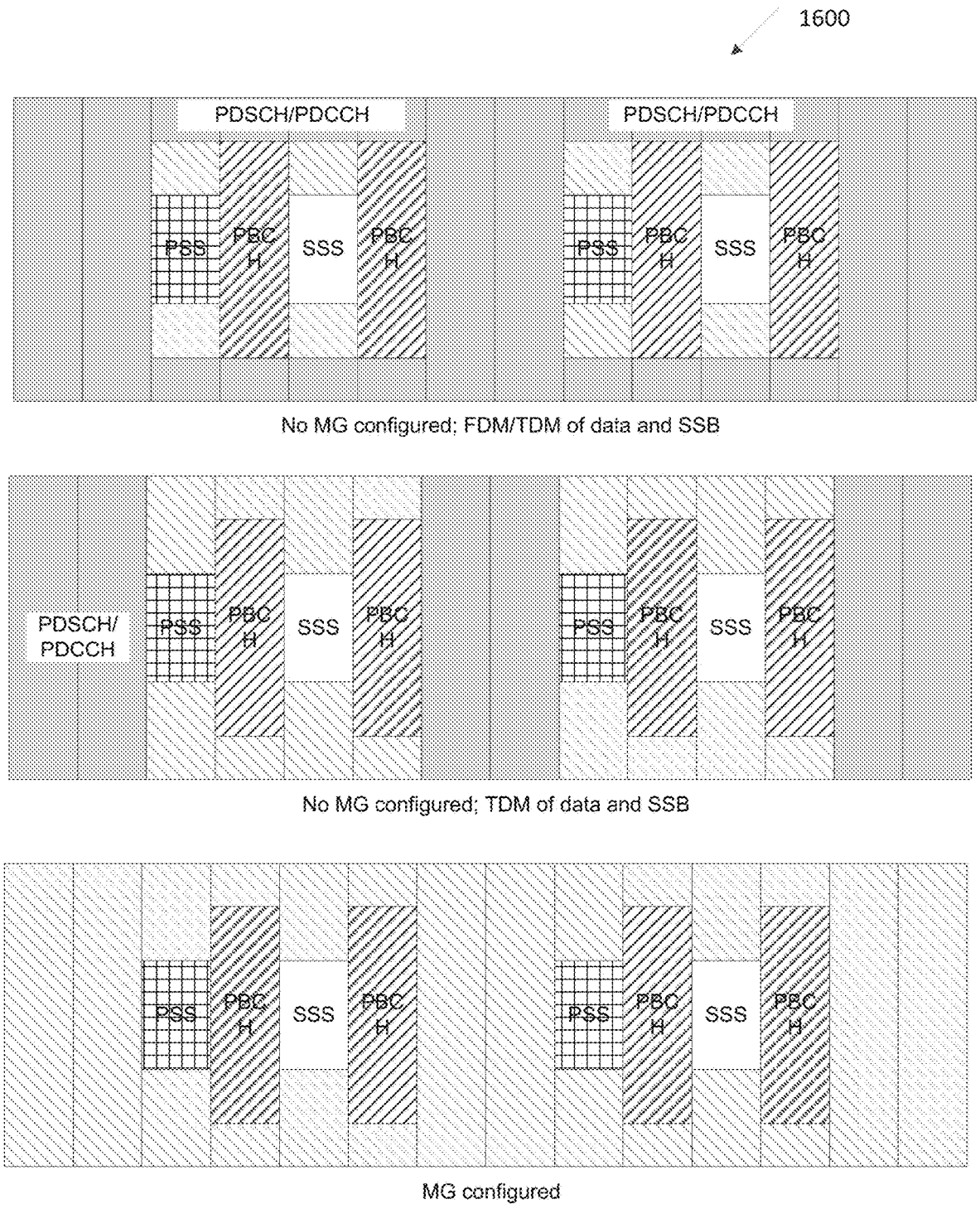
FIG. 16A illustrates an example measurement gap configuration according to embodiments of the present disclosure.

FIG. 16A illustrates an example measurement gap configuration 1600 according to embodiments of the present disclosure. An embodiment of the measurement gap configuration 1600 shown in FIG. 16A is for illustration only. One or more of the components illustrated in FIG. 16A can be implemented in specialized circuitry configured to perform the noted functions or one or more of the components can be implemented by one or more processors executing instructions to perform the noted functions. Other embodiments are used without departing from the scope of the present disclosure.

The UE's assumption for a slot dependent upon whether MG (measurement gap) is configured for the slot or not is shown in FIG. 16A.

In some embodiments, the overriding rate matching behavior in the SMTC window duration is determined according to at least one of MG configuration, UE capability (related to Rx beam sweeping) and carrier frequency for the SMTC window.

When MG is not configured, a UE is allowed receive data FDM'ed and/or TDM'ed with the SSB. When the UE does not perform Rx beam sweeping, the UE may be able to receive FDM/TDM'ed data and SSB, as shown in FIG. 16A.

When a UE does perform Rx beam sweeping, the UE can only be able to receive TDM'ed data and SSB, as shown in FIG. 16A. The UE may inform the network about the UE capability of Rx beam sweeping. Then, if a UE has indicated that the UE performs Rx beam sweeping, the UE may assume TDM'ed data and SSB in the SMTC window durations (as shown in FIG. 16A; otherwise, the UE may assume FDM/TDM'ed data and SSB in the SMTC window durations (as shown in FIG. 16A). Alternatively, the UE assumption is dependent upon the carrier frequency (i.e., the configuration of the UE assumption is band-specific, and specified by LTE specification). For example, for a first frequency band (e.g., for sub-6 GHz BW), A UE assumption in the SMTC window duration may be FDM/TDM as shown in FIG. 16A; and for a second frequency band (e.g., for over6 GHz BW), a UE assumption in the SMTC window duration may be TDM as shown in FIG. 16A. When MG is configured, a UE is not expected to receive PDSCH/PDCCH during the whole slot belonging to the measurement gap duration.

Figure 16B:
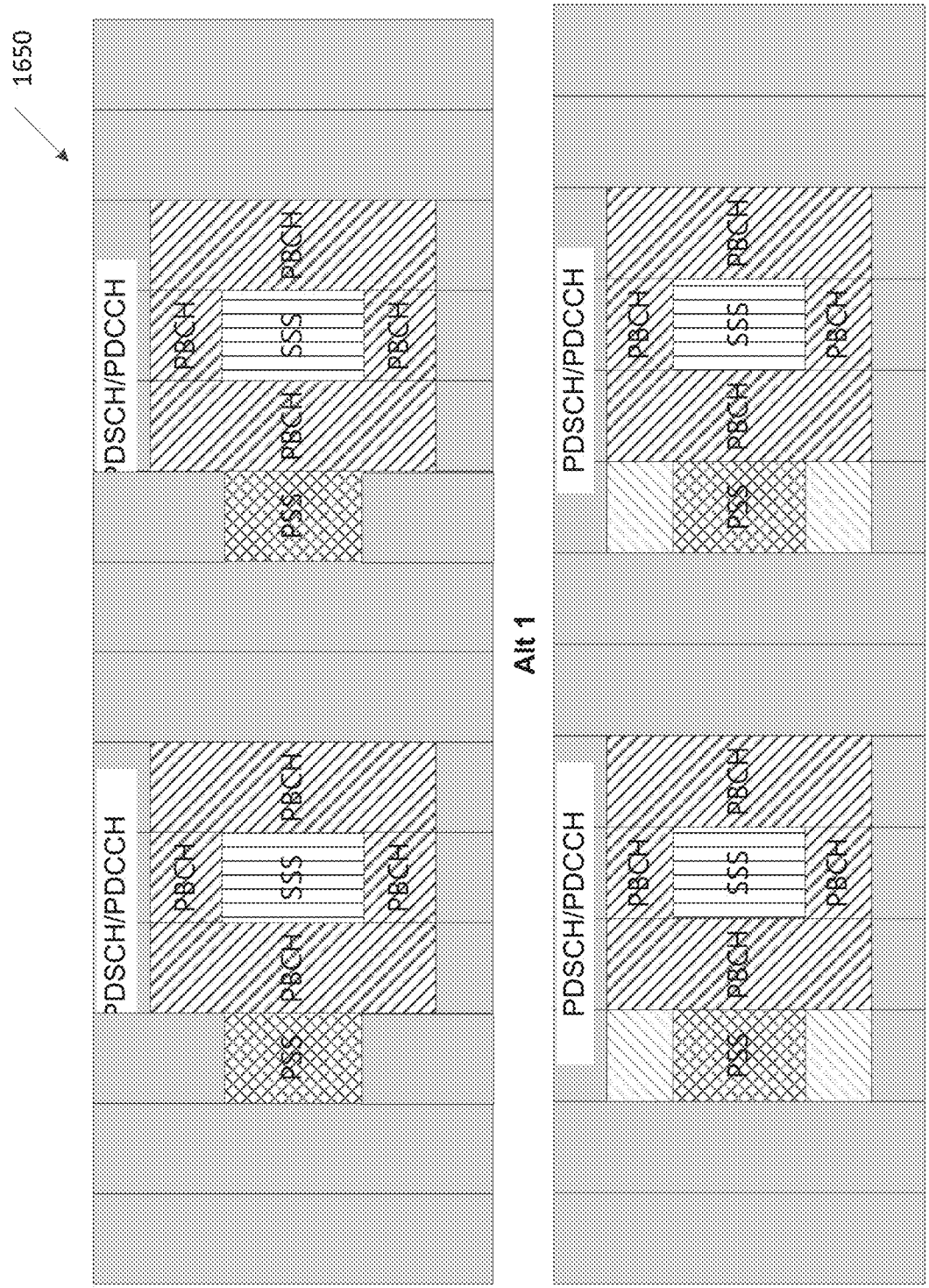
FIGS. 16B and 16C illustrate configurations for rate matching around SSBs according to embodiments of the present disclosure.
Figure 16C:
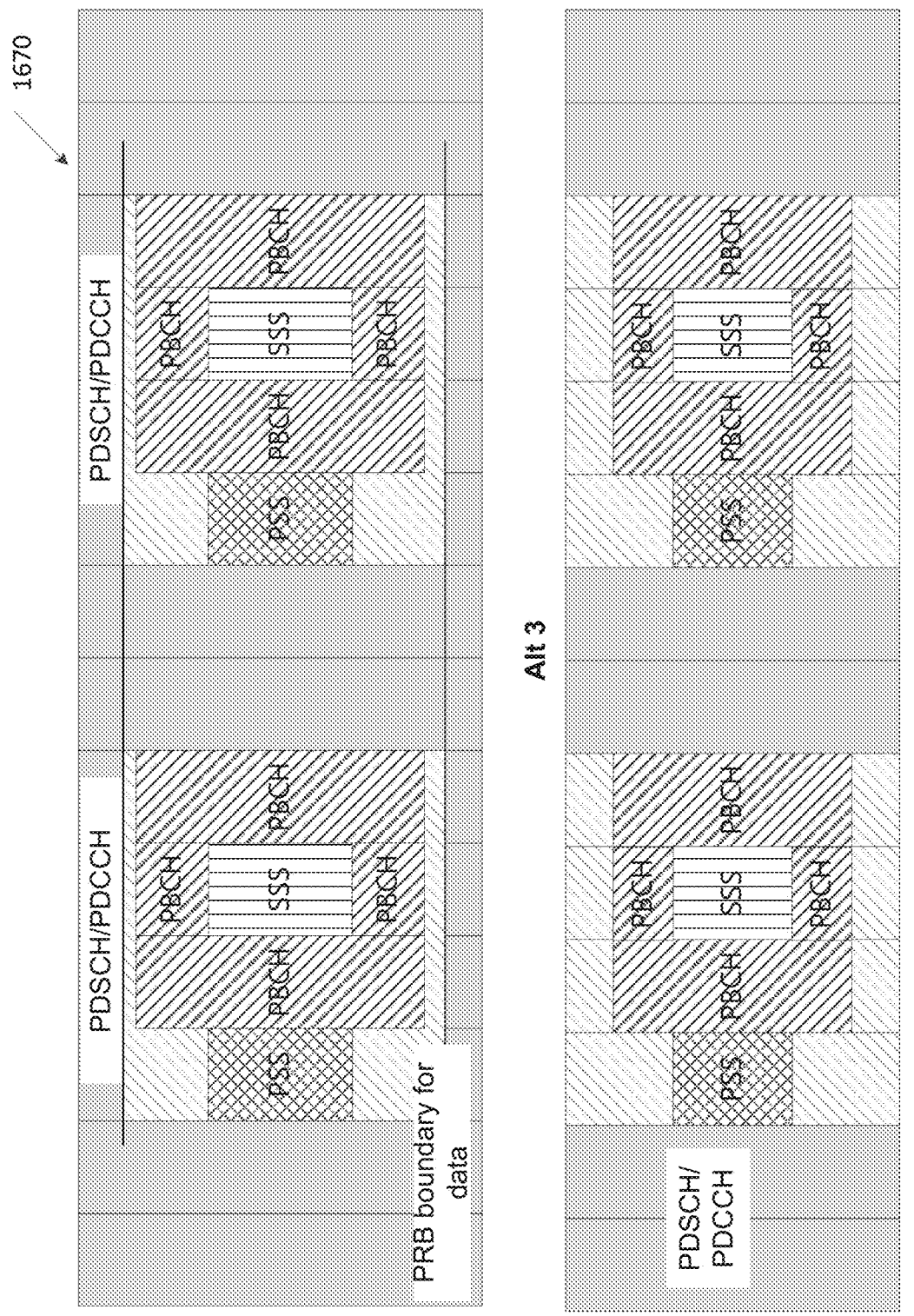

FIGS. 16B-16C illustrate configurations for rate matching around SSBs according to embodiments of the present disclosure. An embodiment of the configurations for rate matching around SSBs shown in FIGS. 16B-16C are for illustration only. One or more of the components illustrated in FIGS. 16B-16C can be implemented in specialized circuitry configured to perform the noted functions or one or more of the components can be implemented by one or more processors executing instructions to perform the noted functions. Other embodiments are used without departing from the scope of the present disclosure.

In some embodiments, rate matching band width is configured around the REs in the SS block OFDM symbols as shown by alternative 1 (1650) in FIG. 16B.

In some embodiments, rate matching band width is configured around the PBCH BW in the SS block OFDM symbols as shown by alternative 2 (1660) in FIG. 16B

In some embodiments, rate matching band width is configured at the data PRB boundaries around the PBCH BW in the SS block OFDM symbols as by alternative 3 (1670) shown in FIG. 16C.

In some embodiments, rate matching band width is configured around the whole SS block of OFDM symbols as shown by alternative 4 (1680) in FIG. 16C.

In some embodiments, rate matching behavior dependent on CORESET or search space is considered. In the present disclosure, a SS burst set composition may refer to SS block mapping in a half frame.

In some embodiments, there are three different SS burst set composition is considered at the UE side: full SS burst set composition of the carrier band, a first SS burst set composition which is indicated by the RMSI; and a second SS burst set composition indicated by the RRC.

When the UE receives a PDSCH, the UE may apply the rate matching and RE mapping around the SS blocks, based on the selected SS burst set composition.

A DCI carries at least an RNTI field, which indicates for what purpose DCI is used for. Some examples are explained as in the following. If C-RNTI (also known as a UE-ID) is used, the PDSCH/PUSCH scheduled by the DCI is a UE-specific dedicated one. If SI-RNTI is used, the PDSCH scheduled by the DCI is a cell-specific one, and the PDSCH carries the system information. If RA-RNTI is used, the PDSCH scheduled by the DCI is used for RACH responses.

The DCI containing C-RNTI is received during CONNECTED mode. The DCI containing SI-RNTI, P-RNTI can be received in all of CONNECTED and IDLE mode, and also during initial cell selection. The DCI containing temporary C-RNTI, RA-RNTI can be received during RACH procedure, either in initial cell selection, or during handover.

Seeing the use cases of different RNTI types for different purposes, it is proposed that the types of RNTI contained in DCI determine the rate matching behavior for the corresponding PDSCH/PUSCH. When a first type of RNTI is used for a DCI, the rate matching and RE mapping for the scheduled PDSCH/PUSCH is based on a first indicated value; and when a second type of RNTI is used for a DCI, based on a second indicated value.

During the initial cell selection, the UE receives DCI via PDCCH in a CORESET, and the PDCCH indicates a PDSCH containing RMSI (or SIB1). As PBCH (or MIB) does not carry any information on the transmitted SS block, the UE may assume the default SS burst set composition for the rate matching and RE mapping to receive the PDCCH. In this disclosure, "rate matching" may imply "rate matching and RE mapping."

Upon the UE receives the RMSI, which contains a first indication on the SS burst set composition, the UE's PDSCH rate matching and RE mapping can be made dependent on the RMSI-signaled SS burst set composition. The DL indications received during this phase (after RMSI reception but before receiving the RRC signaling regarding the updated SS burst set composition) include RACH responses (msg2, msg4) and SIBx, x>1.

Hence, it is proposed that the PDSCHs carrying SIBx, x>1 and RACH responses (msg2, msg4) may be rate matched around the SS blocks indicated by the first indication of the SS burst set composition. To realize this operation dependent upon the RNTI types, a separate RNTI may be assigned to SIB1 (or RMSI) and SIBx, x>1.

As for the paging, a similar treatment as SIBx, x>1 seems to be desirable, as the paging PDSCH can be received in CONNECTED and IDLE mode. Hence, if the RNTI type is P-RNTI, the UE may use the first indication of the SS burst set composition for PDSCH RE mapping and rate matching.

A UE may also receive a second indication by RRC signaling on the SS burst set composition in the CONNECTED mode. As the purpose of this indication is to facilitate UE's PDSCH reception on these non-serving SS block time frequency resources in the same cell, this information is UE-specific. Hence, it does not seem to be proper to use the second indication for the rate matching and RE mapping for the cell-specific signaling. The use of the second indication may be restricted to the UE-specific PDSCH reception only.

In other words, when the UE receives DCI with C-RNTI, which schedules a PDSCH, the UE may assume that the PDSCH is rate matched around the SS blocks (and the PDSCH RE mapping is around the SS blocks) indicated by the second indication.

TABLE 4 summarizes the rate matching and PDSCH RE mapping behavior for the PDSCH/PUSCH that is determined based on the PDSCH contents and/or RNTI types. The "full" SS burst set of the carrier band is used for RMSI PDSCH reception, which is scheduled by DCI with SI-RNTI for SIB1.

The first indication carried in RMSI is used for SIBx, RACH msg2/4 and paging reception, which is scheduled by DCI with SI-RNTI for SIBx (x>1), RA-RNTI, temporary C-RNTI, P-RNTI. The first indication may also be used for a UE-specific dedicated message reception, which is scheduled by DCI with C-RNTI until the UE receives the RRC signaling containing the second indication. The second indication is used for a UE-specific dedicated message reception, which is scheduled by DCI with C-RNTI, after the UE receives the second indication of the SS burst set composition via RRC signaling.

TABLE 4

Rate matching and PDSCH RE mapping

| PDSCH contents | CORESET type | RNTI types | Rate matching and RE mapping |
|---|---|---|---|
| RMSI | MIB configured CORESET | SI-RNTI for SIB1 (or RMSI) | Behavior 1: Full SS burst set of the carrier band |
| SIBx, RACH msg2/4, paging | MIB/RMSI configured CORESET | SI-RNTI for SIBx (x > 1), RA-RNTI, temporary C-RNTI, P-RNTI | Behavior 2: According to a first indication of the SS burst set composition carried in RMSI |
| UE-specific dedicated message | RRC configured CORESET or MIB/RMSI configured CORESET | C-RNTI | Behavior 3: According to a first indication of the SS burst set composition carried in RMSI, if a second indication by RRC is not received; according to a second indication of the SS burst set composition carried in RMSI, if the second indication by RRC has been received |

An alternative embodiment is described in TABLE 5. The rate matching and PDSCH RE mapping behavior for the PDSCH/PUSCH is determined based on the CORESET type and/or RNTI types, rather than the PDSCH contents and/or RNTI types. The "full" SS burst set of the carrier band is used for RMSI PDSCH reception, which is scheduled by DCI with SI-RNTI for SIB1 carried in MIB configured CORESET.

The first indication carried in RMSI is used for SIBx, RACH msg2/4 and paging reception, which is scheduled by DCI with SI-RNTI for SIBx (x>1), RA-RNTI, temporary C-RNTI, P-RNTI carried in MIB configured CORESET. The first indication may also be used for a UE-specific dedicated message reception, which is scheduled by DCI with C-RNTI carried in MIB configured CORESET; or in RRC configured CORESET until the UE receives the RRC signaling containing the second indication. The second indication is used for a UE-specific dedicated message reception, which is scheduled by DCI with C-RNTI carried in the RRC configured CORESET, after the UE receives the second indication of the SS burst set composition via RRC signaling.

In an alternative embodiment, instead of using a separate SI-RNTI for indicating the different rate matching behavior for SIB1 (or RMSI) PDSCH, the protocol may use the timing information of RMSI transmissions. The MIB-configured CORESETs are transmitted periodically in designated time slots, according to a configuration carried in PBCH. When the UE receives a DCI in PDCCH in MIB-configured CORESETs with SI-RNTI in these time slots, the UE may rate match around the full SS burst set composition for receiving the PDSCH scheduled by the DCI; when the UE receives a DCI with SI-RNTI in the other time slots, the UE may rate match around the SS blocks according to the first SS burst set composition.

The rest of the UE behavior regarding the rate matching can be according to either TABLE 4 or TABLE 5. In one example, the SIB1 PDSCH timing is according to the following.

In some embodiments, the network may activate/deactivate a subset of SS blocks via MAC-CE in an SS burst set constructed according to the full set, the first indication or the second indication. In such a case, the rate matching behavior may also be further updated, according to the

TABLE 5

Alternative rate matching and PDSCH RE mapping

| PDSCH contents | CORESET type | RNTI types | Rate matching and RE mapping |
|---|---|---|---|
| RMSI | MIB configured CORESET | SI-RNTI for SIB1 (or RMSI) | Behavior 1: Full SS burst set of the carrier band |
| SIBx, RACH msg2/4, paging, UE-specific dedicated message | MIB/RMSI configured CORESET | SI-RNTI for SIBx (x > 1), RA-RNTI, temporary C-RNTI, P-RNTI, C-RNTI | Behavior 2: According to a first indication of the SS burst set composition carried in RMSI |
| UE-specific dedicated message | RRC configured CORESET | C-RNTI | Behavior 3: According to a first indication of the SS burst set composition carried in RMSI, if a second indication by RRC is not received; according to a second indication of the SS burst set composition carried in RMSI, if the second indication by RRC has been received |

"activated SS blocks" only; the rate matching and RE mapping of the PDSCH is around the activated SS blocks, wherein the PDSCH is scheduled by a DCI with C-RNTI (or a DCI carried in an RRC configured CORESET).

In an alternative embodiment, the PDSCH rate matching behavior is determined differently depending on the search space on which the PDCCH conveys DL scheduling assignment. In one such example: behavior 1 is used for receiving RMSI PDSCH scheduled by a PDCCH (whose CRS scrambled with SI-RNTI for SIB0) transmitted in the type0 PDCCH search space on the MIB configured CORESET; behavior 2 is used for receiving PDSCHs with SI-RNTI for SIBx (x>1), RA-RNTI, temporary C-RNTI, P-RNTI, C-RNTI. In one alternative, all these PDSCHs are scheduled by PDCCHs transmitted in the type1 PDCCH search space on the RMSI (SIB1) configured CORESET. In another alternative, PDSCHs with SI-RNTI for SIBx (x>1) is scheduled by a PDCCH transmitted on the type0 PDCCH search space on the MIB configured CORESET; and PDSCHs with RA-RNTI, temporary C-RNTI, P-RNTI, C-RNTI, etc., are scheduled by a PDCCH transmitted on the type1 PDCCH search space on the RMSI (SIB1) configured CORESET; and behavior 3 is used for receiving PDSCHs with C-RNTI for receiving UE-specific dedicated data, scheduled by PDCCHs transmitted in UE-specific search space transmitted on RRC configured CORESET.

In one embodiment, a method to indicate SS burst set composition in multiple subbands in a wideband carrier is proposed.

In case the SS burst sets are transmitted by the same set of TXRUs in the wideband carrier, due to the analog beamforming constraint, the SS blocks in the different BWPs may be beamformed with the same analog beam. Under this constraint, the SS burst set compositions are identical across subbands in the wideband carrier.

For a WB UEs who is configured with a single BWP across the full wide bandwidth, the signaling contents may be able to indicate the multiple frequency locations to map the SS blocks (SSBs). This can be realized by configuring a list of N the starting PRB indices (common PRB indexing) to map the N SSBs in the frequency domain (by RRC or SIB signaling).

In alternative embodiments, ending or center PRB indices may be indicated instead. Upon receiving this signaling the UE can assume that the SS burst set composition corresponding to full mapping, the first and the second indication is applicable to all the N SSBs in the frequency domain, and the UE may also assume that the SSBs with the same SSB index mapped to different subbands are QCL'ed in a set of parameters (which is a subset or a full set of delay, Doppler, average gain and spatial parameters). The UE may apply PDSCH rate matching according to these information, and also according to the first embodiment of the present disclosure.

In the present disclosure, "a subframe" or "a time slot" is another name to refer to "a time interval X," or vice versa.

The mapping of SS blocks to SS burst set needs to take into account the LTE-NR coexistence, specifically when TDM sharing is utilized for LTE and NR to share the same spectrum. In this case the mapping of SS block may avoid "always on" LTE signals such as CRS, synchronization signals (PSS/SSS/PBCH) and PDCCH as well in order to not impact the operation of legacy LTE device. In the LTE-NR coexistence scenario, the subcarrier spacing of LTE signal may be fixed 15 kHz. However, the subcarrier spacing for NR SS can be 15 kHz and 30 kHz. Specific configurations/designs on subcarrier spacing, mapping SS blocks to a slot and SS burst set composition are considered in this disclosure.

In some embodiments, the mapping structure/pattern of SS blocks to a slot is considered. As SS blocks are "always on" signals in NR, mapping SS blocks to a slot may avoid the locations of potential "always on" signals in LTE, e.g., PSS/SSS; mapping SS blocks to a slot may also avoid the locations of potential control/reference signals in LTE, e.g., PDCCH/CRS/PBCH.

Figure 17A:
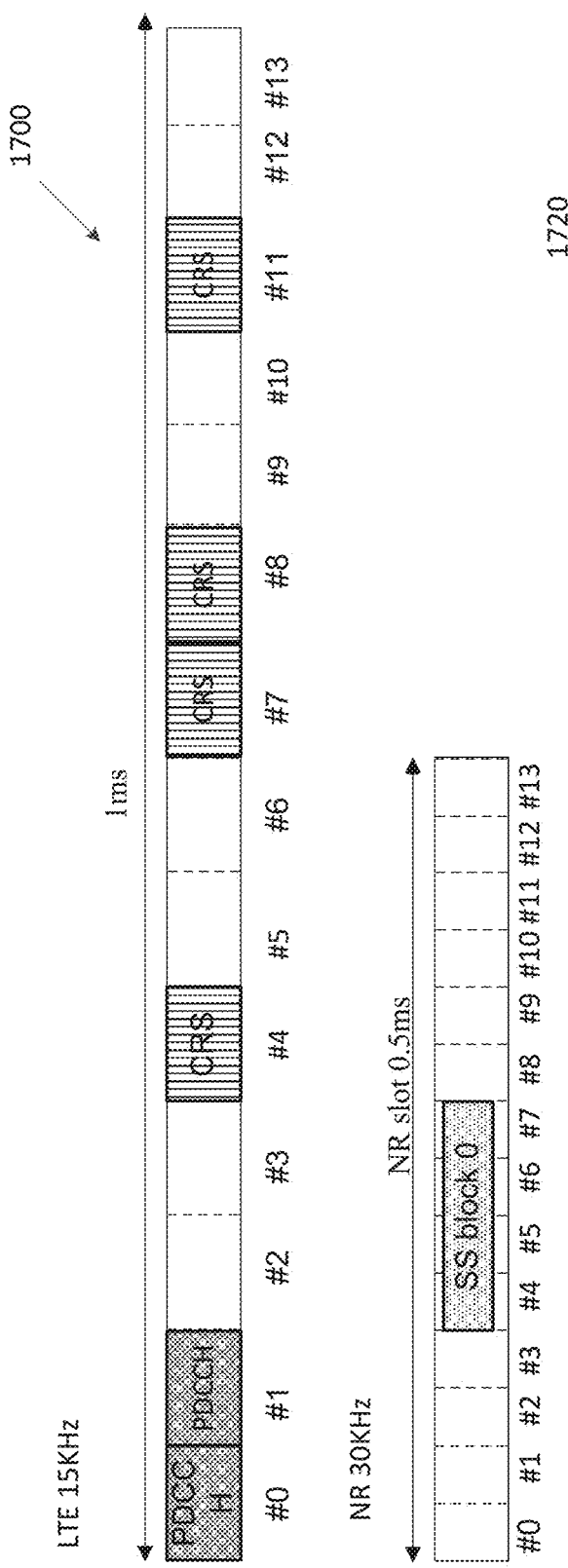
FIG. 17A illustrates an example mapping SS block according to embodiments of the present disclosure.

FIG. 17A illustrates an example mapping SS block 1700 according to embodiments of the present disclosure. An embodiment of the mapping SS block 1700 shown in FIG. 17A is for illustration only. One or more of the components illustrated in FIG. 17A can be implemented in specialized circuitry configured to perform the noted functions or one or more of the components can be implemented by one or more processors executing instructions to perform the noted functions. Other embodiments are used without departing from the scope of the present disclosure.

In one embodiment, NR SS subcarrier spacing as 30 kHz and map SS blocks on OFDM symbol #4~#7 is configured in a slot as shown in FIG. 17A. In this example, the SS in NR may not overlap the control and reference signal in LTE normal subframe.

Figure 17B:
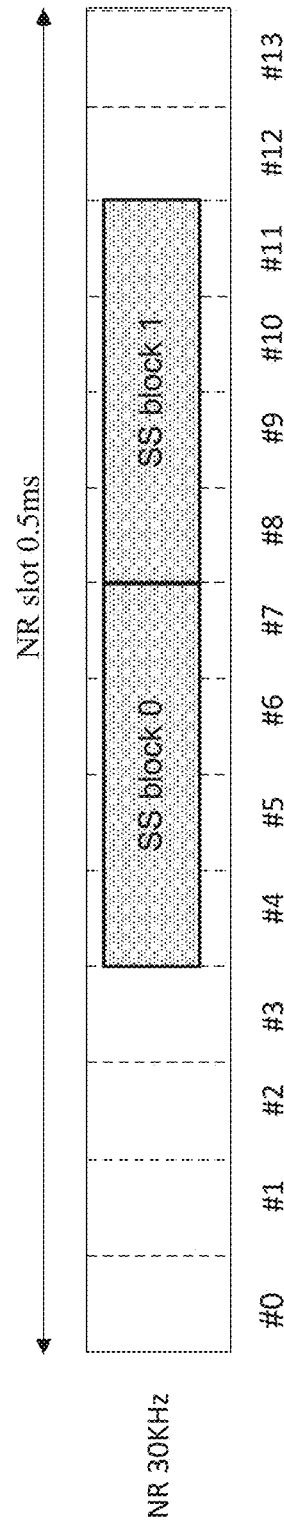
FIG. 17B illustrates another example mapping SS block according to embodiments of the present disclosure.

FIG. 17B illustrates another example mapping SS block 1720 according to embodiments of the present disclosure. An embodiment of the mapping SS block 1720 shown in FIG. 17B is for illustration only. One or more of the components illustrated in FIG. 17B can be implemented in specialized circuitry configured to perform the noted functions or one or more of the components can be implemented by one or more processors executing instructions to perform the noted functions. Other embodiments are used without departing from the scope of the present disclosure.

In another embodiment, NR SS subcarrier spacing as 30 kHz and map SS blocks on OFDM symbols #4~#11 and two SS blocks are mapped to one NR slot as shown in FIG. 17B.

Figure 17C:
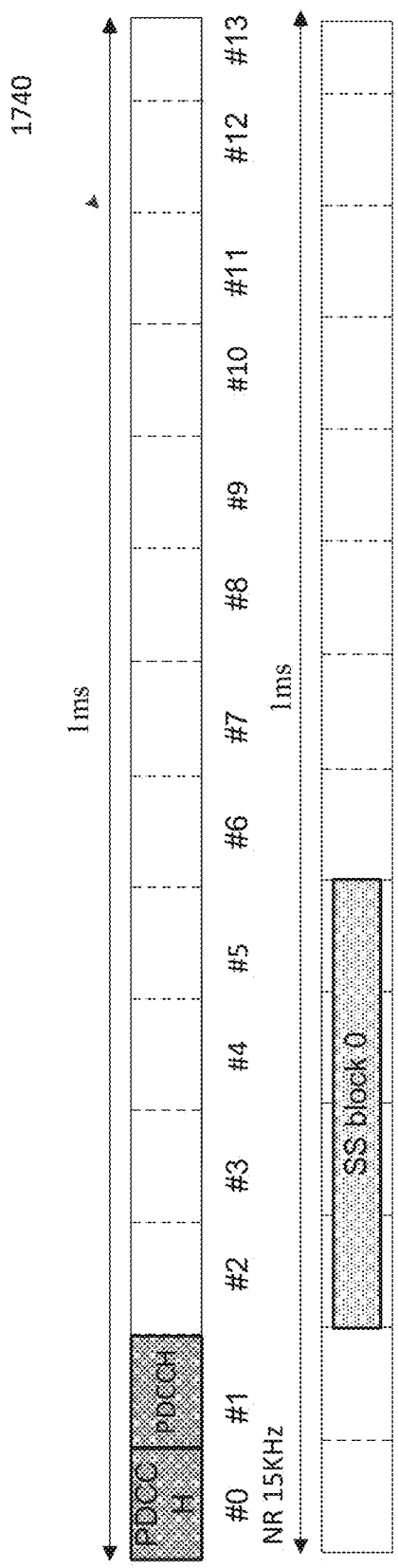
FIG. 17C illustrates yet another example mapping SS block according to embodiments of the present disclosure.
Figure 17C:
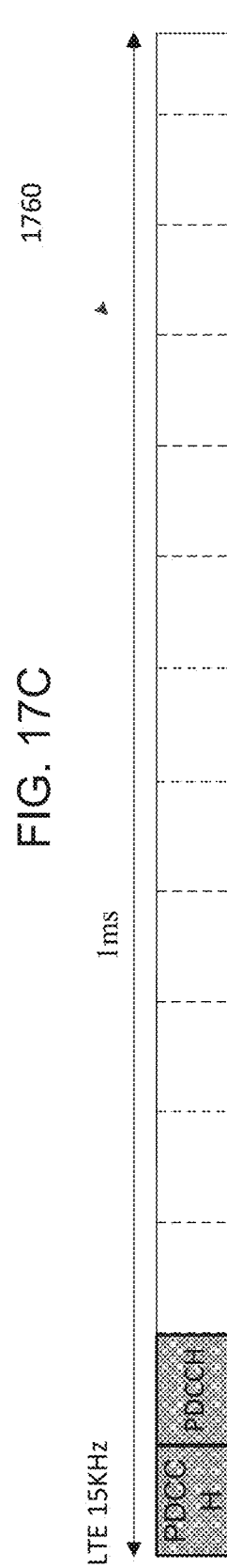

FIG. 17C illustrates yet another example mapping SS block 1740 according to embodiments of the present disclosure. An embodiment of the mapping SS block 1740 shown in FIG. 17C is for illustration only. One or more of the components illustrated in FIG. 17C can be implemented in specialized circuitry configured to perform the noted functions or one or more of the components can be implemented by one or more processors executing instructions to perform the noted functions. Other embodiments are used without departing from the scope of the present disclosure.

In yet another embodiment, some LTE subframes as MBSFN subframes are configured. Meanwhile, NR use 15 kHz subcarrier spacing and one SS block is mapped to OFDM symbol #2~#5 in a slot aligned to LTE MBSFN subframes as shown in FIG. 17C.

Figure 17D:
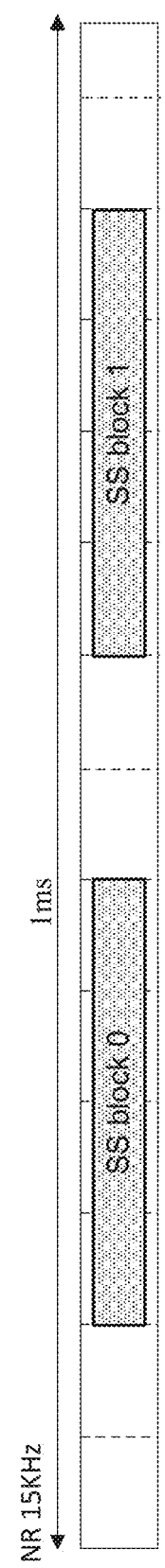
FIG. 17D illustrates yet another example mapping SS block according to embodiments of the present disclosure.

FIG. 17D illustrates yet another example mapping SS block 1760 according to embodiments of the present disclosure. An embodiment of the mapping SS block 1760 shown in FIG. 17D is for illustration only. One or more of the components illustrated in FIG. 17D can be implemented in specialized circuitry configured to perform the noted functions or one or more of the components can be implemented by one or more processors executing instructions to perform the noted functions. Other embodiments are used without departing from the scope of the present disclosure.

In yet another embodiment, some LTE subframes as MBSFN subframes are configured. Meanwhile, NR use 15 kHz subcarrier spacing and maps two SS blocks to OFDM symbol #2~#5 and #8~#11 in a slot aligned to LTE MBSFN subframes as shown in FIG. 17D.

Figure 17E:
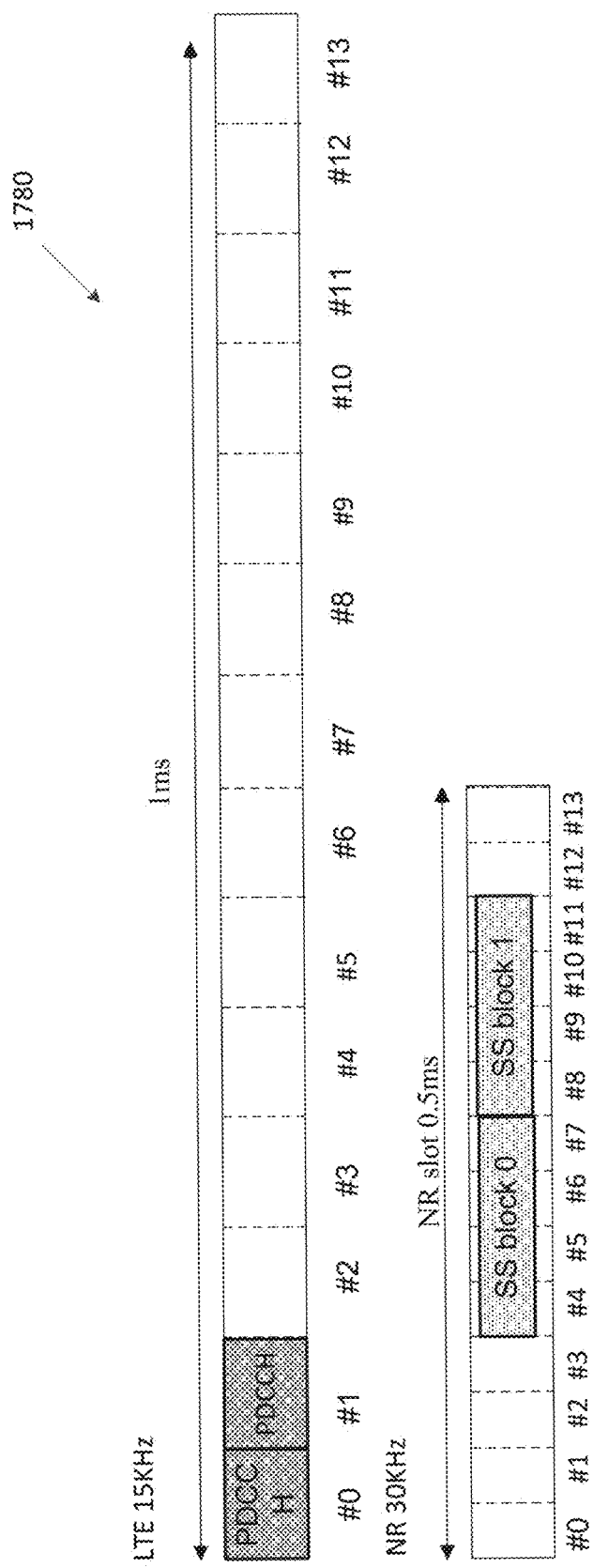
FIG. 17E illustrates yet another example mapping SS block according to embodiments of the present disclosure.

FIG. 17E illustrates yet another example mapping SS block 1780 according to embodiments of the present disclosure. An embodiment of the mapping SS block 1780 shown in FIG. 17E is for illustration only. One or more of the components illustrated in FIG. 17E can be implemented in specialized circuitry configured to perform the noted functions or one or more of the components can be implemented by one or more processors executing instructions to perform the noted functions. Other embodiments are used without departing from the scope of the present disclosure.

In yet another embodiment, some LTE subframes as MBSFN subframes are configured. Meanwhile, NR use 30 kHz subcarrier spacing and map two SS blocks to OFDM symbol #4~#7 and #8~#11 in a slot aligned to LTE MBSFN subframes as shown in FIG. 17E.

In some embodiments, the SS burst set mapping pattern differs whether the frequency band is for LTE-TDD or LTE-FDD.

In some embodiments, a common SS burst set mapping pattern is configured regardless of whether the frequency band is for LTE-TDD or LTE-FDD.

In some embodiments, in LTE-FDD system, SS is in subframe 0 and subframe 5. Further, subframe 0, 4, 5, 9 cannot be configured as MBSFN subframes. In LTE-NR coexistence scenario, the SS burst set composition may avoid mapping SS blocks to subframes overlapping with LTE subframe 0 and subframe 5. One alternative of this embodiment is to configure subcarrier spacing for NR SS as 30 kHz and map SS blocks aligned to two of the following LTE subframes: subframe 1, subframe 2, subframe 3, subframe 4, subframe 6, subframe 7, subframe 8, and subframe 9. These selected subframes can be either normal subframes or MBSFN subframes.

FIG. 18A illustrates an example SS burst set composition 1800 according to embodiments of the present disclosure. An embodiment of the SS burst set composition 1800 shown in FIG. 18A is for illustration only. One or more of the components illustrated in FIG. 18A can be implemented in specialized circuitry configured to perform the noted functions or one or more of the components can be implemented by one or more processors executing instructions to perform the noted functions. Other embodiments are used without departing from the scope of the present disclosure.

In each selected NR slot, one SS block is mapped according to SS-block-to-slot pattern in the aforementioned embodiments. One example of this alternative is shown in FIG. 18A. In FIG. 18A, it may be considered that a NR slot with NR SS block is called as an SSB slot. NR SS blocks are mapped to slot 2~slot 5, aligned to LTE subframe 1 and subframe 2. In each selected slot or SSB slot, one SS block is mapped to OFDM symbol #4~#7.

FIG. 18B illustrates another example SS burst set composition 1820 according to embodiments of the present disclosure. An embodiment of the SS burst set composition 1820 shown in FIG. 18B is for illustration only. One or more of the components illustrated in FIG. 18B can be implemented in specialized circuitry configured to perform the noted functions or one or more of the components can be implemented by one or more processors executing instructions to perform the noted functions. Other embodiments are used without departing from the scope of the present disclosure.

In another alternative, LTE configures a MBSFN subframe so that more SS blocks can be transmitted in a NR slot. Other subframes can be either normal subframes or MBSFN subframes. Candidates for MBSFN subframes can be subframe 1, subframe 2, subframe 3, subframe 6, subframe 7, and subframe 8. NR can configure the NR's SS subcarrier spacing as 30 kHz and selects slots aligned to LTE MBSFN subframe as SSB slots. In each selected slot or SSB slot, 2 SS blocks are transmitted using SS-block-to-slot pattern in the aforementioned embodiments. One example is shown in FIG. 18B. In this example, LTE selects subframe 1 as MBSFN subframe. In NR, slot 2 and slot 3 are aligned with the LTE MBSFN subframe, so slot 2 and slot 3 are selected as SSB slot. In each selected slot or SSB slot, two SS blocks are mapped according to Embodiment 1.

Figure 18C:
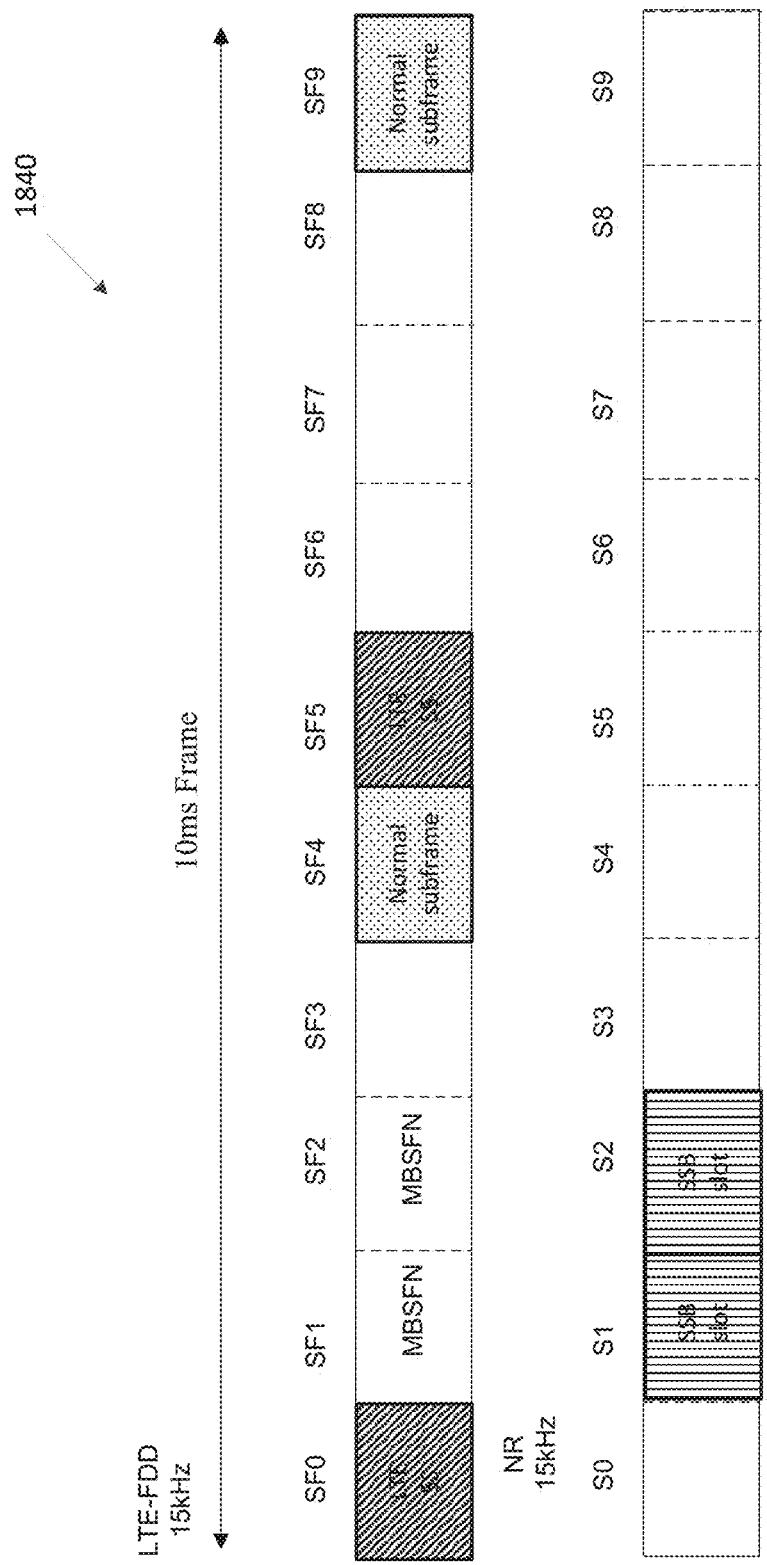
FIG. 18C illustrates yet another example SS burst set composition according to embodiments of the present disclosure.

FIG. 18C illustrates yet another example SS burst set composition 1840 according to embodiments of the present disclosure. An embodiment of the SS burst set composition 1840 shown in FIG. 18C is for illustration only. One or more of the components illustrated in FIG. 18C can be implemented in specialized circuitry configured to perform the noted functions or one or more of the components can be implemented by one or more processors executing instructions to perform the noted functions. Other embodiments are used without departing from the scope of the present disclosure.

In another alternative, LTE configures a MBSFN subframe so that more SS blocks can be transmitted in a NR slot. Candidates for MBSFN subframes can be subframe 1, subframe 2, subframe 3, subframe 6, subframe 7, and subframe 8. NR can configure the NR's SS subcarrier spacing as 15 kHz and selects slots aligned to LTE MBSFN subframe as SSB slots. In each selected slot or SSB slot, 2 SS blocks are transmitted using SS-block-to-slot pattern in the aforementioned embodiments. One example is shown in FIG. 18C. In this example, LTE selects subframe 1 and 2 as MBSFN subframe. Other subframes can be MBSFN or normal subframes. In NR, slot 1 and slot 2 (14 symbol slot) are aligned with the LTE MBSFN subframe, so slot 1 and slot 2 are selected as SSB slot. In each selected slot or SSB slot, two SS blocks are mapped according to the aforementioned embodiments.

Figure 19A:
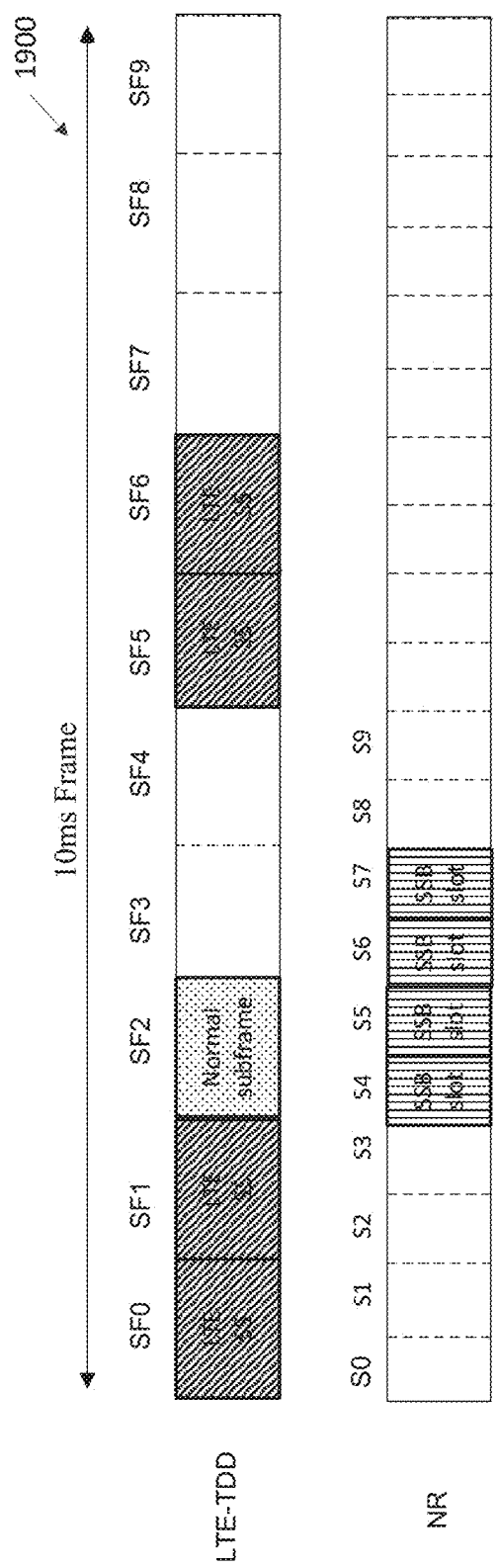
FIG. 19A illustrates yet another example SS burst set composition according to embodiments of the present disclosure.

FIG. 19A illustrates yet another example SS burst set composition 1900 according to embodiments of the present disclosure. An embodiment of the SS burst set composition 1900 shown in FIG. 19A is for illustration only. One or more of the components illustrated in FIG. 19A can be implemented in specialized circuitry configured to perform the noted functions or one or more of the components can be implemented by one or more processors executing instructions to perform the noted functions. Other embodiments are used without departing from the scope of the present disclosure.

In LTE-TDD system, SS is in subframe 0, subframe 1, subframe 5 and subframe 6. Further, subframe 0, 1, 2, 5, and 6 cannot be configured as MBSFN subframes. In LTE-NR coexistence scenario, the SS burst set composition may avoid mapping SS blocks to subframes overlapping with LTE subframe 0, 1, 5 and 6. One alternative of this embodiment is to configure subcarrier spacing for NR SS as 30 kHz and map SS blocks aligned to two of the following LTE subframes: subframe 2, subframe 3, subframe 4, subframe 7, subframe 8, and subframe 9. In each selected NR slot, one SS block is mapped according to SS-block-to-slot pattern in the aforementioned embodiments. One example of this alternative is shown in FIG. 19A. NR SS blocks are mapped to slot 4~slot 7, aligned to LTE subframe 2 and subframe 3. In each selected slot or SSB slot, one SS block is mapped to OFDM symbol #4~#7.

Figure 19B:
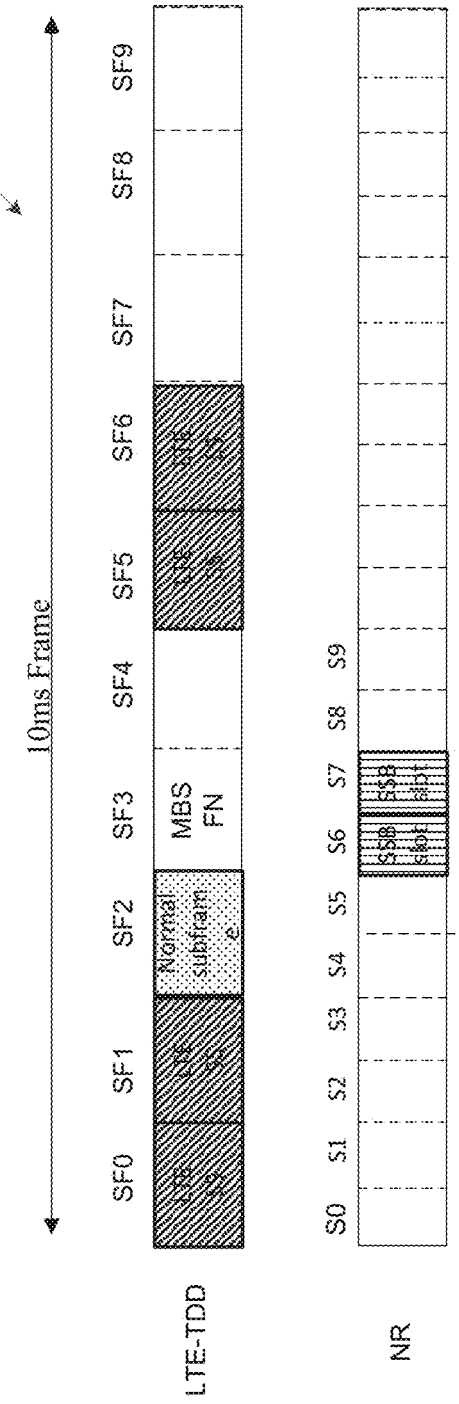
FIG. 19B illustrates yet another example SS burst set composition according to embodiments of the present disclosure.

FIG. 19B illustrates yet another example SS burst set composition 1920 according to embodiments of the present disclosure. An embodiment of the SS burst set composition 1920 shown in FIG. 19B is for illustration only. One or more of the components illustrated in FIG. 19B can be implemented in specialized circuitry configured to perform the noted functions or one or more of the components can be implemented by one or more processors executing instructions to perform the noted functions. Other embodiments are used without departing from the scope of the present disclosure.

In another alternative, LTE configures a MBSFN subframe so that more SS blocks can be transmitted in a NR slot. Candidates for MBSFN subframes can be subframe 3, subframe 4, subframe 7, subframe 8, and subframe 9. NR can configure the NR's SS subcarrier spacing as 30 kHz and selects slots aligned to LTE MBSFN subframe as SSB slots. In each selected slot or SSB slot, 2 SS blocks are transmitted using SS-block-to-slot pattern in the aforementioned embodiments. One example is shown in FIG. 19B. In this example, LTE selects subframe 3 as MBSFN subframe. In NR, slot 6 and slot 7 are aligned with the LTE MBSFN subframe, so slot 6 and slot 7 are selected as SSB slot. In each selected slot or SSB slot, two SS blocks are mapped according to the aforementioned embodiments.

Figure 19C:
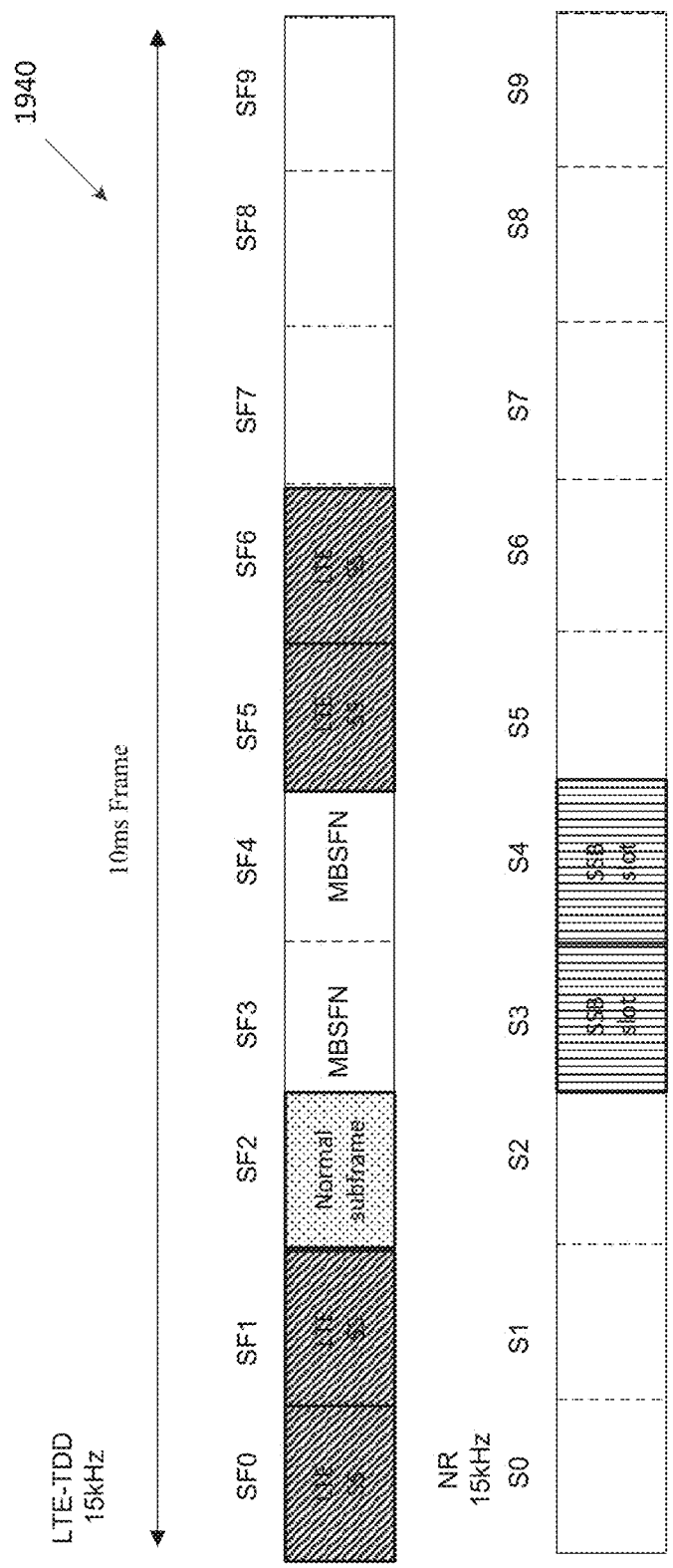
FIG. 19C illustrates yet another example SS burst set composition according to embodiments of the present disclosure.

FIG. 19C illustrates yet another example SS burst set composition 1940 according to embodiments of the present disclosure. An embodiment of the SS burst set composition 1940 shown in FIG. 19C is for illustration only. One or more of the components illustrated in FIG. 19C can be implemented in specialized circuitry configured to perform the noted functions or one or more of the components can be implemented by one or more processors executing instructions to perform the noted functions. Other embodiments are used without departing from the scope of the present disclosure.

In another alternative, LTE configures two MBSFN subframes so that more SS blocks can be transmitted in a NR slot. Candidates for MBSFN subframes can be subframe 3, subframe 4, subframe 7, subframe 8, and subframe 9. NR can configure the NR's SS subcarrier spacing as 15 kHz and selects slots aligned to LTE MBSFN subframe as SSB slots. In each selected slot or SSB slot (14 symbols), at most two SS blocks are transmitted using SS-block-to-slot pattern in Embodiment 1. One example is shown in FIG. 19C. In this example, LTE selects subframe 3 and subframe 4 as MBSFN subframe. In NR, slot 3 and slot 4 are aligned with the LTE MBSFN subframe, so slot 3 and slot 4 are selected as SSB slot. In each selected slot or SSB slot, two SS blocks are mapped according to the aforementioned embodiments. In case the slot in NR at 15 kHz subcarrier spacing is defined as 7 symbols. The selected slot may be slot 6 and slot 7.

In one embodiment, a UL control channel can be transmitted in short duration around the last transmitted UL symbol(s) of a slot. The UL control channel is time-division-multiplexed and/or frequency-division-multiplexed with UL data channel within a slot. For the UL control channel in short duration, transmission over one symbol duration of a slot is supported.

In one example, short UCI and data are frequency-division-multiplexed both within a UE and between UEs, at least for the case where the PRBs for short UCI and data are non-overlapping.

In one example, in order to support TDM of short PUCCH from different UEs in the same slot, a mechanism to tell the UE in which symbol(s) in a slot to transmit the short PUCCH on is supported at least above 6 GHz.

At least following is supported for PUCCH in 1-symbol duration. In one example, UCI and RS are multiplexed in the given OFDM symbol in FDM manner if RS is multiplexed. In one example, same subcarrier spacing between DL/UL data and PUCCH in short-duration in the same slot.

In one example, at least a PUCCH in short-duration spanning 2-symbol duration of a slot is supported. In such example, same subcarrier spacing between DL/UL data and PUCCH in short-duration in the same slot.

In one example, at least semi-static configuration for the following is supported. In such example, a PUCCH resource of a given UE within a slot. i.e., short-PUCCHs of different UEs can be time-division multiplexed within the given duration in a slot.

In one example, the PUCCH resource includes time, frequency and, when applicable, code domains.

In one example, PUCCH in short-duration can span until the end of a slot from UE perspective. In such example, no explicit gap symbol is necessary after the PUCCH in short-duration.

In one example for a slot having short UL-part (i.e., DL-centric slot), "short UCI" and data can be frequency-division multiplexed by one UE if a data is scheduled on the short UL-part. UL control channel can be transmitted in long duration over multiple UL symbols to improve coverage. UL control channel is frequency-division-multiplexed with UL data channel within a slot.

In one example, a UCI carried by long duration UL control channel at least with low PAPR design can be transmitted in one slot or multiple slots.

In one example, transmission across multiple slots may allow a total duration, e.g., 1 ms, at least for some cases.

In one example, for UL control channel with long duration, TDM between RS and UCI is supported at least for DFT-S-OFDM.

In one example, long UL-part of a slot can be used for transmission of PUCCH in long-duration, i.e., PUCCH in long-duration is supported for both UL-only slot and a slot with variable number of symbols with a minimum of 4 symbols for PUCCH transmission.

In one example, at least for 1 or 2 UCI bits, the UCI can be repeated within N slots (N>1) where the N slots may or may not be adjacent in slots where PUCCH in long duration is allowed.

In one example, simultaneous transmission of PUSCH and PUCCH at least for the long PUCCH format is supported, i.e., transmit uplink control on PUCCH resources even in presence of data. In addition to simultaneous PUCCH-PUSCH transmission, UCI on PUSCH is supported.

In one example, intra-TTI slot frequency-hopping is supported.

In one example, DFT-s-OFDM waveform is supported.

In one example, transmit antenna diversity is supported.

Both TDM and FDM between short duration PUCCH and long duration PUCCH are supported at least for different UEs in one slot. In frequency-domain, a PRB (or multiple PRBs) is the minimum resource unit size for UL control channel. The frequency resource and hopping, if hopping is used, may not spread over the carrier bandwidth. UE-specific RS is used for NR-PUCCH transmission. A set of PUCCH resources is configured by high layer signaling and a PUCCH resource within the configured set is indicated by DCI It may be possible to dynamically indicate (at least in combination with RRC) the timing between data reception and hybrid-ARQ acknowledgement transmission as part of the DCI. A combination of semi-static configuration and (at least for some types of UCI information) dynamic signaling is used to determine the PUCCH resource both for the "long and short PUCCH formats," where the PUCCH resource includes time, frequency and, when applicable, code domains. UCI on PUSCH, i.e., using some of the scheduled resources for UCI is supported in case of simultaneous UCI and data.

For further discussion of PUCCH in short-duration, UCI payload of 1—at least a few tens of bits (or SR) is assumed. For further discussion of PUCCH in long-duration, UCI payload of 1—at least a few hundreds of bits (or SR) is assumed.

In one embodiment for 1-symbol short PUCCH with >2 UCI bits, the following is supported. In one example of option 1, QPSK for UCI, X1 to X2 PRBs can be configured to support various UCI payload sizes: both localized (contiguous) and distributed (non-contiguous) allocations are supported; detailed PRB allocations and signaling of the configuration; and values of X1, X2. In one example of DMRS overhead, down-select among the following options are provided: Option 1; one value (e.g., ½, ⅓, ¼, ⅕, . . . ); and Option 2: multiple values depending on, e.g. UCI payload size etc.

Wireless channel, especially for the higher frequency, can be fast changing due to the movement of UEs or blockage of surrounding objects and so on. Therefore, the UE needs assistance to find and maintain best or suitable Rx and Tx beams to guarantee efficient transmission and reception. To this end, beam management procedures will be needed in the future NR systems. In NR, beam management is defined as follows.

In one example of beam management, a set of L1/L2 procedures to acquire and maintain a set of TRP(s) and/or UE beams that can be used for DL and UL transmission/reception, which include at least following aspects.

In one example of beam determination, for TRP(s) or UE to select of the own Tx/Rx beam(s) of TRP(s) or the UE.

In one example of beam measurement, for TRP(s) or UE to measure characteristics of received beamformed signals In one example of beam reporting, for UE to report information of beamformed signal(s) based on beam measurement.

In one example of beam sweeping, operation of covering a spatial area, with beams transmitted and/or received during a time interval in a predetermined way.

The followings are defined as Tx/Rx beam correspondence at TRP and UE. Tx/Rx beam correspondence at TRP holds if at least one of the following is satisfied: TRP is able to determine a TRP Rx beam for the uplink reception based on UE's downlink measurement on TRP's one or more Tx beams; TRP is able to determine a TRP Tx beam for the downlink transmission based on TRP's uplink measurement on TRP's one or more Rx beams; Tx/Rx beam correspondence at UE holds if at least one of the following is satisfied; a UE is able to determine a UE Tx beam for the uplink transmission based on UE's downlink measurement on UE's one or more Rx beams; a UE is able to determine a UE Rx beam for the downlink reception based on TRP's indication based on uplink measurement on UE's one or more Tx beams; and Capability indication of UE beam correspondence related information to TRP is supported.

Note that definition/terminology of Tx/Rx beam correspondence is for convenience of discussion. The detailed performance conditions are up to RAN4. The following DL L1/L2 beam management procedures are supported within one or multiple TRPs. In one example, P-1 is used to enable UE measurement on different TRP Tx beams to support selection of TRP Tx beams/UE Rx beam(s).

In one example, for beamforming at TRP, it typically includes an intra/inter-TRP Tx beam sweep from a set of different beams. For beamforming at UE, it typically includes a UE Rx beam sweep from a set of different beams.

In one example, P-2: is used to enable UE measurement on different TRP Tx beams to possibly change inter/intra-TRP Tx beam(s).

In one example, from a possibly smaller set of beams for beam refinement than in P-1. Note that P-2 can be a special case of P-1.

In one example, P-3 is used to enable UE measurement on the same TRP Tx beam to change UE Rx beam in the case UE uses beamforming.

At least network triggered aperiodic beam reporting is supported under P-1, P-2, and P-3 related operations. A UE measurement based on RS for beam management (at least CSI-RS) is composed of K (=total number of configured beams) beams, and UE reports measurement results of L selected Tx beams, where L is not necessarily fixed number. Note that the procedure based on RS for mobility purpose is not precluded. Reporting information at least include measurement quantities for L beam(s) and information indicating L DL Tx beam(s), if L<K. Specifically, when a UE is configured with K'>1 non-zero power (NZP) CSI-RS resources, a UE can report a set of L UE-selected CSI-RS-resource-related indices.

A UE can be configured with the following higher layer parameters for beam management: N≥1 reporting settings, M≥1 resource settings; the links between reporting settings and resource settings are configured in the agreed CSI measurement setting (CSI-RS based P-1 & P-2 are supported with resource and reporting settings); P-3 can be supported with or without reporting setting; a reporting setting at least including: information indicating selected beam(s); L1 measurement reporting; time-domain behavior: e.g. aperiodic, periodic, semi-persistent; and frequency-granularity if multiple frequency granularities are supported; a resource setting at least including: time-domain behavior: e.g. aperiodic, periodic, semi-persistent; RS type: NZP CSI-RS at least; at least one CSI-RS resource set, with each CSI-RS resource set having K≥1 CSI-RS resources; and some parameters of K CSI-RS resources can be the same, e.g. port number, time-domain behavior, density and periodicity if any.

At least one of these two alternatives of beam reporting is supported. In one example of Alt 1, a UE reports information about TRP Tx Beam(s) that can be received using selected UE Rx beam set(s) where a Rx beam set refers to a set of UE Rx beams that are used for receiving a DL signal. It is UE implementation issues on how to construct the Rx beam set. One example is that each of Rx beam in a UE Rx beam set corresponds to a selected Rx beam in each panel. For UEs with more than one UE Rx beam sets, the UE can report TRP Tx Beam(s) and an identifier of the associated UE Rx beam set per reported TX beam(s).

Different TRP Tx beams reported for the same Rx beam set can be received simultaneously at the UE.

Different TRP TX beams reported for different UE Rx beam set may not be possible to be received simultaneously at the UE.

In one example of Alt 2, a UE reports information about TRP Tx Beam(s) per UE antenna group basis where UE antenna group refers to receive UE antenna panel or subarray. For UEs with more than one UE antenna group, the UE can report TRP Tx Beam(s) and an identifier of the associated UE antenna group per reported TX beam.

Different TX beams reported for different antenna groups can be received simultaneously at the UE.

Different TX beams reported for the same UE antenna group may not be possible to be received simultaneously at the UE.

Figure 20:
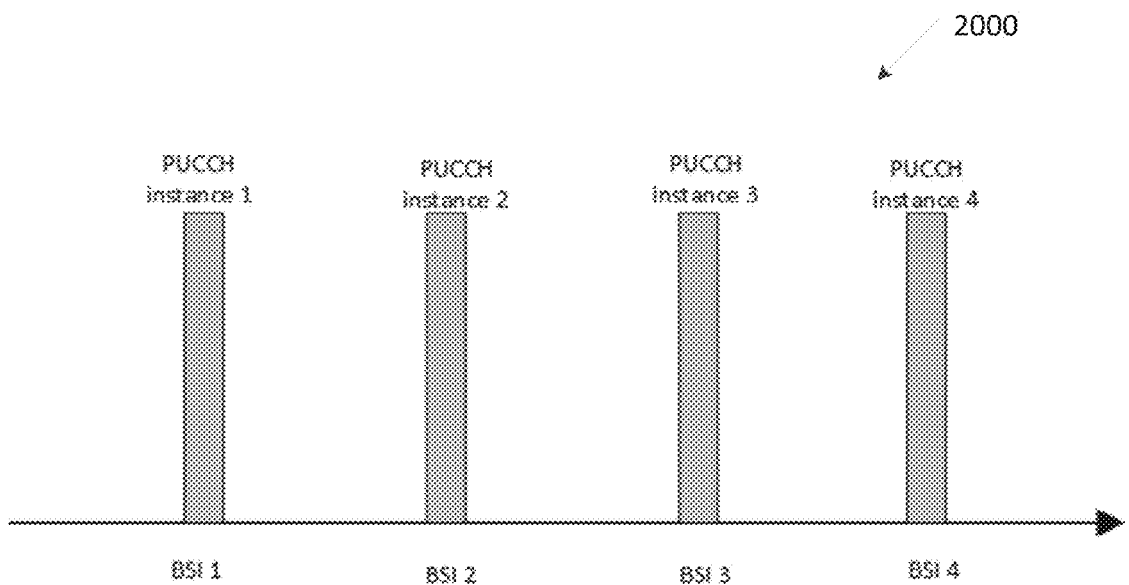
FIG. 20 illustrates an example split BSI in PUCCH according to embodiments of the present disclosure.

FIG. 20 illustrates an example split BSI in PUCCH 2000 according to embodiments of the present disclosure. An embodiment of the split BSI in PUCCH 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

When BSI is reported via PUCCH, at least beam Rx set/Group number, Tx beam information, and RSRP may be provided to the gNB either explicitly or implicitly. It can be part or a combination of CSI-RS resource IDs, antenna port index, and Tx beam time index.

If BSI reporting is split per Rx beam set or per group or per BPL or even per Tx beam. Split BSI can be transmitted in different transmission instances as illustrated in FIG. 20. The transmission instances can be either frequency or time instance or even code instance. BSI reporting per Rx beam set or group or per BPL per Tx beam is beneficial for carrying BSI due to the following reasons.

In one example, it is useful when a UE can have a varying number of Rx beam sets or groups or per BPL or Tx beams that will constitute a varying payload. Through split BSI, scalability to different numbers of Rx beam sets or groups or BPL or Tx beams and varying payload sizes can be supported and in each PUCCH the payload is same.

In one example, short PUCCH can be transmitted in short duration around the last transmitted one or two UL symbol(s) of a slot. This is useful especially for a DL-centric slot. It can be used for each transmission instance to carry one split BSI. Short PUCCH can provide ability for quick UCI feedback in a few symbols after a measurement that can result to higher scheduling efficiency. The maximum supported payload for short PUCCH can be up to a few tens of bits, which is sufficient to support split BSI. For example, consider a BSI reporting where beam Rx set/Group number, Tx beam index info, and RSRP are reported. The number of corresponding bits can be e.g., 4 bits, 3 bits and 7 bits respectively and the total payload bits would be 14 bits. Considering beam management monitoring, where it is likely that only one serving beam RSRP is reported, the Tx beam index info is not necessary to be reported and the payload is then 11 bits. If reference RSRP is configured and already known by the UE, the BSI report can provide a differential RSRP and, for differential RSRP of 4 bits, the total split BSI payload is 8 bits.

In one example, for long PUCCH, split BSI can be used to carry similar payloads as short PUCCH when better coverage is needed.

In one example, long PUCCH or PUSCH can be used together with short PUCCH. When the whole payload of L BSI is reported, long PUCCH or PUSCH can be configured with larger periodicity. Short PUCCH can be used to transmit small BSI payload of a selected BPL or serving BPL with smaller periodicity.

In one example, when the gNB needs to know the beam quality information of a selected BPL or serving BPL. This BSI information can be small because only beam quality information of a selected BPL or serving BPL needs to be reported. Short PUCCH used in this case can be either periodic or aperiodic.

At least semi-static configuration may support the PUCCH resource allocation of a given UE within a slot. The PUCCH resource includes time, frequency and, when applicable, code domains. When PUCCH is used to carry BSI, a set of N PUCCH resources can be allocated and configured semi-statically, where a few periodic transmission instances are configured via RRC signaling, and the transmission instance can be either frequency or time instances or code instances. In the resource allocation, each transmission instance is linked with Rx beam set/Group number or Tx beam index or combination of Rx beam set/Group number and Tx beam index. Through this linkage, the Rx beam set/Group number or Tx beam index or combination of Rx beam set/Group number can be implicitly indicated and some signaling bits in PUCCH can be saved.

The set of N PUCCH resources can be configured via an indication of one PUCCH resource index. For example, the UE is indicated with one OFDM symbol number, say l, for the first PUCCH resource in the PUCCH resource set. Then the OFDM symbols of the rest of the (N−1) PUCCH resources are determined by function(s) of l. In one example, the OFDM symbols for the N PUCCH resources are: l, l+1, . . . , l+N−1. In another example, the OFDM symbol numbers for the N PUCCH resources are L−1, L−2, . . . , L−N, where L is the number of OFDM symbols in a slot. All these N PUCCH resources are allocated in a same slot.

Figure 21:
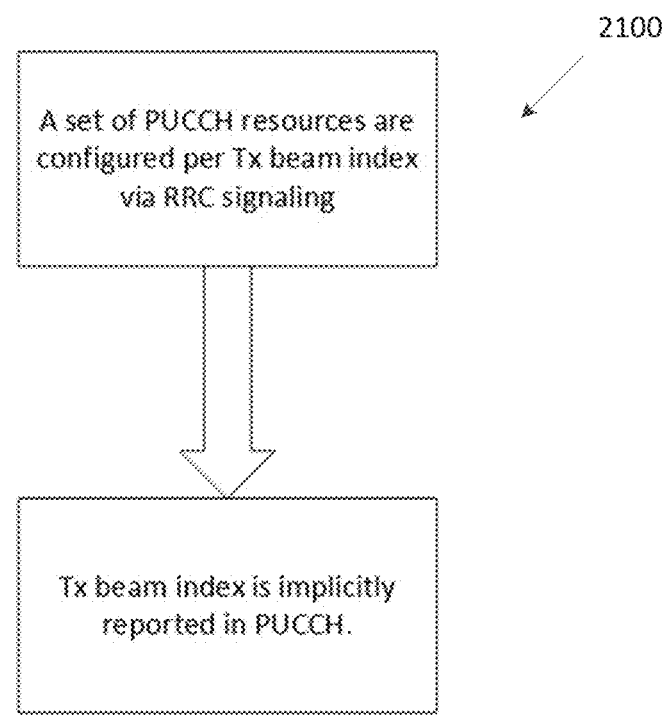
FIG. 21 illustrates an example implicit signaling of Tx beam index information according to embodiments of the present disclosure.

FIG. 21 illustrates an example implicit signaling of Tx beam index information 2100 according to embodiments of the present disclosure. An embodiment of the implicit signaling of Tx beam index information 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

In one embodiment, PUCCH resource allocation for BSI reporting in PUCCH is as FIG. 21. A set of PUCCH resources are configured per Tx beam index via RRC signaling and the Tx beam index is implicitly reported in PUCCH. If a set of PUCCH resources is allocated semi-statically per Tx beam index where each transmission instance corresponds to one of the Tx beam index info in one Rx beam set/Group number, the correspondence between Tx beam index info and transmission instance can be implicit, hence Tx beam index info is not required to be explicitly transmitted in the payload resulting to a smaller payload. As an example, when Rx beam set/Group #, Tx beam index info, and RSRP are reported in each PUCCH, the number of bits can be respectively 4 bits, 3 bits and 7 bits, and the total payload is 14 bits. Then, if only beam Rx set/Group number and RSRP are reported, the total payload is reduced to 11 bits in each PUCCH. The Tx beam index info is implicitly indicated via the selected resource index, for which the UE is configured with $2^3=8$ PUCCH resources. In one such case, the UE transmits a PUCCH in resource n for reporting Rx set/group number and RSRP of Tx beam n. The network may configure UE to report N reports corresponding to N Tx beams; in such a case, the selected set of N resources will indicate the selected N Tx beams for the reporting.

The aforementioned embodiment is also applicable with replacing Tx beam index in FIG. 21 with beam pair link (i.e., a pair of Tx beam index and Rx beam set index). In such a case, in each PUCCH reporting in resource n, RSRP for beam pair link n is reported. In this case, the network also configures N beam pair links for PUCCH reporting as well as N PUCCH resources. The beam pair links can be updated via MAC/CE signaling, or the N beam pair links can be indicated in the DCI.

Figure 22:
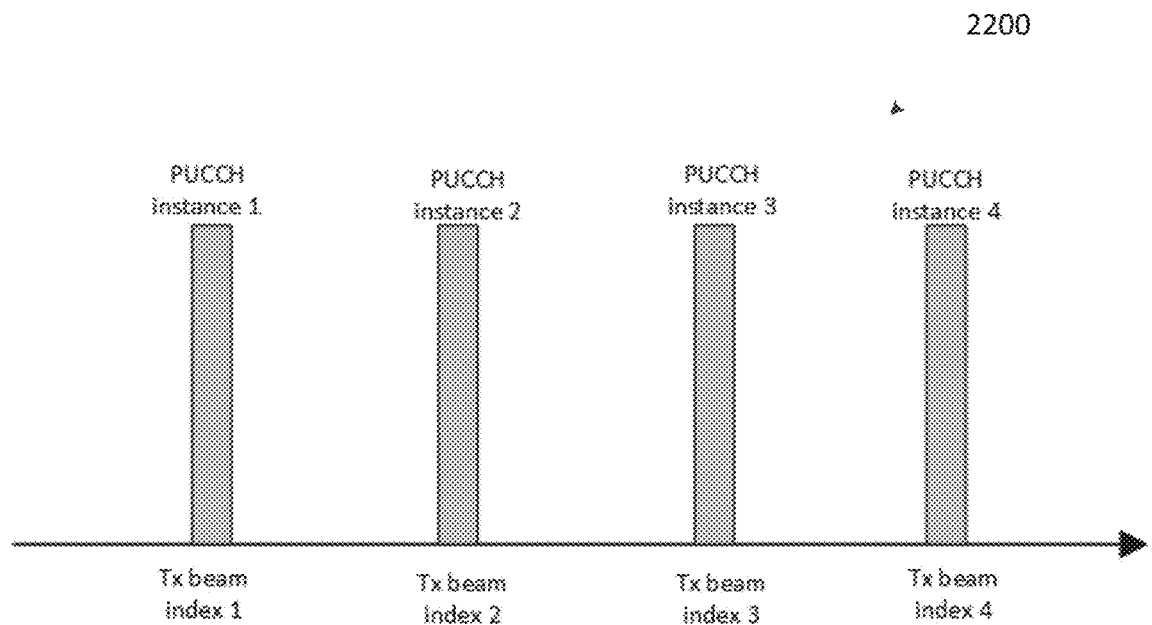
FIG. 22 illustrates another example implicit signaling of Tx beam index information according to embodiments of the present disclosure.

FIG. 22 illustrates another example implicit signaling of Tx beam index information 2200 according to embodiments of the present disclosure. An embodiment of the implicit signaling of Tx beam index information 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE transmits a PUCCH in all the allocated resources. In an example as shown in FIG. 22, Tx beam index info is implicitly conveyed. In this example, it may be assumed that PUCCH resources of 4 Tx beams are separately configured. PUCCH in instances 1-4 is transmitted for Tx beam index 1-4 respectively.

Figure 23:
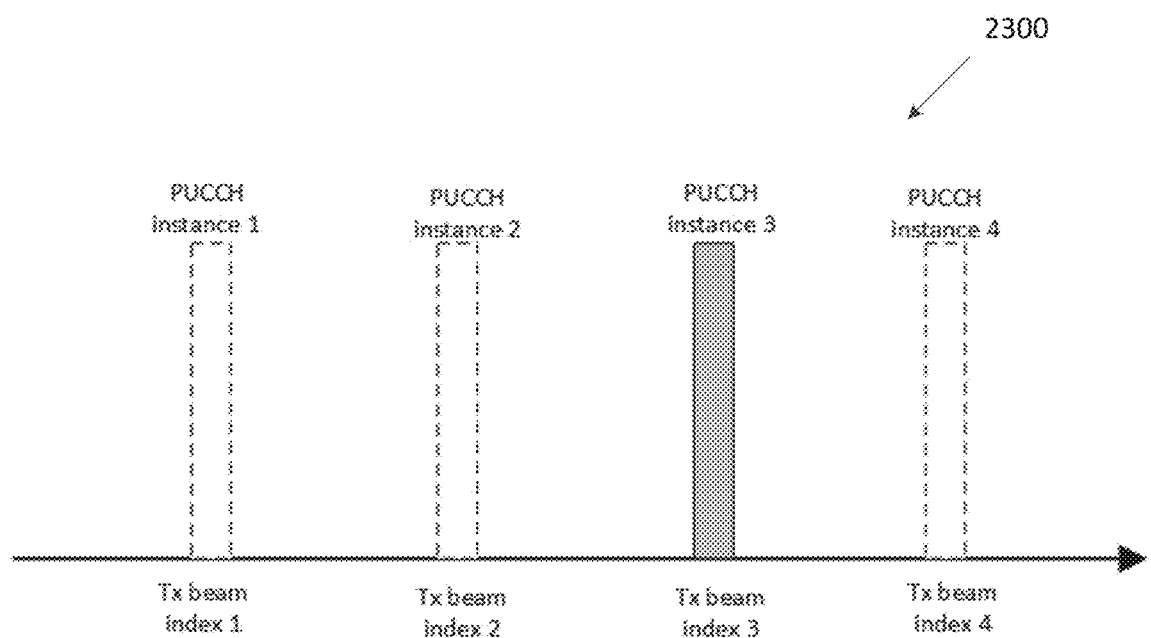
FIG. 23 illustrates another example implicit signaling of Tx beam index information according to embodiments of the present disclosure.

FIG. 23 illustrates another example implicit signaling of Tx beam index information 2300 according to embodiments of the present disclosure. An embodiment of the implicit signaling of Tx beam index information 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE transmits a PUCCH in only part of all the allocated resources because not all Tx beams are qualified for report. In an example, it may be assumed that PUCCH resources of 4 Tx beams are separately configured. As illustrated in FIG. 23, PUCCH instance 3 implicitly indicates that Tx beam index 3 info in one Rx beam set/Group number is reported in the BSI report whereas PUCCH in instances 1, 2, and 4 is not transmitted.

Figure 24:
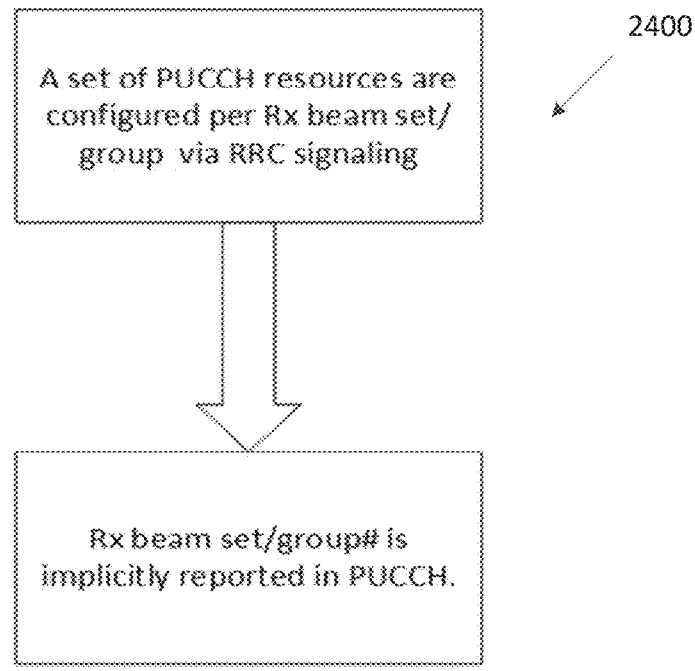
FIG. 24 illustrates an example implicit signaling of Rx beam set/group number according to embodiments of the present disclosure.

FIG. 24 illustrates an example implicit signaling of Rx beam set/group number 2400 according to embodiments of the present disclosure. An embodiment of the implicit signaling of Rx beam set/group number 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

In one embodiment, PUCCH resource allocation for BSI reporting in PUCCH is as illustrated in FIG. 24. A set of PUCCH resources are configured per Rx beam set/group via RRC signaling and Rx beam set/group number is implicitly reported in PUCCH. If a set of PUCCH resources is allocated semi-statically per Rx beam set/Group number, where each transmission instance belongs to one of the Rx beam sets/Groups, the correspondence between Rx beam set/Group number and transmission instance can be implicit, hence Rx beam set/Group number is not required to be explicitly transmitted in the payload resulting to a smaller payload. As an example, when Rx beam set/Group number, Tx beam index info, and RSRP are reported in each PUCCH, the number of bits can be respectively 4 bits, 3 bits and 7 bits, and the total payload is 14 bits. Then, if only Tx beam index info and RSRP are reported, the total payload is reduced to 10 bits in each PUCCH.

Figure 25:
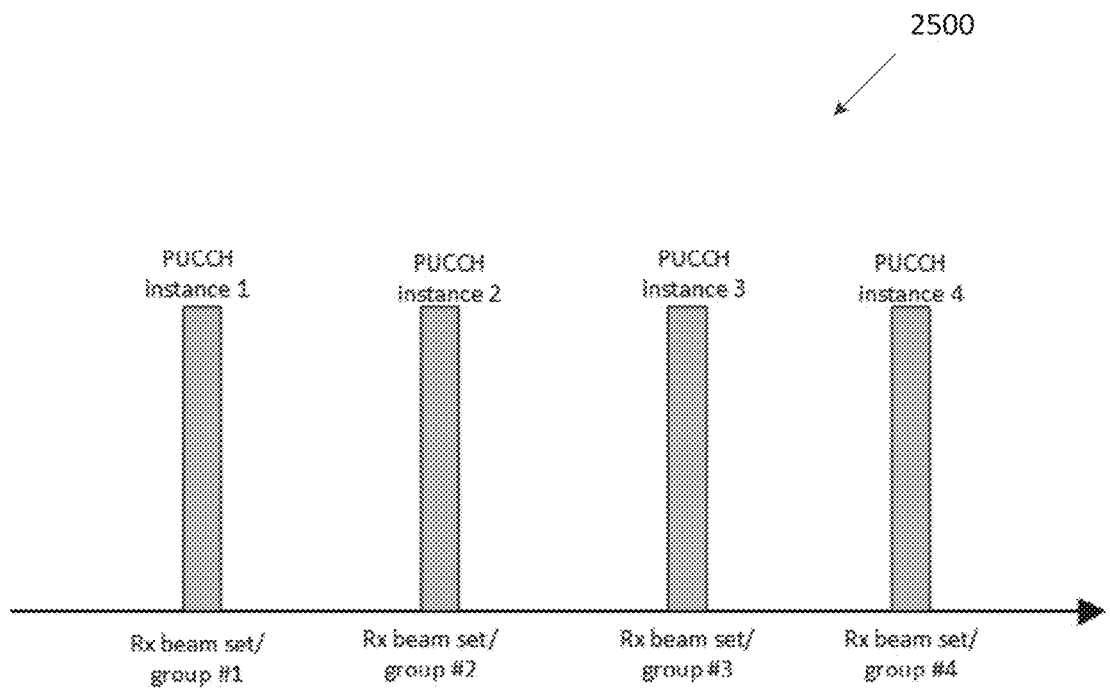
FIG. 25 illustrates another example implicit signaling of Rx beam set/group number according to embodiments of the present disclosure.

FIG. 25 illustrates another example implicit signaling of Rx beam set/group number 2500 according to embodiments of the present disclosure. An embodiment of the implicit signaling of Rx beam set/group number 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE transmits a PUCCH in all the allocated resources. In an example as illustrated in FIG. 25, Rx beam set/Group number is implicitly conveyed. In this example, it may be assumed that PUCCH resources of 4 Rx beam sets/groups are separately configured. PUCCH instance 3 implicitly indicates that Rx beam set/Group 3 is reported in the BSI report whereas PUCCH in instances 1, 2, and 4 is transmitted for Rx beam set/Group number 1, 2, and 4 respectively.

Figure 26:
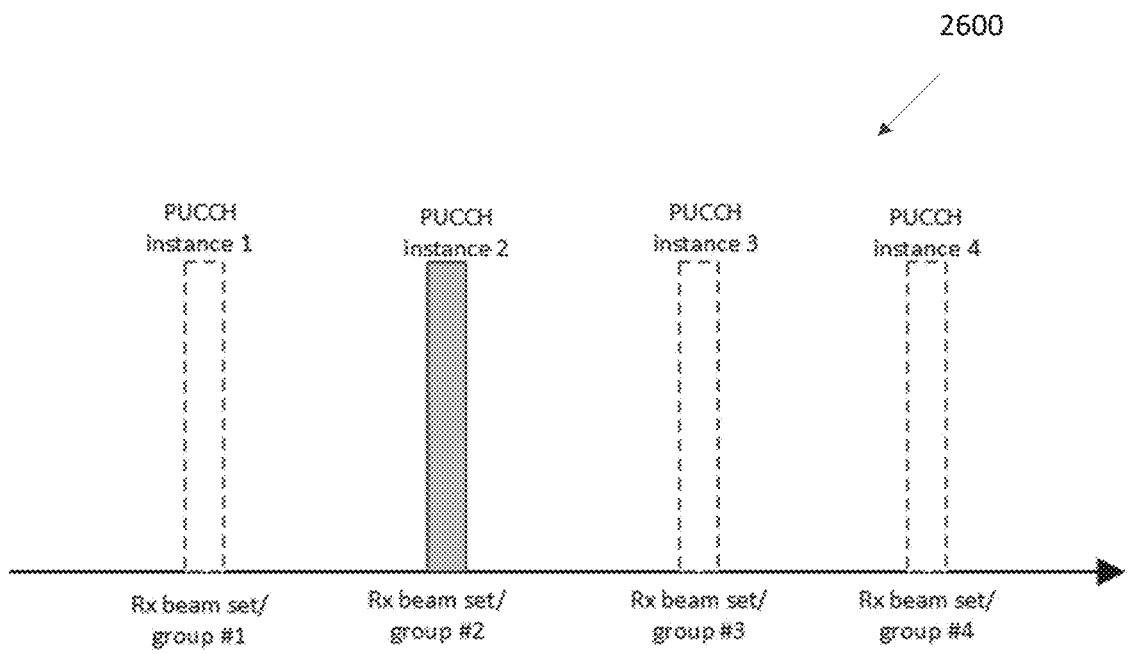
FIG. 26 illustrates yet another example implicit signaling of Rx beam set/group number according to embodiments of the present disclosure.

FIG. 26 illustrates yet another example implicit signaling of Rx beam set/group number 2600 according to embodiments of the present disclosure. An embodiment of the implicit signaling of Rx beam set/group number 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE transmits a PUCCH in only part of all the allocated resources because not all Rx beam sets/groups are qualified for report. In an example, it may be assumed that PUCCH resources of 4 Rx beam sets/groups are separately configured. As shown in FIG. 26, PUCCH instance 3 implicitly indicates that Rx beam set/Group 3 is reported in the BSI report whereas PUCCH in instances 1, 2, and 4 is not transmitted.

Figure 27:
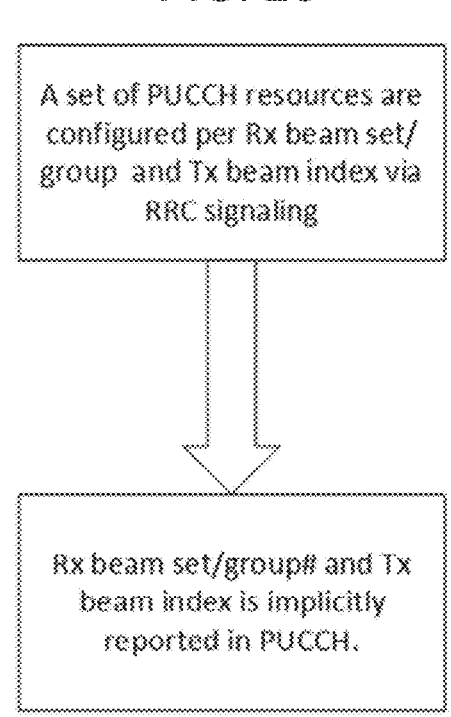
FIG. 27 illustrates an example implicit signaling of Rx beam set/group number and Tx beam index information according to embodiments of the present disclosure.

In one embodiment, PUCCH resource allocation for BSI reporting in PUCCH is as FIG. 27. A set of PUCCH resources are configured per Rx beam set/group and Tx beam index via RRC signaling and Rx beam set/group number and Tx beam index is implicitly reported in PUCCH. If a set of PUCCH resources is allocated semi-statically per Rx beam set/Group number, where each transmission instance in one Rx beam set/Group number corresponds to one of the Tx beam index info in this Rx beam set/Group number, the correspondence between Tx beam index info and transmission instance can be implicit, hence Tx beam index info is not required to be explicitly transmitted in the payload resulting to a smaller payload. Each set of PUCCH resources also corresponds to a specific Rx beam set set/Group number, then Rx beam set/Group number can be also implicitly transmitted in the payload. As an example, when Rx beam set/Group number, Tx beam index info, and RSRP are reported in each PUCCH, the number of bits can be respectively 4 bits, 3 bits and 7 bits, and the total payload is 14 bits. Then, if only RSRP are reported, the total payload is reduced to 7 bits in each PUCCH.

FIG. 27 illustrates an example implicit signaling of Rx beam set/group number and Tx beam index information 2700 according to embodiments of the present disclosure. An embodiment of the implicit signaling of Rx beam set/group number and Tx beam index information 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

Figure 28:
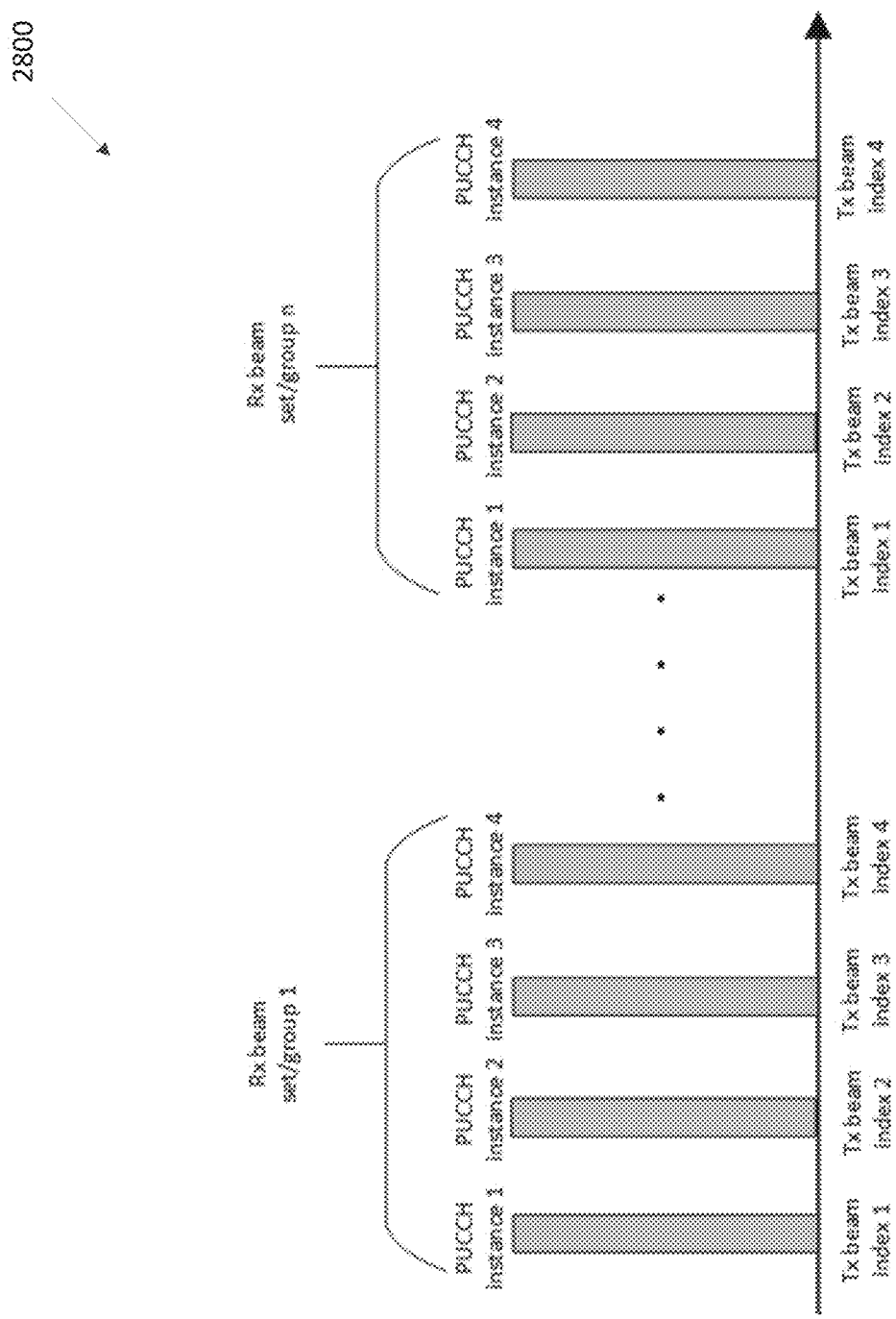
FIG. 28 illustrates another example implicit signaling of Rx beam set/group number and Tx beam index information according to embodiments of the present disclosure.

FIG. 28 illustrates another example implicit signaling of Rx beam set/group number and Tx beam index information 2800 according to embodiments of the present disclosure. An embodiment of the implicit signaling of Rx beam set/group number and Tx beam index information 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE transmits a PUCCH in all the allocated resources. In an example as illustrated in FIG. 28, Rx beam set/Group number and Tx beam index information are implicitly conveyed. In this example, it may be assumed that PUCCH resources of n Rx beam sets/groups and 4 Tx beams in each Rx beam set/group are separately configured. Each PUCCH instance implicitly indicates that which Rx beam set/Group and Tx beam index info is reported in the BSI report.

Figure 29:
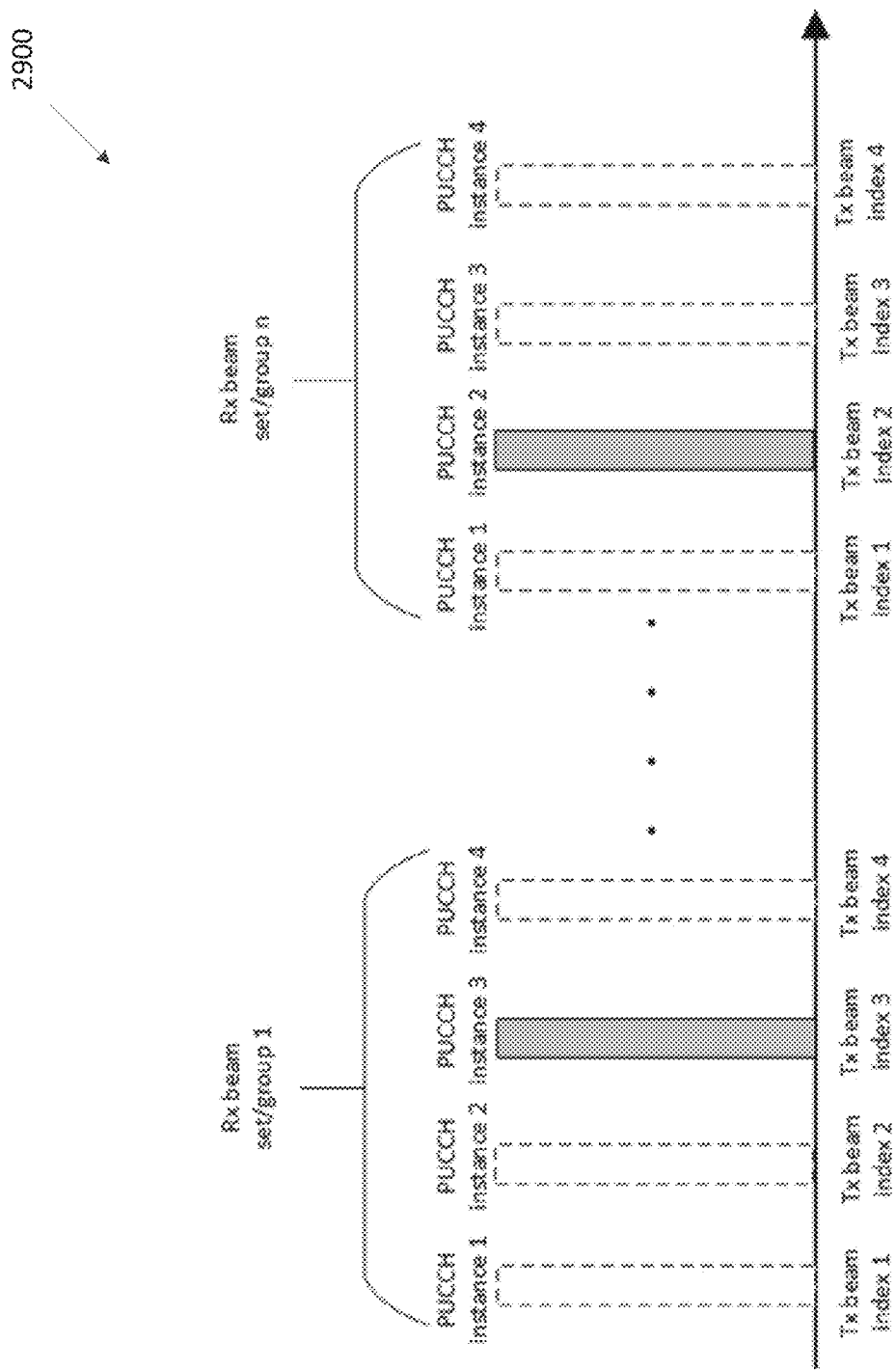
FIG. 29 illustrates yet another example implicit signaling of Rx beam set/group number and Tx beam index information according to embodiments of the present disclosure.

FIG. 29 illustrates yet another example implicit signaling of Rx beam set/group number and Tx beam index information 2900 according to embodiments of the present disclosure. An embodiment of the implicit signaling of Rx beam set/group number and Tx beam index information 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE transmits a PUCCH in only part of all the allocated resources because not all Rx beam sets/groups or Tx beams are qualified for report. In an example, it may be assumed that PUCCH resources of n Rx beam sets/groups and 4 Tx beams in each Rx beam set/group are separately configured. As shown in FIG. 29, PUCCH instance 3 in Rx beam set/group 1 and PUCCH instance 2 in Rx beam set/group n implicitly indicates that Tx beam index 3 in Rx beam set/Group 1 and Tx beam index 2 in Rx beam set/Group n are reported in the BSI report whereas other PUCCH instances are not transmitted.

Figure 30:
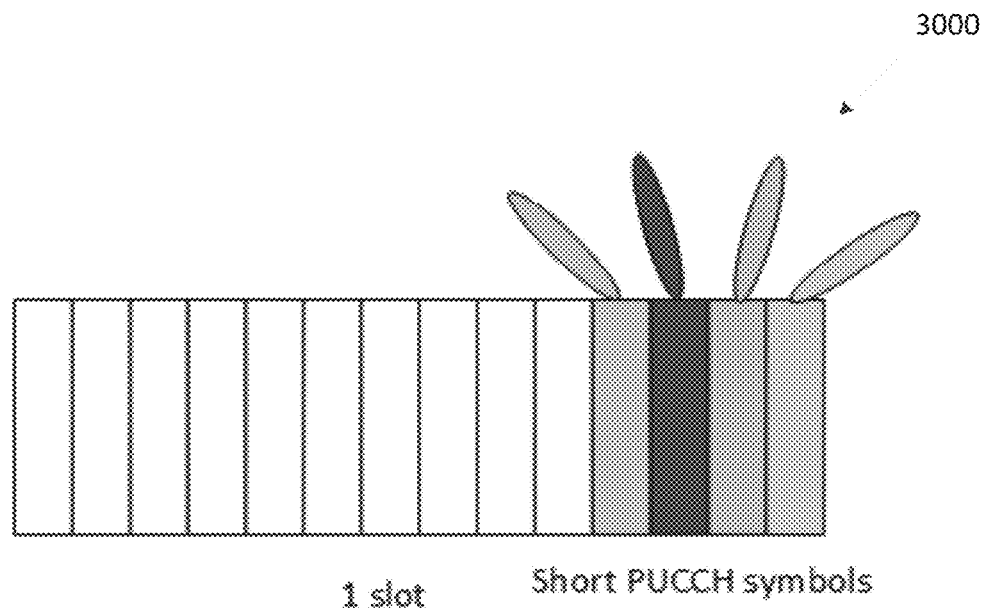
FIG. 30 illustrates an example short PUCCH transmission according to embodiments of the present disclosure.

FIG. 30 illustrates an example short PUCCH transmission 3000 according to embodiments of the present disclosure. An embodiment of the short PUCCH transmission 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

For Short PUCCH, as shown in FIG. 30, each short PUCCH may have a separate Tx beam that is configured by either implicit signaling, RRC signaling semi-statically. Tx beams for different PUCCHs may be targeted to different TRPs, e.g., to support multi-connectivity (e.g., multiple BSIs are intended for different TRPs in non-ideal backhaul case).

In one embodiment, if no beam correspondence holds, the Tx beam for each short PUCCH is configured RRC signaling semi-statically.

In one embodiment, when each short PUCCH resource is configured per BPL, if beam correspondence holds, the Tx beam for each short PUCCH is selected based upon each configured BPL, where the Tx beam is associated with the Rx beam by beam correspondence.

In one embodiment, when each short PUCCH resource is configured per Rx beam set. if beam correspondence holds, the Tx beam for each short PUCCH is selected based upon each configured Rx beam set, where the Tx beam is associated with the Rx beam in each Rx beam set by beam correspondence.

Figure 31:
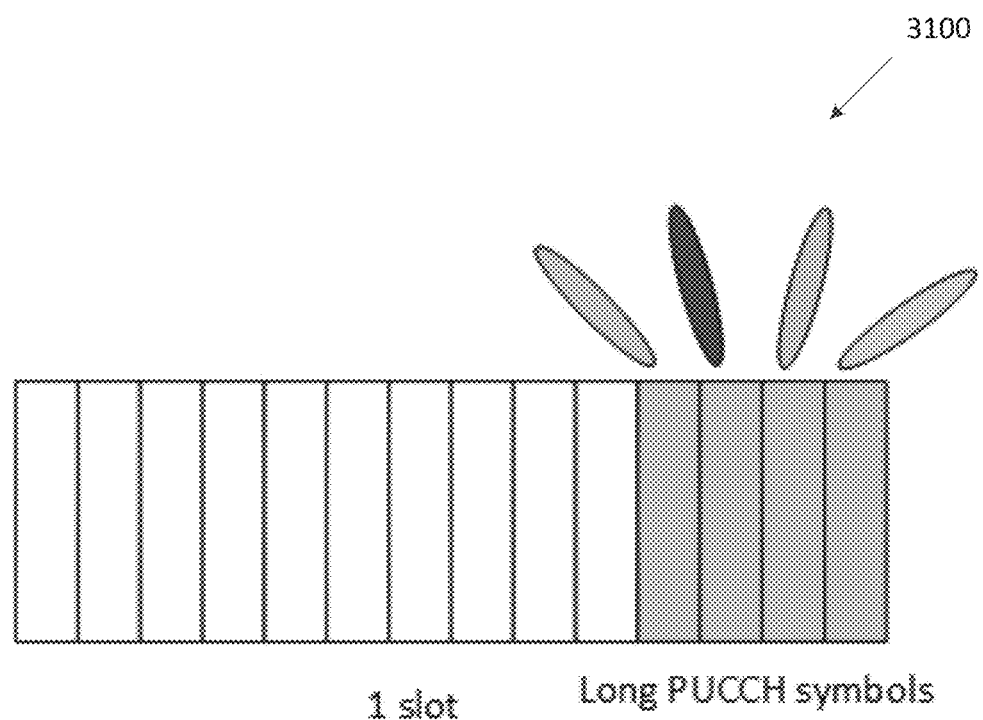
FIG. 31 illustrates an example long PUCCH transmission according to embodiments of the present disclosure.

FIG. 31 illustrates an example long PUCCH transmission 3100 according to embodiments of the present disclosure. An embodiment of the long PUCCH transmission 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

For long PUCCH, the aforementioned embodiments for short PUCCH can also be applicable. For long PUCCH, as shown in FIG. 31, each PUCCH symbol may use a separate Tx beam.

In one embodiment, a time-domain beam cycling is used where each PUCCH symbol uses a Tx beam predefined by a specific beam selection function. In one embodiment, each PUCCH symbol uses a Tx beam explicitly signaled by RRC semi-statically.

PUCCH beam indication can be either performed through implicit signaling of PDCCH, RRC signaling semi-statically or DCI signaling dynamically by the network, depending upon what contents the PUCCH channel carries, whether beam correspondence holds and so on. The beam indication for PUCCH can be SRI or SRI+ antenna port. When different UCI cases are multiplexed in the same resource or in the same OFDM symbol, there may be mechanisms to resolve the beam indication conflict.

The common solutions to PUCCH beam indication is as below. In one example, for each UCI case, configure a PUCCH beam separately. PUCCH Tx beam can be configured by DCI, RRC or MAC CE. For PUCCH including A/N/SR, configure a first PUCCH beam; for PUCCH not including A/N/SR configure a second PUCCH beam. In one example, for all PUCCH cases, configure a common PUCCH beam. In one example, for PUCCH and PUSCH, configure a separate beam or common beam.

In one embodiment, PUCCH and PUSCH can be configured separately for Tx beams for some reasons e.g., PUCCH may have wider beam than PUSCH for better reliability, PUCCH and PUSCH may target to different TRPs.

In one embodiment, for different UCI case, if it is targeted to different TRP, the Tx beam may also vary and will be configured separately. They may conflict and may also be the same depending upon their respective configurations.

Figure 32:
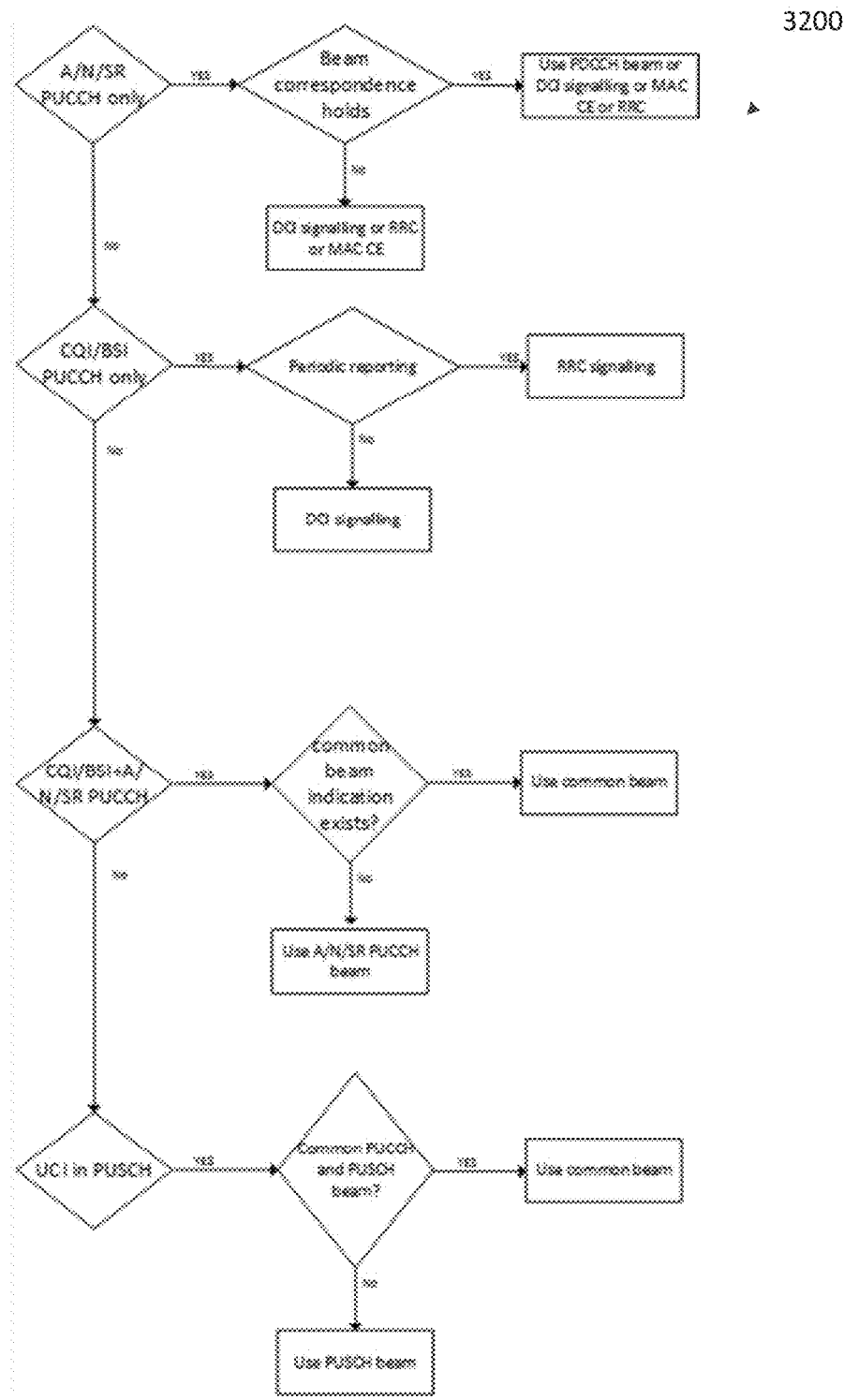
FIG. 32 illustrates an example PUCCH beam indication according to embodiments of the present disclosure.

FIG. 32 illustrates an example PUCCH beam indication 3200 according to embodiments of the present disclosure. An embodiment of the PUCCH beam indication 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions. Other embodiments are used without departing from the scope of the present disclosure.

The process to resolve beam conflicts for all UCI cases is illustrated in FIG. 32.

When PDCCH and PUCCH beams are in beam correspondence for A/N/SR only PUCCH, A/N/SR only PUCCH beams are implicitly selected by PDCCH beams or indicated by DCI signaling or MAC CE or RRC signaling.

When PDCCH and PUCCH beams are not in beam correspondence for A/N/SR only PUCCH, A/N/SR only PUCCH beams are indicated by DCI signaling or MAC CE or RRC signaling.

For CQI/BSI PUCCH, beams are configured by RRC semi-statically for periodic reporting or by DCI for aperiodic reporting.

When CQI/BSI PUCCH and A/N/SR PUCCH are transmitted separately in different OFDM symbols, different beams are used for CQI/BSI PUCCH and A/N/SR PUCCH by different beam indication.

When CQI/BSI and A/N/SR are multiplexed in a PUCCH, if common beam is configured for CQI/BSI and A/N/SR, common beam is used, else A/N/SR beam may be selected.

When UCI is multiplexed on a PUSCH, if common beam is configured for PUCCH and PUSCH, common beam is selected, else a UE may follow PUSCH beam.

For reporting L BSIs, PUSCH, long PUCCH, or short PUCCH can be considered. PUSCH can be used for aperiodic BSI reporting. Long PUCCH and short PUCCH can be used for both periodic and aperiodic reporting. When long PUCCH and short PUCCHs are used for aperiodic reporting, the CSI/BSI trigger is embedded in PDCCH transmitted in a same time slot as the PUCCHs. For example, a UE may be triggered to report a beam quality corresponding to a preconfigured DL BPL or a serving BPL by PDCCH. PUSCH and long PUCCH may be able to carry the whole payload of the L BSIs without compression. Short PUCCH, however, is not likely to be sufficient to carry the whole payload of the L BSIs.

For aperiodic PUSCH reporting, a whole payload of the L BSIs or a gNB configured/serving DL BPL can be carried in a single report.

For aperiodic PUCCH reporting, one case where aperiodic PUCCH is useful to transmit BSI report is when the gNB needs to know the beam quality information of a gNB configured BPL or serving BPL. This BSI information can be small because only beam quality information of a single BPL, e.g., gNB configured BPL or serving BPL needs to be reported. Aperiodic PUCCH is also very useful for quicker BSI report in a self-contained subframe when triggering of aperiodic PUCCH reporting in the DCI is in the same subframe as the PUCCHs.

Figure 33:
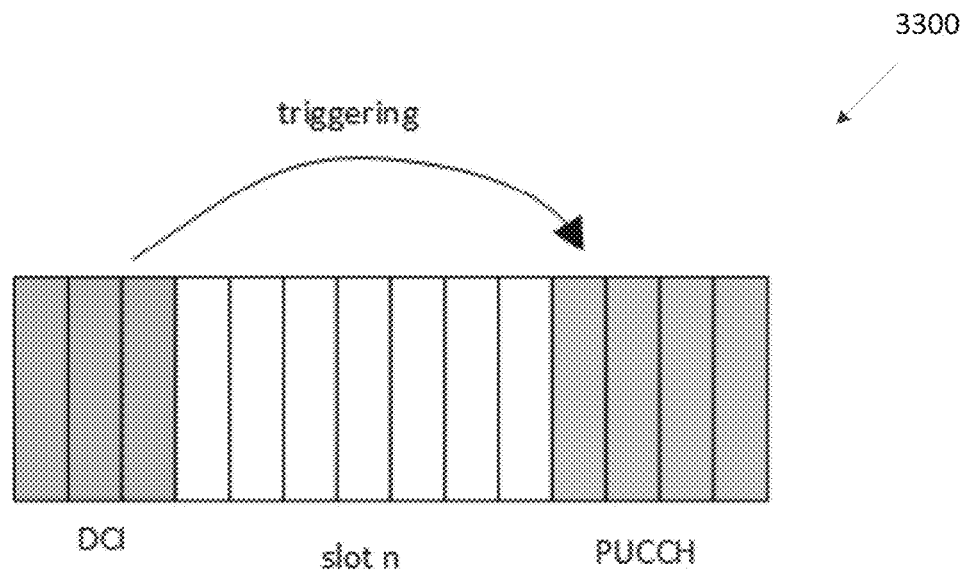
FIG. 33 illustrates an example DCI triggering aperiodic PUCCH according to embodiments of the present disclosure.

FIG. 33 illustrates an example DCI triggering aperiodic PUCCH 3300 according to embodiments of the present disclosure. An embodiment of the DCI triggering aperiodic PUCCH 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions. Other embodiments are used without departing from the scope of the present disclosure.

FIG. 33 shows the DCI triggering aperiodic PUCCH in the same subframe. For aperiodic PUCCH reporting, both short and long PUCCH can be used. When long PUCCH is used, improved coverage can be achieved.

Figure 34:
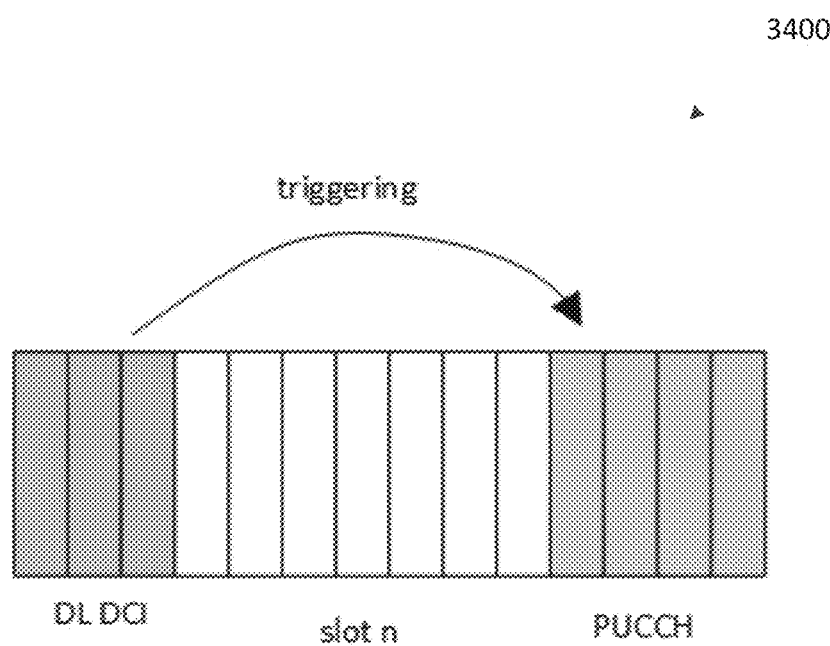
FIG. 34 illustrates an example DL DCI triggering aperiodic PUCCH according to embodiments of the present disclosure.

FIG. 34 illustrates an example DL DCI triggering aperiodic PUCCH 3400 according to embodiments of the present disclosure. An embodiment of the DL DCI triggering aperiodic PUCCH 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions. Other embodiments are used without departing from the scope of the present disclosure.

In one embodiment, DCI triggering PUCCH aperiodic reporting is by DL DCI as shown in FIG. 34.

Figure 35:
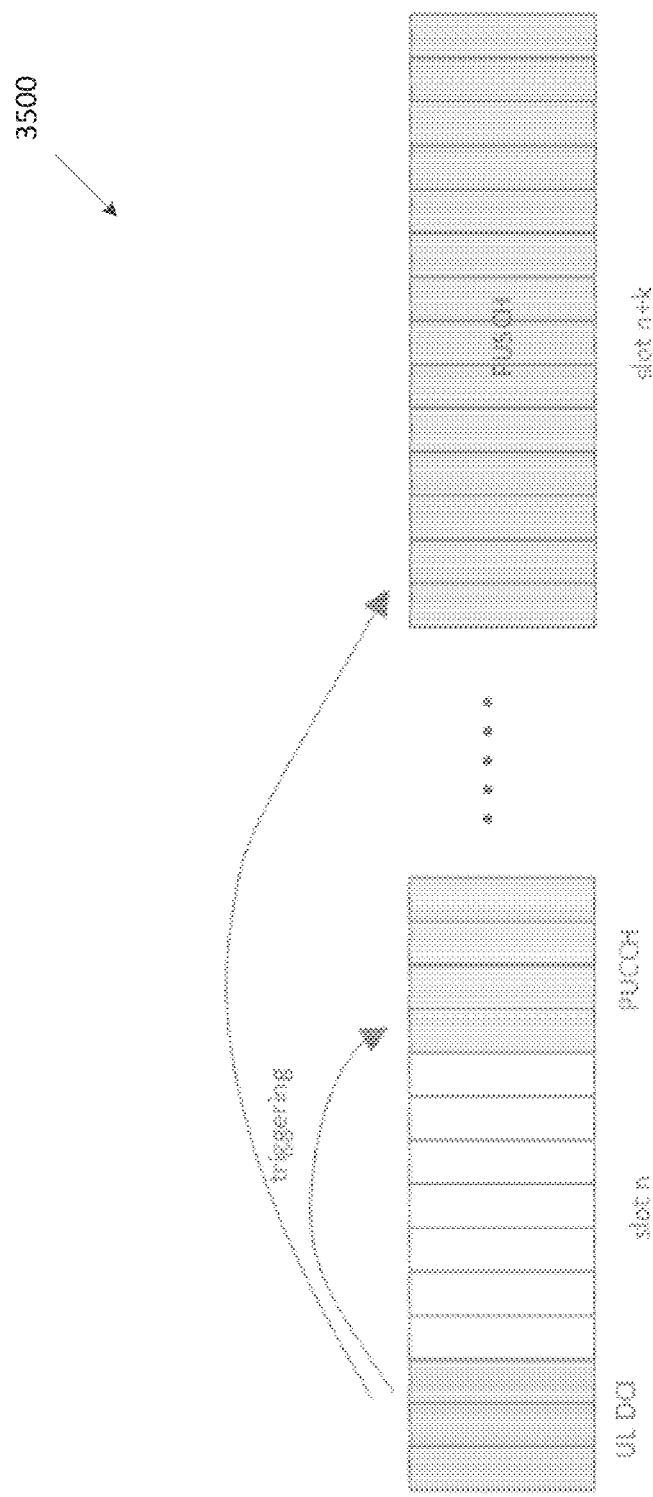
FIG. 35 illustrates an example UL DCI triggering aperiodic PUCCH and PUSCH according to embodiments of the present disclosure.

FIG. 35 illustrates an example UL DCI triggering aperiodic PUCCH and PUSCH 3500 according to embodiments of the present disclosure. An embodiment of the UL DCI triggering aperiodic PUCCH and PUSCH 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions. Other embodiments are used without departing from the scope of the present disclosure.

In one embodiment, DCI triggering PUCCH aperiodic reporting is by UL DCI, where PUCCH and PUSCH are triggered by the single UL DCI and are multiplexed in different resources, either by TDM or FDM or others. For example, PUCCH and PUSCH are triggered together by UL DCI to transmit in different slots as shown in FIG. 35. This is useful when gNB needs immediate PUCCH reporting and there are no enough resources for PUSCH transmission in the same slot as UL DCI. Another benefit is that the UE may have more time for PUSCH processing if the PUSCH is done in the following slots instead of the same slot as UL DCI, but the gNB needs immediate UCI reporting in the same slot as UL DCI.

For the multi-beam operations of both aperiodic PUSCH and PUCCH reporting, the network needs to indicate UE Tx beam(s) to be used for these UL signals so that the network can apply appropriate TRP Rx beams for the UL signal reception. Considering the case when UE beam correspondence holds, the UE Tx beam(s) used for both aperiodic PUCCH and PUSCH can be implicitly derived from DL Rx beam. But when UE beam correspondence doesn't hold, the UE Tx beam for both aperiodic PUCCH and PUSCH needs to be explicitly indicated, either semi-statically or dynamically or both. More specifically, in case of aperiodic PUSCH reporting, the UE Tx beam(s) can be dynamically indicated in the UL DCI signaling; on the other hand, in case of aperiodic PUCCH reporting, the UE Tx beam(s) can be configured either semi-statically or dynamically or both.

When a configured DL BPL or a serving DL BPL is to be reported in the aperiodic BSI reporting, the configured BPL or serving BPL may be indicated dynamically or derived from the semi-statically configured resources. For example, a pool of PUCCH resources can be configured semi-statically per DL BPL while one selected PUCCH resource from the pool is indicated dynamically in the DCI to implicitly indicate the DL BPL that is to be reported in the aperiodic BSI reporting. Also when the whole BSI reporting is to be reported, the whole BSI reporting request may be indicated dynamically.

For resource allocation of aperiodic PUCCH, a pool of PUCCH resources that can be shared by multiple users can be configured semi-statically while one selected PUCCH resource from the pool is indicated dynamically in the DCI. One benefit is that this approach allows more efficient uplink resource usage.

In one embodiment, DCI indication for aperiodic (short or long) PUCCH BSI is provided. In one example of Alt 1, 1 bit to trigger BPL BSI reporting on semi-statically configured PUCCH resource (PUCCH Tx beam is also semi-statically configured) when PUCCH Tx beam is configured in the PUCCH resource.

In one example of Alt 2, (1 bit to trigger BPL BSI reporting on semi-statically configured PUCCH resource)+(x bits to indicate a PUCCH beam) when PUCCH Tx beam is not configured in the PUCCH resource.

In one example of Alt 3, X bits to trigger on a PUCCH resource selected from a pool of semi-statically configured PUCCH resources when PUCCH Tx beam is configured in the PUCCH resource.

In one example of Alt 4, X bits to trigger on a PUCCH resource selected from a pool of semi-statically configured PUCCH resources+(x bits to indicate a PUCCH beam) when PUCCH Tx beam is not configured in the PUCCH resource. In such example, the following is applicable to all the alternatives above to indicate a DL serving or selected BPL: additional Y bit to indicate DL selected BPL or 0 bit if serving BPL BSI is reported or 0 bit if indicated PUCCH resource is associated with a selected DL BPL. In such example, the following is applicable to indicate the whole BSI request for long PUCCH: 1 bit to indicate whole BSI request.

In one embodiment, DCI indication for aperiodic (PUSCH) BSI is provided. In such embodiment, 1 bit to trigger BPL BSI reporting is provided. In such embodiment, the following is applicable to indicate a DL serving or selected BPL: additional Y bit to indicate DL selected BPL or 0 bit if serving BPL BSI is reported. In such embodiment, the following is applicable to indicate the whole BSI request: 1 bit to indicate whole BSI request.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
a transceiver configured to receive, from a base station (BS), sets of higher-layer configuration information;
a processor operably connected to the transceiver, the processor configured to:
when configured for mobility measurement on synchronization signal (SS) and physical broadcast channel (PBCH) (SS/PBCH) blocks:
identify, based on one of the sets of higher-layer configuration information, a first set of SS/PBCH blocks configured for the mobility measurement; and
measure and report, via the transceiver, mobility measurement quantities for the first set of SS/PBCH blocks; and when configured for receiving a physical downlink shared channel (PDSCH):
identify, based on another of the sets of higher-layer configuration information, a second set of more than one SS/PBCH blocks configured for the UE, wherein the other set of higher-layer configuration information indicates the second set of more than one SS/PBCH blocks to rate match around, wherein the sets of higher layer configuration information for the second set of more than one SS/PBCH blocks are based on a bitmap, wherein each bit of the bitmap indicates whether a SS/PBCH block is transmitted or not, and wherein a length of the bitmap equals a maximum number of SS/PBCH blocks of a frequency band; and
receive, via the transceiver, the PDSCH with rate matching around a SS/PBCH block included in the second set of more than one SS/PBCH blocks.

2. The UE of claim 1, wherein:
the UE is configured for the mobility measurement,
the processor is further configured to monitor for a SS/PBCH block measurement timing configuration (SMTC) duration, and
the processor is configured to measure and report, via the transceiver, the mobility measurement quantities for the first set of SS/PBCH blocks that overlap with the SMTC duration.

3. The UE of claim 1, wherein the mobility measurement quantities comprise a SS reference signal received power (SS-RSRP) for a first subset of the first set of SS/PBCH blocks and a SS reference signal received quality (SS-RSRQ) for a second subset of the first set of SS/PBCH blocks.

4. The UE of claim 1, wherein the sets of higher layer configuration information for the first set of SS/PBCH blocks are based on the bitmap.

5. The UE of claim 1, wherein the processor is configured to perform rate matching of the PDSCH at data physical resource block (PRB) boundaries around a set of consecutive PRBs at least partially overlapping with an SS/PBCH block in orthogonal frequency-division multiplexing (OFDM) symbols containing the SS/PBCH block.

6. The UE of claim 1, wherein the processor is configured to perform rate matching of the PDSCH around an entire bandwidth part (BWP) bandwidth in orthogonal frequency-division multiplexing (OFDM) symbols containing the SS/PBCH block.

7. The UE of claim 1, wherein:
the one set of higher-layer configuration information includes a SS/PBCH block measurement timing configuration (SMTC) indicating a SS/PBCH block periodicity for the mobility measurement,
the other set of higher-layer configuration information indicates a SS/PBCH block periodicity of the second set of more than one SS/PBCH blocks to rate match around, and
the SS/PBCH block periodicity for the mobility measurement is separately configured from the SS/PBCH block periodicity of the second set of more than one SS/PBCH blocks to rate match around.

8. A base station (BS) comprising:
a processor configured to generate sets of higher-layer configuration information for a user equipment (UE); and
a transceiver operably connected to the processor, the transceiver configured to transmit, to the UE, the sets of higher-layer configuration information and receive, from the UE, reports based on the sets of higher-layer configuration information, wherein:
when configuring the UE for mobility measurement on synchronization signal (SS) and physical broadcast channel (PBCH) (SS/PBCH) blocks, the processor is configured to generate one of the sets of higher-layer configuration information to indicate a first set of SS/PBCH blocks configured for the mobility measurement for reporting of mobility measurement quantities for the first set of SS/PBCH blocks; and
when configuring the UE for receiving a physical downlink shared channel (PDSCH), the processor is configured to:
generate another of the sets of higher-layer configuration information to indicate a second set of more than one SS/PBCH blocks configured for the UE, wherein the other set of higher-layer configuration information indicates the second set of more than one SS/PBCH blocks to rate match around, wherein the sets of higher layer configuration information for the second set of more than one SS/PBCH blocks are based on a bitmap, wherein each bit of the bitmap indicates whether a SS/PBCH block is transmitted or not, and wherein a length of the bitmap equals a maximum number of SS/PBCH blocks of a frequency band; and
transmit, via the transceiver, the PDSCH with rate matching around a SS/PBCH block included in the second set of more than one SS/PBCH blocks.

9. The BS of claim 8, wherein the mobility measurement quantities comprise a SS reference signal received power (SS-RSRP) for a first subset of the first set of SS/PBCH blocks and a SS reference signal received quality (SS-RSRQ) for a second subset of the first set of SS/PBCH blocks.

10. The BS of claim 8, wherein the sets of higher layer configuration information for the first set of SS/PBCH blocks are based on the bitmap.

11. The BS of claim 8, wherein the processor is configured to configure the UE for rate matching of the PDSCH at data physical resource block (PRB) boundaries around a set of consecutive PRBs at least partially overlapping with an SS/PBCH block in orthogonal frequency-division multiplexing (OFDM) symbols containing the SS/PBCH block.

12. The BS of claim 8, wherein the processor is configured to configure the UE for rate matching of the PDSCH around an entire bandwidth part (BWP) bandwidth in orthogonal frequency-division multiplexing (OFDM) symbols containing the SS/PBCH block.

13. The BS of claim 8, wherein:
the one set of higher-layer configuration information includes a SS/PBCH block measurement timing configuration (SMTC) indicating a SS/PBCH block periodicity for the mobility measurement,
the other set of higher-layer configuration information indicates a SS/PBCH block periodicity of the second set of more than one SS/PBCH blocks to rate match around, and
the SS/PBCH block periodicity for the mobility measurement is separately configured from the SS/PBCH block periodicity of the second set of more than one SS/PBCH blocks to rate match around.

14. A method of operating a user equipment (UE), the method comprising:
receiving, from a base station (BS), sets of higher-layer configuration information;
based on identifying that the UE is configured for mobility measurement on synchronization signal (SS) and physical broadcast channel (PBCH) (SS/PBCH) blocks:
identifying, based on one of the sets of higher-layer configuration information, a first set of SS/PBCH blocks configured for the mobility measurement; and
measuring and reporting mobility measurement quantities for the first set of SS/PBCH blocks; and
based on identifying that the UE is configured for receiving a physical downlink shared channel (PDSCH):
identifying, based on another of the sets of higher-layer configuration information, a second set of more than one SS/PBCH blocks configured for the UE, wherein the other set of higher-layer configuration information indicates the second set of more than one SS/PBCH blocks to rate match around, wherein the sets of higher layer configuration information for the second set of more than one SS/PBCH blocks are based on a bitmap, wherein each bit of the bitmap indicates whether a SS/PBCH block is transmitted or not, and wherein a length of the bitmap equals a maximum number of SS/PBCH blocks of a frequency band; and
receiving the PDSCH with rate matching around a SS/PBCH block included in the second set of more than one SS/PBCH blocks.

15. The method of claim 14, wherein the UE is configured for the mobility measurement, and measuring and reporting the mobility measurement quantities comprises:
monitoring for a SS/PBCH block measurement timing configuration (SMTC) duration; and
measuring and reporting the mobility measurement quantities for the first set of SS/PBCH blocks that overlap with the SMTC duration.

16. The method of claim 14, wherein the mobility measurement quantities comprise a SS reference signal received power (SS-RSRP) for a first subset of the first set of SS/PBCH blocks and a SS reference signal received quality (SS-RSRQ) for a second subset of the first set of SS/PBCH blocks.

17. The method of claim 14, wherein the sets of higher layer configuration information for the first set of SS/PBCH blocks are based on the bitmap.

18. The method of claim 14, further comprising performing rate matching of the PDSCH at data physical resource block (PRB) boundaries around a set of consecutive PRBs at least partially overlapping with an SS/PBCH block in orthogonal frequency-division multiplexing (OFDM) symbols containing the SS/PBCH block.

19. The method of claim 14, further comprising performing rate matching of the PDSCH around an entire bandwidth part (BWP) bandwidth in orthogonal frequency-division multiplexing (OFDM) symbols containing the SS/PBCH block.

20. The method of claim 14, wherein:
the one set of higher-layer configuration information includes a SS/PBCH block measurement timing configuration (SMTC) indicating a SS/PBCH block periodicity for the mobility measurement,
the other set of higher-layer configuration information indicates a SS/PBCH block periodicity of the second set of more than one SS/PBCH blocks to rate match around, and the SS/PBCH block periodicity for the mobility measurement is separately configured from the SS/PBCH block periodicity of the second set of more than one SS/PBCH blocks to rate match around.

\* \* \* \* \*